United States Patent
Li et al.

(10) Patent No.: US 12,445,569 B2
(45) Date of Patent: Oct. 14, 2025

(54) VIDEO RECORDING METHOD AND ELECTRONIC DEVICE

(71) Applicant: Beijing Kunshi Intellectual Property Management Co., Ltd., Beijing (CN)

(72) Inventors: Yuanyou Li, Shanhai (CN); Miaofeng Wang, Shanghai (CN); Wei Luo, Shanghai (CN)

(73) Assignee: Beijing Kunshi Intellectual Property Management Co., Ltd., Beijing (CN)

( * ) Notice: Subject to any disclaimer, the term of this patent is extended or adjusted under 35 U.S.C. 154(b) by 65 days.

(21) Appl. No.: 17/041,971

(22) PCT Filed: Mar. 26, 2018

(86) PCT No.: PCT/CN2018/080575
§ 371 (c)(1),
(2) Date: Sep. 25, 2020

(87) PCT Pub. No.: WO2019/183784
PCT Pub. Date: Oct. 3, 2019

(65) Prior Publication Data
US 2021/0092321 A1    Mar. 25, 2021

(51) Int. Cl.
| | | |
|---|---|---|
| *H04N 5/783* | (2006.01) |
| *G11B 27/34* | (2006.01) |
| *H04N 5/262* | (2006.01) |
| *H04N 5/77* | (2006.01) |
| *H04N 23/63* | (2023.01) |
| *H04N 23/951* | (2023.01) |
| *G11B 20/10* | (2006.01) |
| *G11B 27/00* | (2006.01) |

(52) U.S. Cl.
CPC .............. *H04N 5/783* (2013.01); *G11B 27/34* (2013.01); *H04N 23/632* (2023.01); *H04N 23/951* (2023.01); *G11B 2020/10981* (2013.01); *G11B 27/005* (2013.01)

(58) Field of Classification Search
USPC .................................................. 386/223–224
See application file for complete search history.

(56) References Cited

U.S. PATENT DOCUMENTS

| | | | |
|---|---|---|---|
| 7,242,850 B2 * | 7/2007 | Cok | ........................ H04N 7/014 |
| | | | 386/E5.013 |
| 2003/0016750 A1 | 1/2003 | Cok | |

(Continued)

FOREIGN PATENT DOCUMENTS

| | | |
|---|---|---|
| CN | 101663885 A | 3/2010 |
| CN | 102348090 A | 2/2012 |

(Continued)

*Primary Examiner* — Hung Q Dang
(74) *Attorney, Agent, or Firm* — LEYDIG VOIT & MAYER, LTD

(57) ABSTRACT

A method is provided for recording a video. The method includes generating a first set of video frames corresponding to a first time duration, generating a second set of video frames corresponding to a second time duration, inserting a third set of video frames to the second set of video frames, and automatically generating a combined video based on the (Continued)

first, second, and third sets of video frames. At least a part of the combined video is associated with a playback time duration greater than the second time duration.

15 Claims, 59 Drawing Sheets

(56) References Cited

U.S. PATENT DOCUMENTS

| | | | |
|---|---|---|---|
| 2010/0231593 A1* | 9/2010 | Zhou | G06T 3/4007 345/428 |
| 2010/0260472 A1 | 10/2010 | Okada | |
| 2013/0094829 A1* | 4/2013 | Yang | G11B 27/34 386/230 |
| 2013/0223535 A1* | 8/2013 | Macinnis | H04N 19/137 375/240.16 |
| 2013/0315556 A1 | 11/2013 | Ju et al. | |
| 2015/0071605 A1* | 3/2015 | Ogawa | H04N 5/775 386/241 |
| 2015/0147042 A1 | 5/2015 | Miyahara et al. | |
| 2015/0221335 A1* | 8/2015 | Licata | H04N 5/783 386/279 |
| 2015/0229889 A1* | 8/2015 | Boettiger | H04N 25/42 348/262 |
| 2015/0264385 A1* | 9/2015 | Ogawa | H04N 19/553 375/240.16 |
| 2016/0182866 A1* | 6/2016 | Landqvist | H04N 5/341 348/143 |
| 2017/0134639 A1* | 5/2017 | Pitts | G06T 5/50 |
| 2017/0180653 A1* | 6/2017 | Kang | H04N 5/23216 |
| 2019/0166306 A1 | 5/2019 | Zen et al. | |
| 2019/0243355 A1* | 8/2019 | Izu | H04N 23/66 |
| 2020/0154060 A1* | 5/2020 | Kovshov | H04N 5/262 |
| 2020/0260003 A1 | 8/2020 | Zen et al. | |

FOREIGN PATENT DOCUMENTS

| | | | | |
|---|---|---|---|---|
| CN | 102833480 A | 12/2012 | | |
| CN | 103139524 A | 6/2013 | | |
| CN | 103428460 A | 12/2013 | | |
| CN | 104618656 A | 5/2015 | | |
| CN | 104660948 A | 5/2015 | | |
| CN | 105245812 A | 1/2016 | | |
| CN | 105812651 A | 7/2016 | | |
| CN | 106161943 A | 11/2016 | | |
| CN | 106210541 A | 12/2016 | | |
| CN | 106657814 A | 5/2017 | | |
| CN | 107155068 A | 9/2017 | | |
| CN | 107277607 A | 10/2017 | | |
| CN | 107396019 A | 11/2017 | | |
| CN | 109076146 A | 12/2018 | | |
| CN | 107040714 B | 7/2021 | | |
| EP | 3188473 B1 | 7/2017 | | |
| EP | 3445031 A4 | 4/2019 | | |
| JP | 2008288934 A | 11/2008 | | |
| JP | 2013225906 A | 10/2013 | | |
| JP | 2014160927 A | * | 9/2014 | H04N 5/225 |
| JP | 2015056695 A | 3/2015 | | |
| JP | 2015106820 A | 6/2015 | | |
| JP | 2015122734 A | * | 7/2015 | H04N 5/783 |
| JP | 2017028466 A | 2/2017 | | |
| JP | 2017192100 A | 10/2017 | | |
| KR | 20170073216 A | * | 6/2017 | H04N 5/23245 |
| KR | 20180133414 A | 12/2018 | | |
| WO | 2010086912 A1 | 8/2010 | | |
| WO | 2017104987 A1 | 6/2017 | | |
| WO | WO-2017179249 A1 | * | 10/2017 | H04N 5/351 |

* cited by examiner (a)

CONT. FROM FIG. 8-1B (c)

(a)

(c)

(d)

(b)

(b)

CONT. FROM FIG. 14-2A (b)

(b)

(c)

VIDEO RECORDING METHOD AND ELECTRONIC DEVICE

CROSS-REFERENCE TO RELATED APPLICATIONS

This application is a national stage of International Application No. PCT/CN2018/080575, filed on Mar. 26, 2018, which is hereby incorporated by reference in its entirety.

TECHNICAL FIELD

This application relates to the field of electronic technologies, and in particular, to a video recording method and an electronic device.

BACKGROUND

When a video is played, if a quantity of frames played per second by an electronic device such as a mobile phone is less than a quantity of frames recorded per second during video recording, there is a slow motion play effect. For example, if a video is played at a play frame rate of 30 frames/second (fps), if the electronic device records the video at a video recording frame rate of 60 fps, there is a double-slow motion play effect, or if the electronic device records the video at a video recording frame rate of 120 fps, there is a fourfold-slow motion play effect.

A capability of human eyes to identify a high-speed moving object is limited, and a slow motion video helps people clearly see moving details in a high-speed moving process. When a higher video recording frame rate is used during video recording, a better slow motion play effect is obtained, and people can more clearly see specific moving details with eyes.

Currently, in the electronic device such as the mobile phone, a maximum frame rate supported by an image sensor usually is relatively low, and is, for example, 30 fps, 60 fps, 120 fps, or 240 fps, and a video recording frame rate of the electronic device is also 30 fps, 60 fps, 120 fps, or 240 fps. Usually, a requirement of people for identifying a high-speed moving process cannot be met. For example, referring to a diagram of a play effect shown in FIG. 1, when a video of a water drop falling process is recorded at a video recording frame rate of 240 fps, and the video is played at a play frame rate of 30 fps, it is still difficult for a user to clearly see a bouncing process of a water drop after the water drop falls onto a water surface or moving details of sprays splashed when the water drop falls onto a water surface.

SUMMARY

Embodiments of this application provide a video recording method and an electronic device, so that a video recording frame rate can be greater than a maximum frame rate supported by hardware of an image sensor, and slow motion video recording experience of a user can be improved.

The following technical solutions are used in the embodiments of this application to achieve the foregoing objectives.

In one aspect, an embodiment of this application provides a video recording method. The method may be applied to an electronic device having an image sensor, and includes the following steps: The electronic device first starts a camera, then displays a video recording preview interface, and records a video after detecting a video recording indication of a user. A video recording frame rate of the video is greater than an original frame rate, and the original frame rate is a maximum frame rate supported by hardware of an image sensor during video recording. In addition, the video includes a video of a slow motion type. In this solution, a video recording frame rate of the electronic device may be greater than the maximum video recording frame rate supported by the hardware of the image sensor, that is, the video recording frame rate of the electronic device may be higher, so that a slow motion video in the video recorded by the electronic device can better meet a requirement of the user for identifying a high-speed moving process.

In a possible design, the video further includes at least one of a video of a fast motion type or a video of a regular motion type, and the video recording frame rate of the video is a maximum value or an average value of a video recording frame rate of the video of the slow motion type, a video recording frame rate of the video of the slow motion type, and a video recording frame rate of the video of the slow motion type. In this solution, when the video is a combination of videos of different types, actions played in the video are sometimes fast and sometimes slow, so that a powerful visual impact can be exerted on the user, and a sense of shock and recording experience of the user can be improved.

In another possible design, a length of the video is a preset length, a format of the video is a preset format, the format includes a video type and a location of a video corresponding to the video type in the video, and the video type is at least one of a slow motion video, a regular motion video, or a fast motion video. When the video recorded by the electronic device always has a same fixed format, recognition and identification of such an electronic device or an electronic device of such a model can be improved.

In another possible design, before the recording a video, the method further includes the following steps: The electronic device collects, in a preview state, original video frames based on the original frame rate, and the electronic device buffers the original video frames collected within a latest T time, where T is a preset length. That the electronic device records a video specifically includes the following step: The electronic device generates the video based on the buffered original video frames and the preset format. In this solution, the electronic device may buffer the original video frames in advance, and generate the video based on the buffered original video frames, so that a high-speed moving process that the user wants to play in a slow motion mode can be recorded more effectively.

In another possible design, that the electronic device records a video specifically includes the following steps: The electronic device records a video of a first video type. After detecting a second video type indication, the electronic device switches to recording of a video of a second video type, where the first video type or the second video type is a slow motion video type. In this solution, the user may control a type and a format of a currently recorded video in real time.

In another possible design, that the electronic device records a video further includes the following step: After detecting a pause indication of the user, the electronic device pauses video recording; after detecting a video recording resumption indication of the user, the electronic device resumes video recording; or after detecting a stop indication of the user, the electronic device stops video recording. In this solution, the user may control duration of a currently recorded video in real time.

In another possible design, the method further includes the following steps: The electronic device stores the video; and after detecting a parameter information indication of the user, the electronic device displays parameter information of the video. The parameter information includes the video recording frame rate of the video. This may help the user learn of a video recording frame rate corresponding to a recorded video.

In another possible design, that the electronic device records a video includes the following steps: The electronic device collects original video frames based on the original frame rate; and interpolates at least one new video frame between different original video frames; and the electronic device generates the video based on the original video frames and the new video frame. In other words, the electronic device may increase the video recording frame rate through frame interpolation.

In another possible design, when a to-be-recorded video is of a slow motion type, that the electronic device records the video of the slow motion type may specifically include the following steps: The electronic device collects original video frames based on the original video frames; the electronic device interpolates n new video frames between two adjacent original video frames, where n is a positive integer; and the electronic device generates the video of the slow motion type based on the original video frames and the new video frames. When a video of the slow motion type needs to be recorded, the electronic device may increase the video recording frame rate through frame interpolation, thereby improving a play effect of the slow motion video.

In another possible design, that the electronic device interpolates n new video frames between two adjacent original video frames, where n is a positive integer specifically includes the following step: The electronic device divides each of a first original video frame and a second original video frame in two adjacent original video frames into q image blocks, where q is a positive integer. Then, the electronic device searches for an image block j within a preset range of a location that corresponds to an image block i of the first original video frame and that is in the second original video frame, where a residual between the image block j and the image block i is the smallest, the image block j is an image block matching the image block i, i is an integer from 1 to q, and j is a positive integer. The electronic device determines a motion vector of the image block based on the location that is of the image block matching the first original video frame and that is in the second original video frame. Then, the electronic device determines locations of image blocks in the n to-be-interpolated new video frames based on the motion vector of the image block. Next, the electronic device generates the n to-be-interpolated new video frames based on the locations of the image blocks in the n to-be-interpolated new video frames. Next, the electronic device interpolates the generated n new video frames between the first original video frame and the second original video frame. In this solution, the electronic device can accurately determine a motion vector by using matched image blocks, and generate a to-be-interpolated video frame based on the motion vector, to interpolate the new video frame in a manner of software, thereby reducing costs and facilitating maintenance.

In another aspect, an embodiment of this application provides a video recording method, including the following steps: First, an electronic device starts a camera. Then, the electronic device displays a video recording preview interface. The electronic device collects, in a preview state, original video frames based on an original frame rate. After detecting a video recording indication of a user, the electronic device generates a video based on buffered original video frames and a preset format. A video recording frame rate of the video is greater than the original frame rate, the original frame rate is a maximum frame rate supported by hardware of an image sensor during video recording, and the video includes a video of a slow motion type. In addition, a length of the video is a preset length, a format of the video is the preset format, the format includes a video type and a location of a video corresponding to the video type in the video, and the video type is at least one of a slow motion video, a regular motion video, or a fast motion video.

In another aspect, an embodiment of this application provides an electronic device. The electronic device includes an image sensor. The electronic device further includes a starting unit, configured to start a camera; a display unit, configured to display a video recording preview interface; and a recording unit, configured to record a video after a video recording indication of a user is detected, where a video recording frame rate of the video is greater than an original frame rate, the original frame rate is a maximum frame rate supported by hardware of the image sensor during video recording, and the video includes a video of a slow motion type.

In a possible design, the video further includes at least one of a video of a fast motion type or a video of a regular motion type, and the video recording frame rate of the video is a maximum value or an average value of a video recording frame rate of the video of the slow motion type, a video recording frame rate of the video of the slow motion type, and a video recording frame rate of the video of the slow motion type.

In another possible design, a length of the video is a preset length, a format of the video is a preset format, the format includes a video type and a location of a video corresponding to the video type in the video, and the video type is at least one of a slow motion video, a regular motion video, or a fast motion video.

In another possible design, the recording unit is specifically configured to: before recording the video, collect, in a preview state, original video frames based on the original frame rate; buffer the original video frames collected within a latest T time, where T is the preset length; and generate the video based on the buffered original video frames and the preset format.

In another possible design, the recording unit is specifically configured to: record a video of a first video type; and after a second video type indication is detected, switch to recording of a video of a second video type, where the first video type or the second video type is a slow motion video type.

In another possible design, the recording unit is specifically configured to: after a pause indication of the user is detected, pause video recording; after a video recording resumption indication of the user is detected, resume video recording; or after a stop indication of the user is detected, stop video recording.

In another possible design, the electronic device further includes a storage unit, configured to store the video after the recording unit records the video, where the display unit is further configured to: after a parameter information indication of the user is detected, display parameter information of the video, where the parameter information includes the video recording frame rate of the video.

In another possible design, the recording unit is specifically configured to: collect original video frames based on the original frame rate; interpolate at least one new video frame between different original video frames; and generate the video based on the original video frames and the new video frame.

In another aspect, an embodiment of this application provides an electronic device, including one or more processors and one or more memories. The one or more memories are coupled to the one or more processors, the one or more memories are configured to store computer program code, the computer program code includes a computer instruction, and when the one or more processors execute the computer instruction, the electronic device performs the video recording method in any possible design of either of the foregoing aspects.

In another aspect, an embodiment of this application provides a computer storage medium, including a computer instruction. When the computer instruction is run on an electronic device, the electronic device performs the video recording method in any possible design of either of the foregoing aspects.

In another aspect, an embodiment of this application provides a computer program product. When the computer program product is run on a computer, the computer performs the video recording method in any possible design of either of the foregoing aspects.

BRIEF DESCRIPTION OF DRAWINGS

FIG. 8-2A, FIG. 8-2B, FIG. 8-2C, FIG. 8-2D, and FIG. 8-2E are a schematic diagram of another video recording process according to an embodiment of this application;

FIG. 8-3A, FIG. 8-3B, FIG. 8-3C, and FIG. 8-3D are a schematic diagram of another video recording process according to an embodiment of this application;

FIG. 10-1A, FIG. 10-1B, FIG. 10-1C, and FIG. 10-1D are a schematic diagram of another video recording process according to an embodiment of this application;

FIG. 10-2A, FIG. 10-2B, FIG. 10-2C, and FIG. 10-2D are a schematic diagram of another video recording process according to an embodiment of this application;

FIG. 11-1 is a schematic diagram of a setting interface according to an embodiment of this application;

FIG. 11-2A, FIG. 11-2B, FIG. 11-2C, and FIG. 11-2D are a schematic diagram of another setting interface according to an embodiment of this application;

FIG. 14-1A and FIG. 14-1B are a schematic diagram of another video recording process according to an embodiment of this application;

FIG. 14-2A and FIG. 14-2B are a schematic diagram of another video recording process according to an embodiment of this application;

FIG. 16-1 is a schematic diagram of a play process according to an embodiment of this application;

FIG. 16-2 is a schematic diagram of a play process according to an embodiment of this application;

FIG. 17-1A, FIG. 17-1B, and FIG. 17-1C are a schematic diagram of displaying parameter information according to an embodiment of this application;

FIG. 17-2A, FIG. 17-2B, and FIG. 17-2C are another schematic diagram of displaying parameter information according to an embodiment of this application;

DESCRIPTION OF EMBODIMENTS

For ease of understanding, description of some concepts related to the embodiments of this application is provided as an example for reference. Details are as follows:

Original frame rate: a maximum quantity, supported by hardware of an image sensor during video recording, of video frames that can be collected per unit time.

Video recording frame rate: a quantity of video frames recorded by an electronic device per unit time. In the embodiments of this application, when frame interpolation exists, the video recording frame rate is a total quantity of video frames recorded per unit time after the frame interpolation, and is greater than the original frame rate.

Play frame rate: a quantity of video frames that are played by the electronic device per second during video play.

The following describes the technical solutions in the embodiments of this application with reference to the accompanying drawings in the embodiments of this application. In description of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the description of the embodiments of this application, "a plurality" means two or more than two.

A video recording method provided in the embodiments of this application may be applied to any electronic device that can record a video by using a camera, for example, a mobile phone, a tablet computer, a wearable device, an in-vehicle device, an augmented reality (AR)/virtual reality (VR) device, a notebook computer, an ultra-mobile personal computer (UMPC), a netbook, or a personal digital assistant (PDA), and this is not limited in the embodiments of this application.

Figure 2:
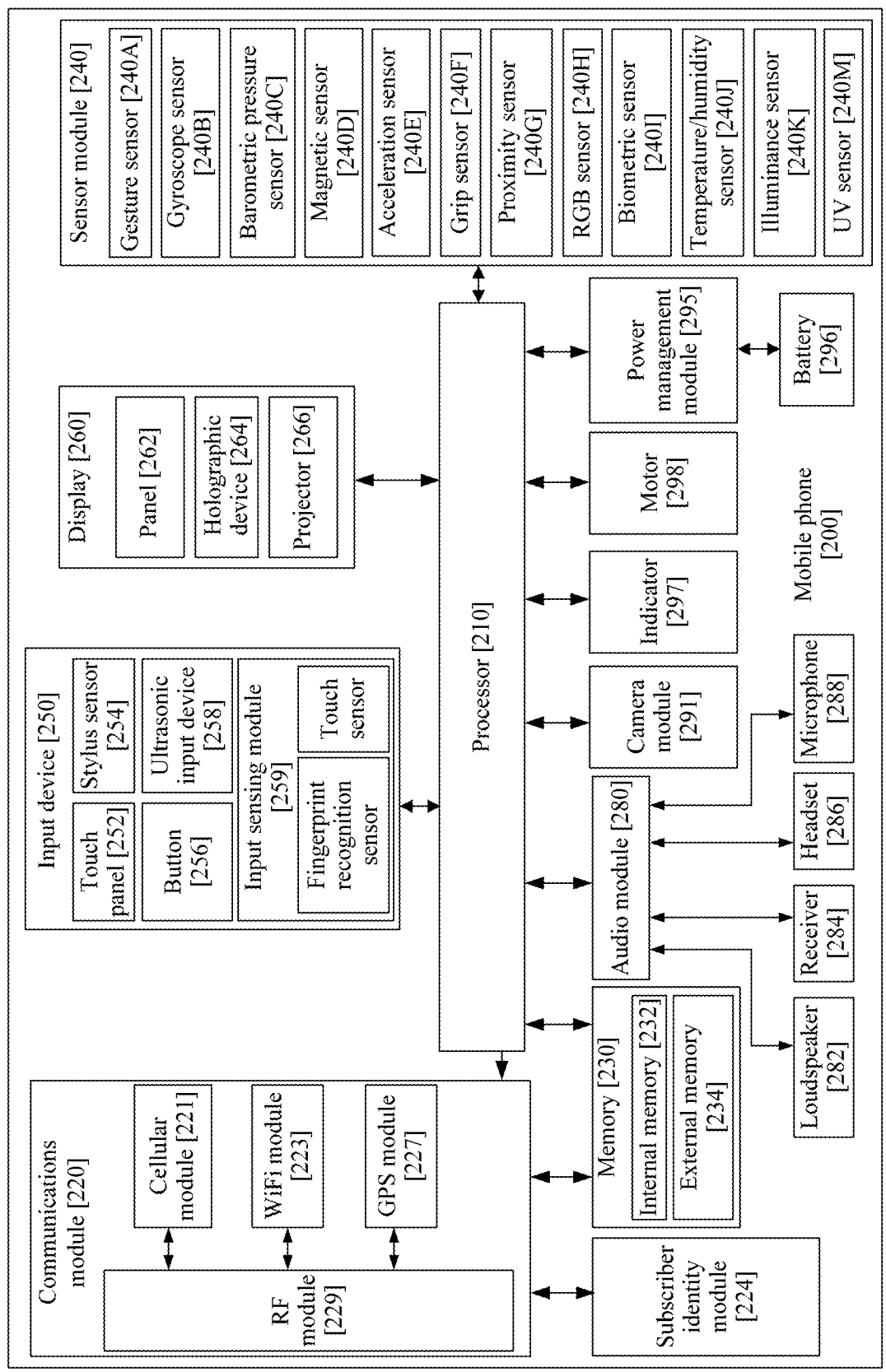
FIG. 2 is a schematic hardware structural diagram of a mobile phone according to an embodiment of this application.

Using a mobile phone as an example of the electronic device in the embodiments of this application, a universal hardware architecture of the mobile phone is described. As shown in FIG. 2, a mobile phone 200 may include a communications module 220, a memory 230, a sensor module 240, an input device 250, a screen 260, an audio module 280, a processor 210, a camera module 291, a power management module 295, and the like. These components may be connected by using a bus, or may be directly connected. A person skilled in the art may understand that a structure of the mobile phone shown in FIG. 2 does not constitute a limitation on the mobile phone. The mobile phone may include more components than those shown in FIG. 2, or some components may be combined, or a different component arrangement may be used.

The camera module 291 may be configured to collect an image by using a camera, to take a picture, record a video, make a video chat, attend a video conference, scan a quick response code/barcode, perform facial information recognition, and the like. Video recording may include slow motion video recording, regular motion video recording, fast motion video recording, or the like.

The communications module 220 is configured to communicate with another network entity, for example, receive information from a server, or send related data to a server. The communications module 220 may include a radio frequency (RF) module 229, a cellular module 221, a wireless fidelity (Wi-Fi) module 223, a GPS module 227, and the like. The RF module 229 may be configured to receive and send signals in an information receiving and sending process or a call process. Particularly, the RF module 229 sends received information to the processor 210 for processing, and sends a signal generated by the processor 210. Usually, the RF circuit 21 may include but is not limited to: an antenna, at least one amplifier, a transceiver, a coupler, a low noise amplifier (LNA), a duplexer, and the like. In addition, the RF circuit 21 may further communicate with a network and another device through wireless communication. The cellular module 221 and the Wi-Fi module 223 may be configured to connect to a network. The GPS module may be configured to perform positioning or navigation.

The processor 210 is a control center of the mobile phone 200, connects parts of the entire mobile phone by using various interfaces and lines, and performs various functions of the mobile phone 200 and processes data by running or executing a software program and/or a module stored in the memory 230 and invoking data stored in the memory 230, to perform overall monitoring on the mobile phone 200. During specific implementation, in an embodiment, the processor 210 may include one or more processing units.

The memory 230 may be configured to store data, a software program, and a module, and may be a volatile memory (such as a random access memory (RAM), or a non-volatile memory (such as a read-only memory (ROM), a flash memory, a hard disk drive (HDD), or a solid-state drive (SSD), or a combination of the foregoing types of memories. Specifically, the memory 230 may store program code, and the program code is used to allow the processor 210 to execute the program code, so as to perform the prompt information display method provided in the embodiments of this application. The memory 230 may include an internal memory 232 and an external memory 234.

The sensor module 240 may include a gesture sensor 240A, a gyroscope sensor 240B, a barometric pressure sensor 240C, a magnetic sensor 240D, an acceleration sensor 240E, and the like, and may be configured to detect values of acceleration of the mobile phone in various directions (generally on three axes). The sensor module 240 may detect a value and a direction of gravity when the sensor module 240 is static, and may be applied to an application that recognizes posture (for example, an angle of inclination of the mobile phone, facing up, lying on one side, switching between landscape orientation and portrait orientation, a related game, and magnetometer posture calibration or motion) of the mobile phone, a vibration recognition related function (such as a pedometer, a knock, or a motion), and the like. It should be noted that the mobile phone 200 may further include another sensor, for example, a grip sensor (which may be configured to detect whether the mobile phone is in a handheld state), a proximity sensor (which may be sensitive to an approaching object by using a displacement sensor, to identify proximity of the object), an RGB sensor, a biometric sensor, a temperature/humidity sensor, an optical sensor (which may be configured to detect whether the mobile phone is in a pocket, bag, or the like), or a UV sensor. Details are not described herein.

The input device 250 may include a touch panel (TP) 252, a stylus sensor 254, a button 256, an ultrasonic input device 258, an input sensing module 259, and the like, to implement input and output functions of the mobile phone 200.

The screen 260 may include devices such as a display panel 262, a holographic device 264, and a projector 266. The display panel 262 may be configured to display a graphical user interface (GUI) on the mobile phone, where the graphical user interface includes various application icons, service icons, widgets, identifiers, or the like. Specifically, the screen 260 may be an LCD screen, an OLED screen, or the like having a touch function.

The touch panel 252 and the display panel 262 may also be referred to as a touchscreen. The touchscreen may collect a touch operation (for example, an operation of a user on or near the touchscreen by using any suitable object or accessory such as a finger or a stylus) of the user on or near the touchscreen, and drive a corresponding connection apparatus according to a preset program. The touchscreen may be further configured to display information entered by the user or information (for example, an image collected by using the camera) provided for the user, and various menus of the mobile phone. For example, the touchscreen may be implemented by using a plurality of types such as a resistive touchscreen, a capacitive touchscreen, an infrared touchscreen, or an ultrasonic touchscreen, and this is not limited in the embodiments of the present invention.

An operation of the user near the touchscreen may be referred to as floating touch, and a touchscreen on which floating touch can be performed may be implemented by using a capacitive touchscreen, an infrared touchscreen, an ultrasonic touchscreen, and the like. For example, when a target such as a finger approaches or goes away from the capacitive touchscreen, currents of self capacitance and mutual capacitance on the touchscreen may change, so that the electronic device can detect floating touch. For another example, the infrared touchscreen may emit light by using an infrared LED and an infrared light emitting diode, and the mobile phone recognizes and tracks a floating gesture by detecting screen light reflected by a target such as a finger of the user.

The audio module 280 may include a loudspeaker 282, a receiver 284, a headset 286, a microphone 288, or the like, so that the user collects and plays an audio signal.

The power management module 295 may include a battery 296, configured to logically connect to the processor 210 by using a power management system, so as to implement functions such as charging, discharging, and power consumption management by using the power management system.

In addition, the mobile phone 200 may further include function modules such as a subscriber identity module, an indicator, and a motor, and details are not described herein.

The following describes, in detail by using specific embodiments, the video recording method provided in this application.

Figure 3:
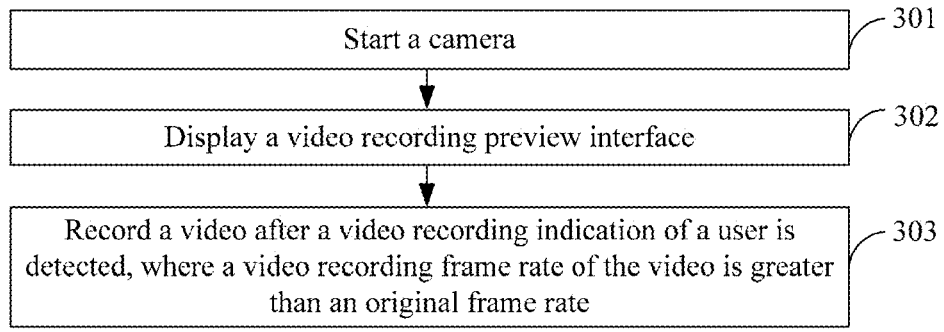
FIG. 3 is a flowchart of a video recording method according to an embodiment of this application.

Referring to FIG. 3, an embodiment of this application provides a video recording method. The method may be applied to an electronic device having an image sensor, and the method may include the following steps.

301. The electronic device starts a camera.

When needing to record a video, a user may instruct the electronic device to start the camera. For example, the user may instruct, by tapping a camera icon, the electronic device to start the camera, or the user may instruct, in a manner of voice, the electronic device to start the camera, or the user may instruct, by drawing a "C"-shaped track on a screen in a black screen state, the electronic device to start the camera, and this embodiment of this application does not limit a manner of triggering the electronic device to start the camera.

302. The electronic device displays a video recording preview interface.

Figure 4A:
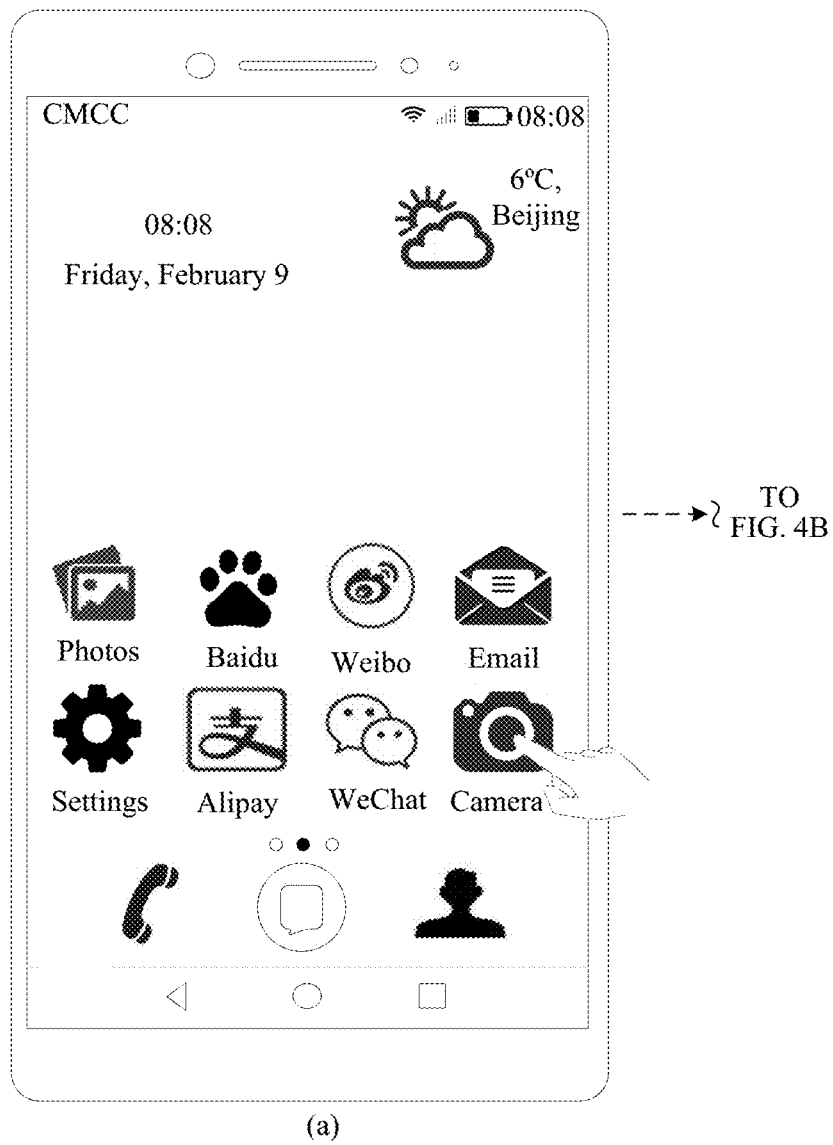
FIG. 4A, FIG. 4B, and FIG. 4C are a schematic diagram of a video recording process according to an embodiment of this application.
Figure 4B:
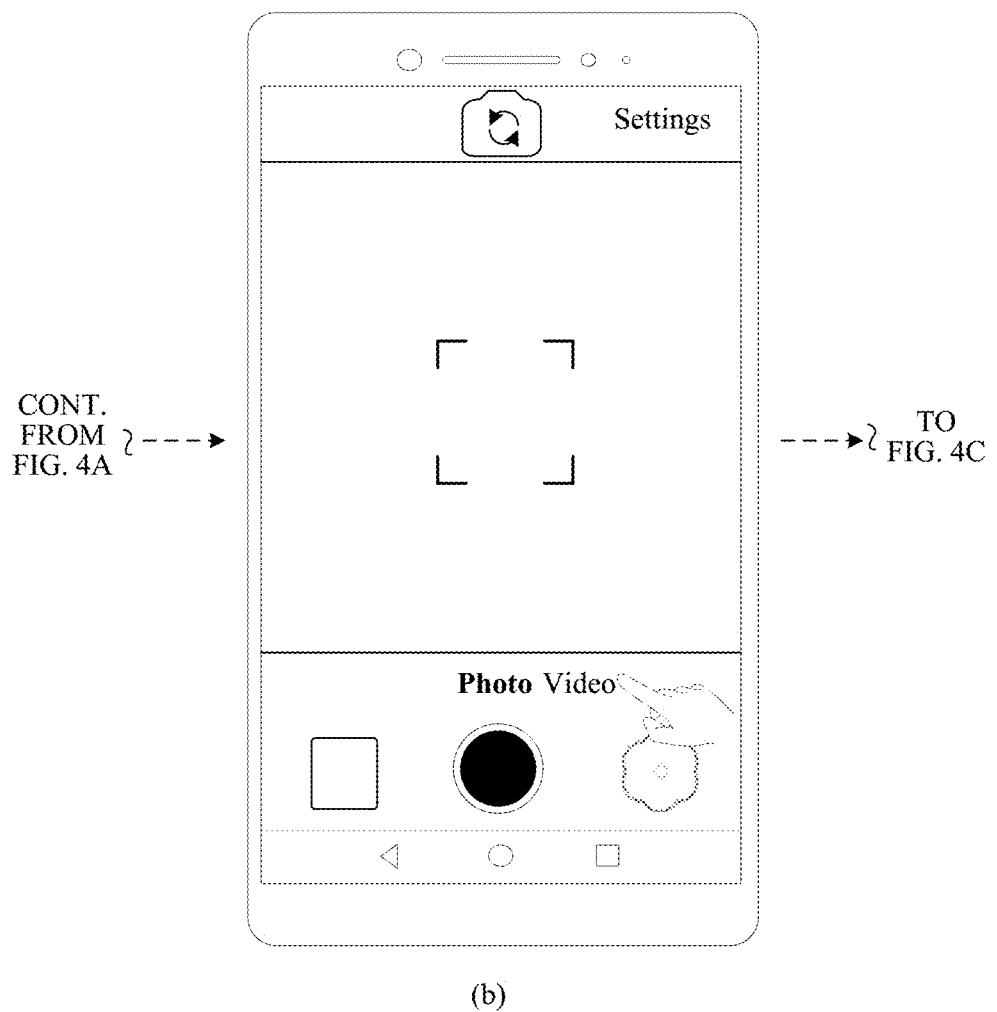
Figure 4C:
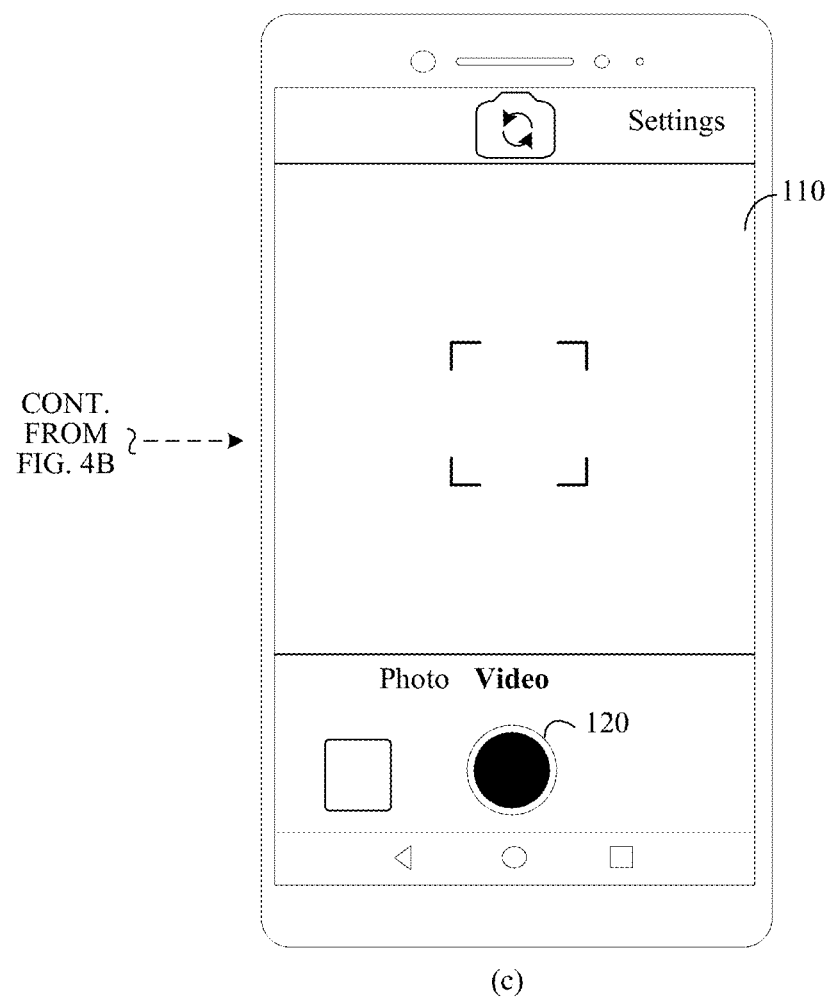

For example, referring to FIG. 4A, FIG. 4B, and FIG. 4C, if the electronic device directly enters a photo mode or another non-video mode after starting the camera, the user may instruct to switch to a video mode, and in this case, the electronic device starts a video recording preview interface 110.

Figure 5A:
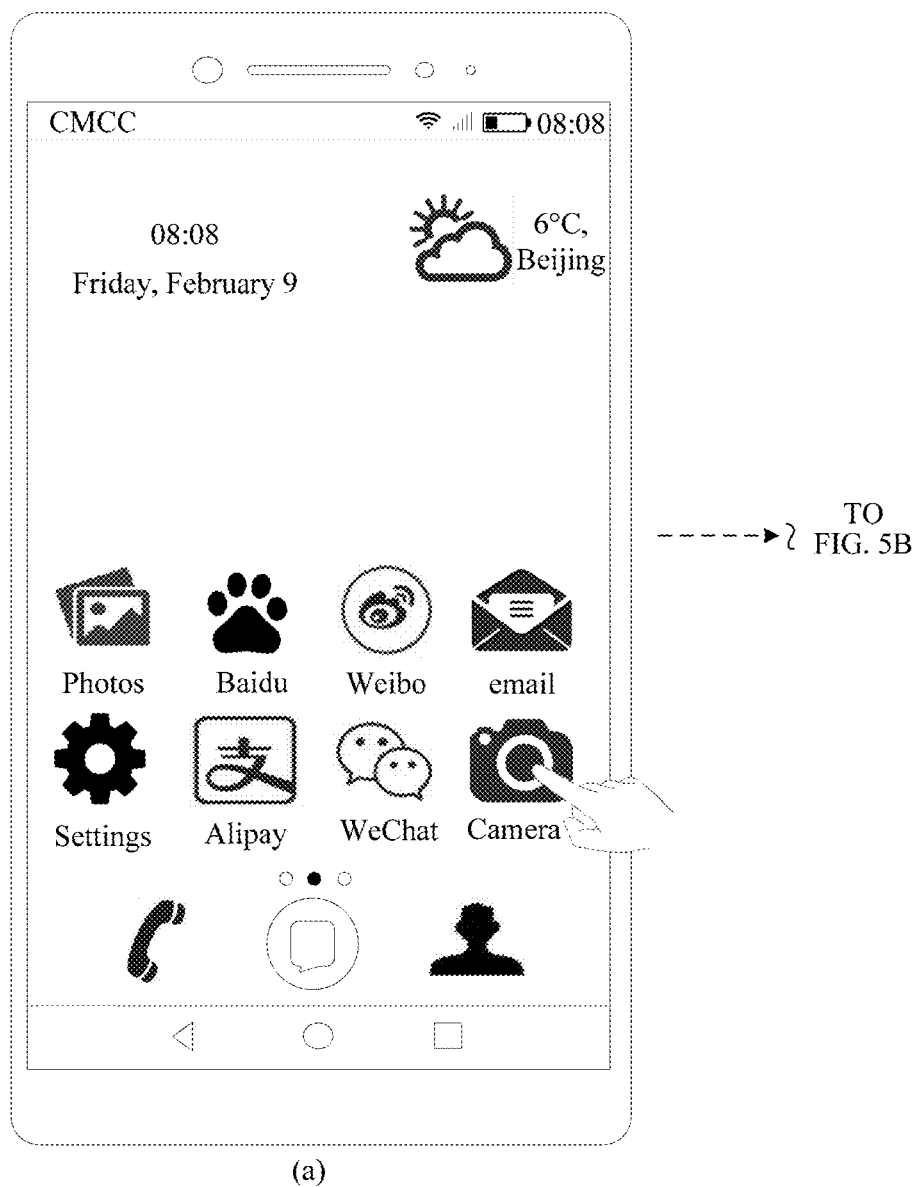
FIG. 5A and FIG. 5B are a schematic diagram of another video recording process according to an embodiment of this application.
Figure 5B:
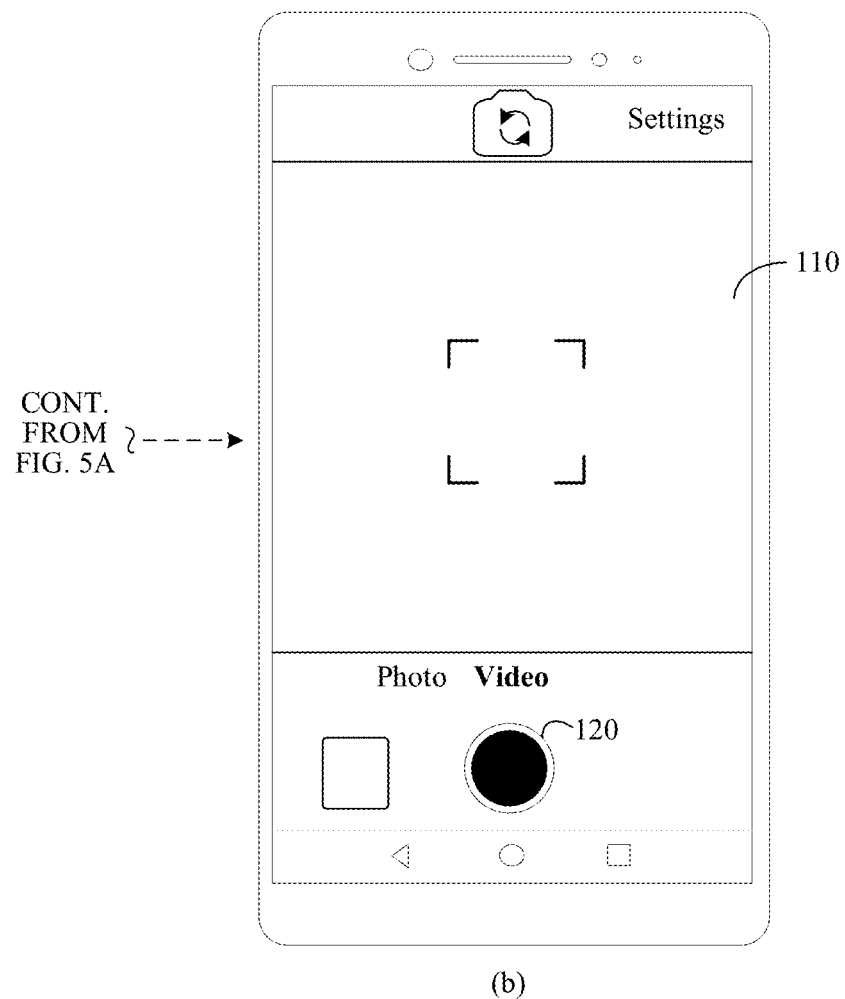

For example, referring to FIG. 5A and FIG. 5B, if the electronic device directly enters a video mode (for example, the electronic device enters the video mode by default after starting the camera, or the electronic device is in the video mode when the user previously uses the camera), the electronic device directly starts the video recording preview interface 110. On the video recording preview interface, the user may preview a to-be-photographed object.

303. The electronic device records a video after detecting a video recording indication of a user, where a video recording frame rate of the video is greater than an original frame rate, the original frame rate is a maximum frame rate supported by hardware of the image sensor during video recording, and the video includes a video of a slow motion type.

The electronic device starts to record the video after detecting the video recording indication of the user. The video recording indication may be in a plurality of forms, for example, may be a voice indication, or may be an indication generated when the user taps a recording button 120 in FIG. 4C or FIG. 5B, and this is not limited in this embodiment of this application.

In this embodiment of this application, the video recording frame rate of the video is greater than the original frame rate. In other words, the video recording frame rate of the electronic device is not limited by a hardware capability of the image sensor in the electronic device. For example, if the maximum frame rate supported by the hardware of the image sensor used by the electronic device is 240 fps, an actual video recording frame rate used when the electronic device records a video may be greater than 240 fps.

Specifically, the maximum frame rate that can be supported by the hardware of the image sensor used in the electronic device may be learned based on a model of the image sensor, a data manual, a specification parameter, and the like. An overall average video recording frame rate of the video recorded by the electronic device and an actual video recording frame rate of the video within each time period may be obtained through testing.

During recording of a slow motion video, a higher video recording frame rate indicates a larger quantity of video frames recorded by the electronic device per unit time, more moving details presented on the video frames, and smaller jerkiness between image details of different video frames. Under the premise of a same play frame rate, a higher video recording frame rate indicates longer play duration, so that the user has a more sufficient time to clearly see more moving details of a high-speed motion.

Therefore, in this embodiment of this application, when the video recording frame rate of the electronic device is greater than the maximum video recording frame rate supported by the hardware of the image sensor, the video recording frame rate of the electronic device may be higher, so that a slow motion video in the video recorded by the electronic device can better meet a requirement of the user for identifying a high-speed moving process.

Figure 6:
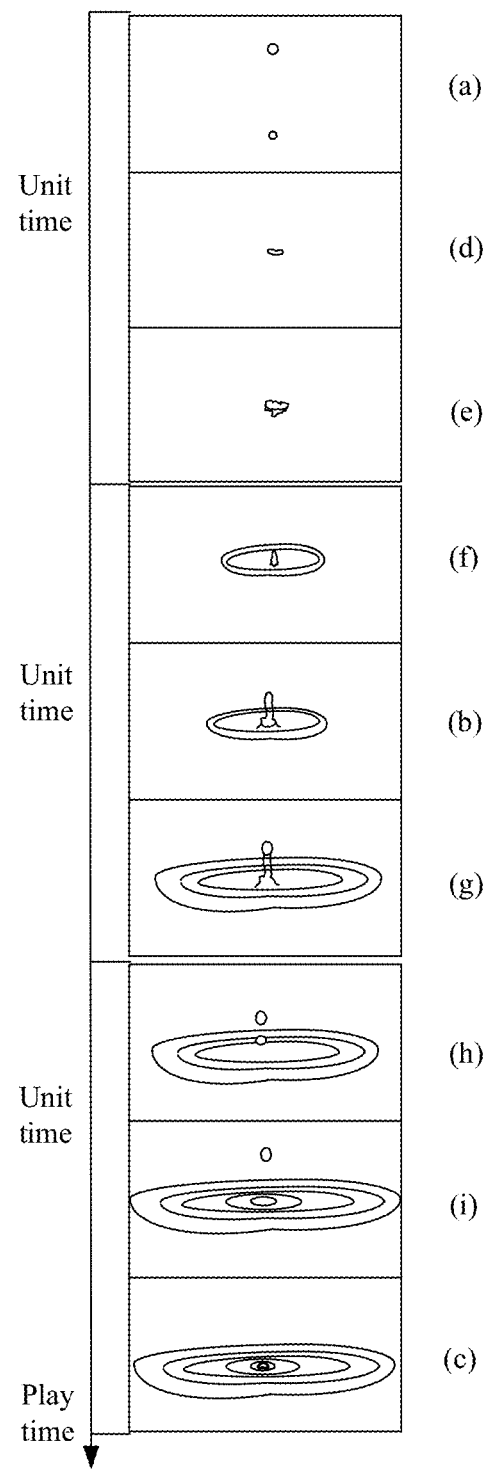
FIG. 6 is a schematic diagram of a play effect of a slow motion video according to an embodiment of this application.

For example, during recording of a process in which a water drop falls and bounces, actual collision and bouncing happen instantly (for example, within 0.1 second (s)). If a recording frequency of 240 tps and a play frame rate of 30 tps in the prior art are used, a moving process happening within 0.1 s is played within 0.8 s. For a schematic diagram of a slow motion play effect, refer to FIG. 1. In this embodiment of this application, if the video recording frame rate is greater than +240 tps, for example, is 960 tps, a moving process happening within 0.1 s is played within 3.2 s. For example, for a schematic diagram of a play effect of the slow motion video recorded by using the video recording method provided in this embodiment of this application, refer to FIG. 6. It can be learned by comparing FIG. 6 and FIG. 1 that in FIG. 6, the user can more clearly see moving details about a process in which the water drop collides and bounces when falling down.

In the video recording method provided in this embodiment of this application, that the video recording frame rate of the electronic device is greater than the maximum frame rate supported by the hardware of the image sensor is equivalent to that a video recording capability of the image sensor is extended. When the electronic device uses an image sensor (for example, an image sensor whose original frame rate is 30 fps or 60 fps) having a relatively low hardware configuration, the video recording frame rate may be increased to 960 tps or higher, so that a requirement of the user for recording a slow motion video can be met, and video recording experience of the user can be improved.

In addition, there is a three-layered image sensor in the prior art, and a layer of dynamic random access memory (DRAM) is further included between a pixel section and a circuit section. The DRAM may be used to temporarily store recorded image data, so that the image sensor can process more image frames per unit time, and a maximum frame rate supported by hardware of the three-layered image sensor may reach 960 fps. However, even if the electronic device uses the three-layered image sensor having a high hardware configuration, the video recording frame rate of the electronic device can only be the maximum frame rate supported by the hardware of the image sensor, and cannot exceed the maximum frame rate supported by the hardware of the image sensor. In addition, due to a limitation of a storage capability of the DRAM, the electronic device using the special three-layered image sensor has a short video recording time (for example, only a 0.2 s video can be recorded) and low resolution (which is, for example, only 720 p), and it is difficult to meet a video recording requirement of the user.

However, in this embodiment of this application, the video recording frame rate of the electronic device may be greater than the maximum frame rate supported by the hardware of the image sensor, the limitation of the storage capability of the hardware, namely the DRAM, does not need to be considered, video recording duration and resolution are not limited (for example, video recording duration may be more than 10 minutes or longer, and the resolution may be 1080 p or higher), and a common image sensor including no DRAM is also applicable.

When recording the video, the electronic device first may record original video frames based on the original frame rate, and then perform frame interpolation between adjacent original video frames based on the original video frames, so that the video recording frame rate is greater than the original frame rate. Specifically, when recording a video of a slow motion type, the electronic device may increase the video recording frame rate through frame interpolation, and when recording a video of a non-slow motion type, the electronic device does not perform frame interpolation processing, and records the video by using the original frame rate.

In this embodiment of this application, in addition to the video of the slow motion type, the video recorded by the electronic device may further include at least one of a video of a fast motion type or a video of a regular motion type. The fast motion type may further include time-lapse photography. To be specific, the video recorded by the electronic device may be a combination of videos of different video types.

Figure 7:
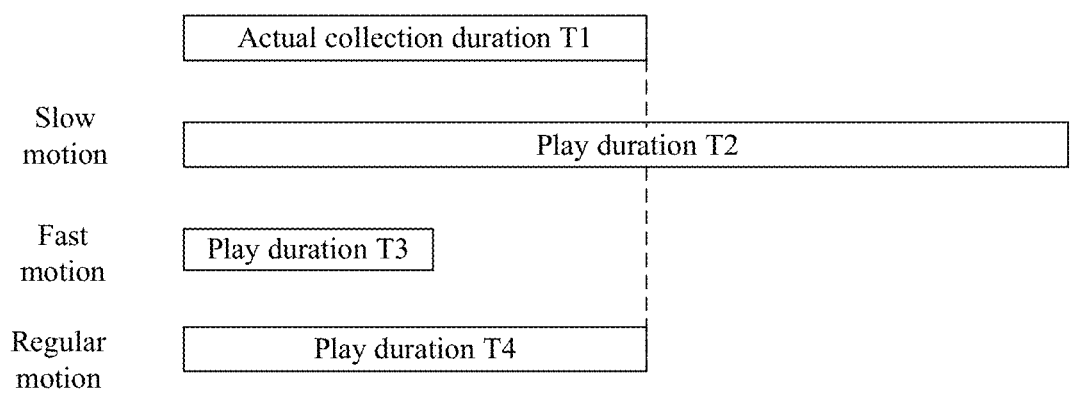
FIG. 7 is a diagram of comparison between a slow motion video, a regular motion video, and a fast motion video according to an embodiment of this application.

Referring to FIG. 7, the video of the slow motion type may be understood as that video frames collected within a T1 time period are played within a T2 time period, where T1<T2. Corresponding to the video of the slow motion type, the video of the fast motion type may be understood as that video frames collected within the T1 time period are played within a T3 time period, where T1>T3. The video of the regular motion type is recorded and played based on a normal time relationship, and may be understood as that video frames collected within the T1 time period are played within the T1 time period. When recording the video of the fast motion type, the electronic device may perform evenly-spaced frame extraction processing on the original video frames collected based on the original frame rate, to generate the video of the fast motion type based on video frames obtained after frame extraction.

It should be noted that when the video is a combination of videos of different types, actions played in the video are sometimes fast and sometimes slow, so that a powerful visual impact can be exerted on the user, and a sense of shock and recording experience of the user can be improved.

For the video recording frame rate of the video, when the recorded video includes only the video of the slow motion type, the entire video is a slow motion video, the video recording frame rate of the video is a video frame rate of the video of the slow motion type, and the video frame rate of the video of the slow motion type is greater than the original frame rate. When the recorded video includes a video of another type other than the video of the slow motion type, a frame rate of the video may be a maximum value in video recording frame rates respectively corresponding to videos of different types, or may be an average value of video recording frame rates respectively corresponding to videos of different types. Specifically, the maximum value in the video recording frame rates respectively corresponding to the videos of different types is the video recording frame rate corresponding to the video of the slow motion type.

Because in this embodiment of this application, the video includes a slow motion video, which is different from a normal regular motion video mode, the electronic device may have a plurality of video modes. For example, referring to FIG. 8-1A, FIG. 8-1B, and FIG. 8-1C, the video modes may specifically include a first video mode and a second video mode, and the first video mode is used to record a normal regular motion video. When the user selects the second video mode, the electronic device records a video by using the method provided in this embodiment of this application, and a video recording frame rate is greater than the original frame rate. For another example, referring to FIG. 8-2A, FIG. 8-2B, FIG. 8-2C, FIG. 8-2D, and FIG. 8-2E, in a video mode, the user may tap a setting button, to open settings related to video recording and select one mode from a plurality of specific video modes. For example, when the user selects a super video mode (or a super slow motion video mode), a video recording preview interface of the super video mode is displayed, the electronic device records a video by using the method provided in this embodiment of this application, and a video recording frame rate is greater than the original frame rate. For another example, referring to FIG. 8-3A, FIG. 8-3B, FIG. 8-3C, and FIG. 8-3D, in a non-video mode after the camera is started, the user may tap a setting button, to open settings related to photographing and video recording, select a super video mode from a plurality of specific video modes, display a video recording preview interface of the super video mode, and record a video by using the method provided in this embodiment of this application.

Figure 9:
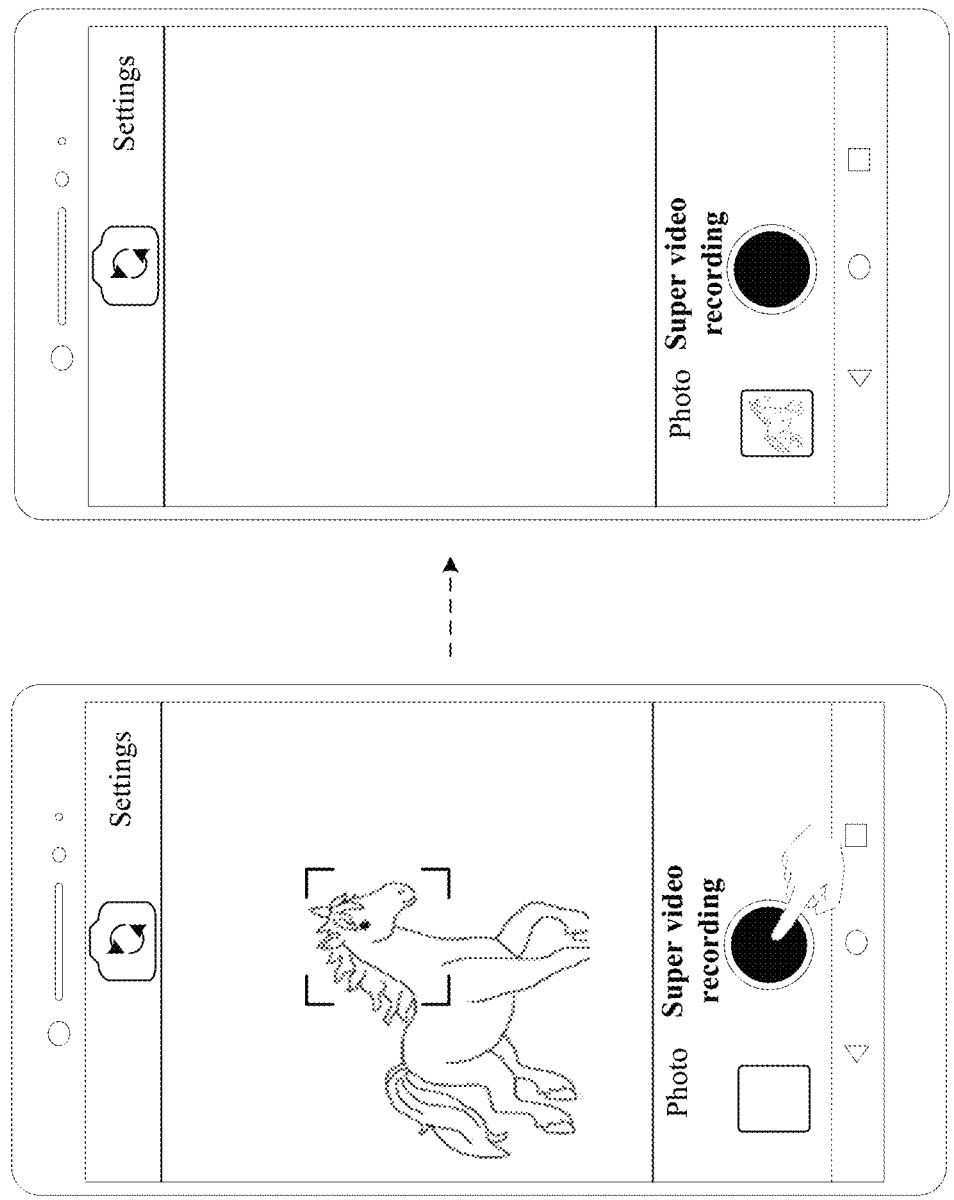
FIG. 9 is a schematic diagram of another video recording process according to an embodiment of this application.
Figures 1A, 10:
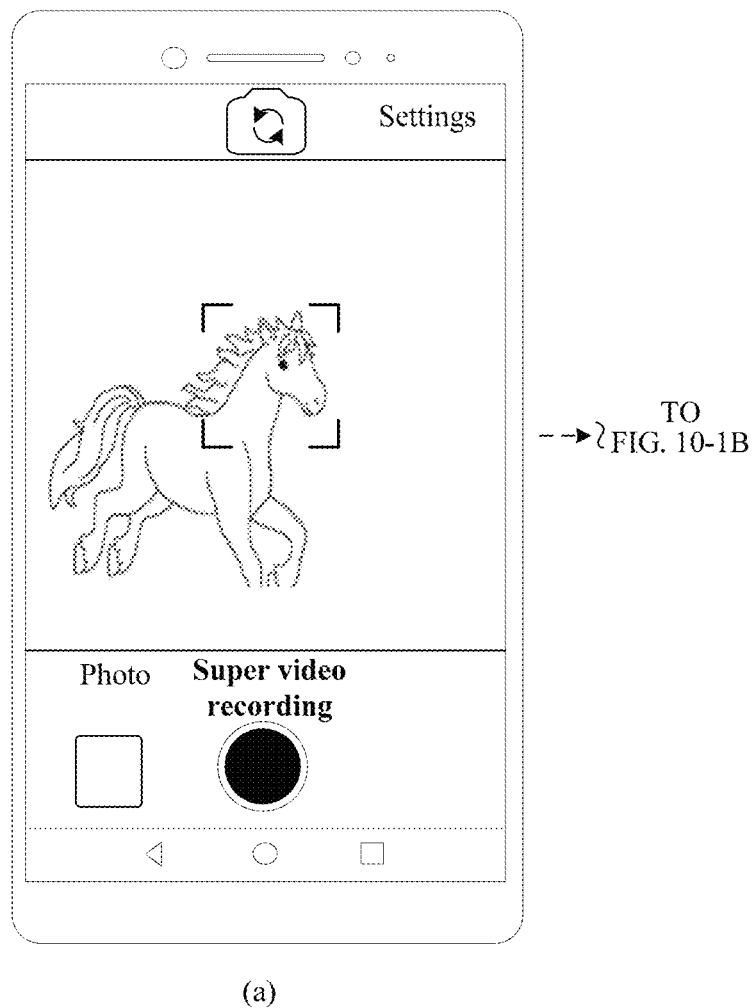
Figures 1B, 10:
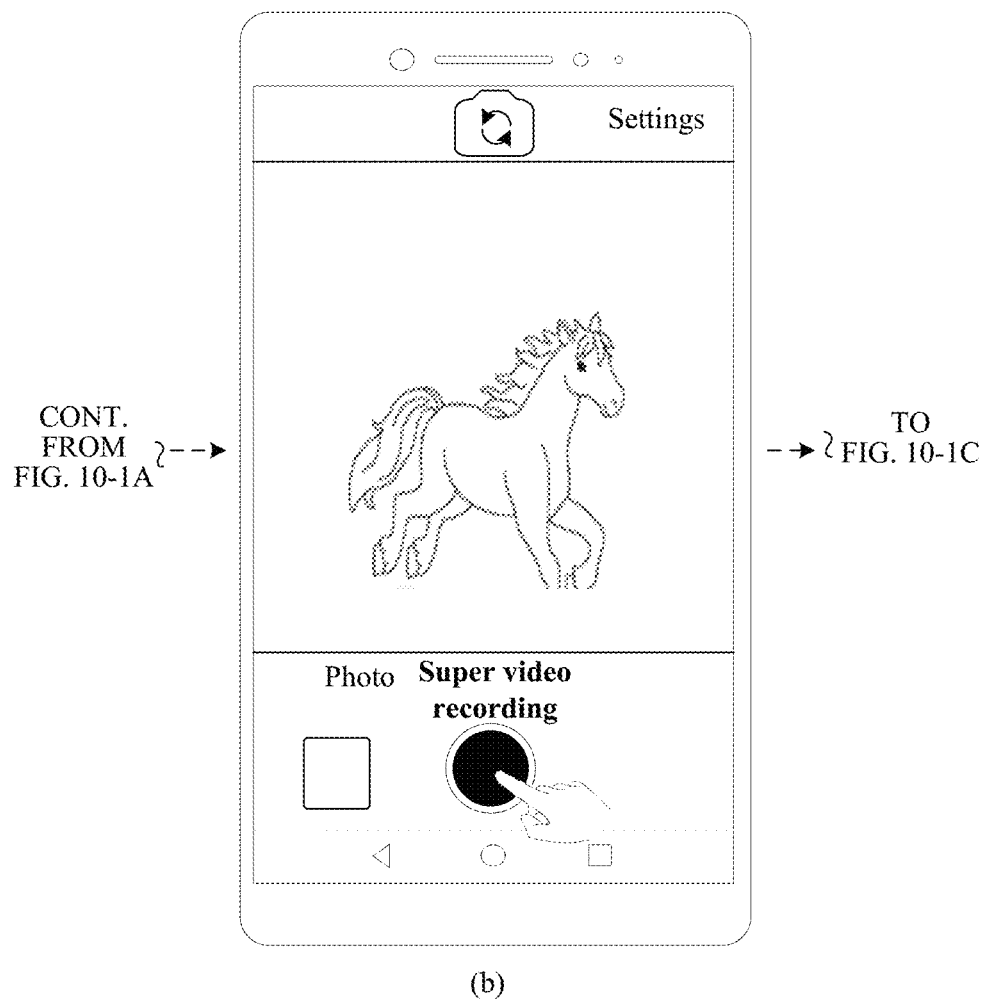
Figures 1C, 10:
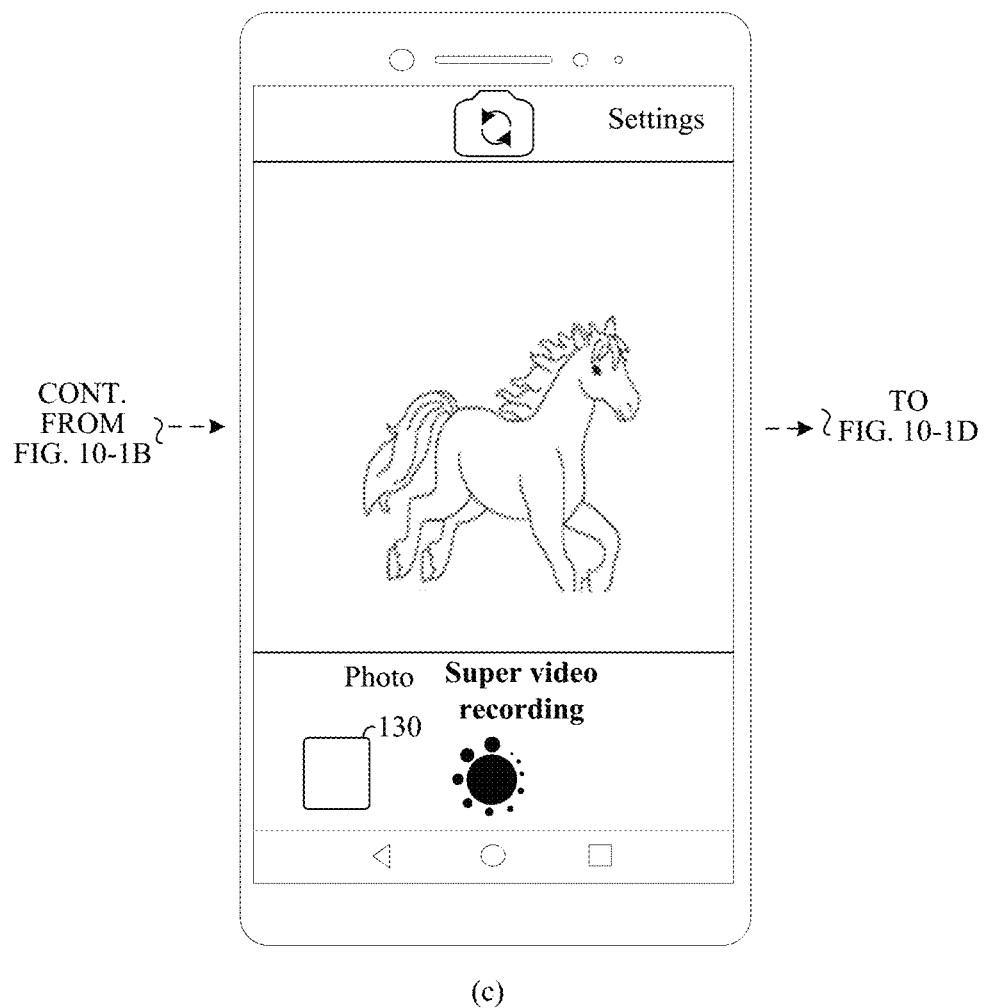
Figures 1D, 10:
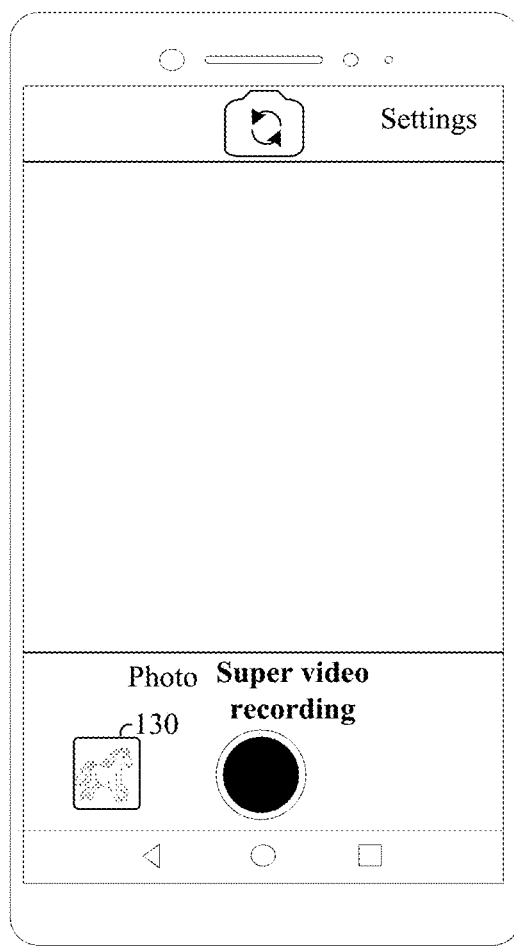
Figures 2A, 10:
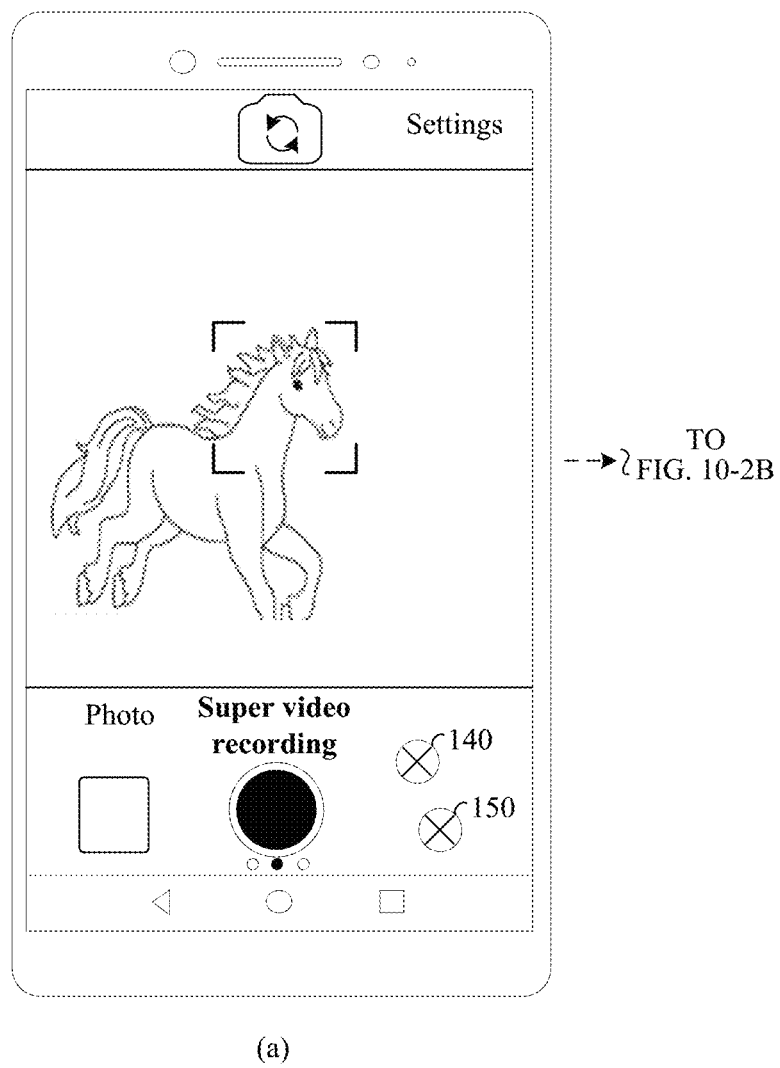
Figures 2B, 10:
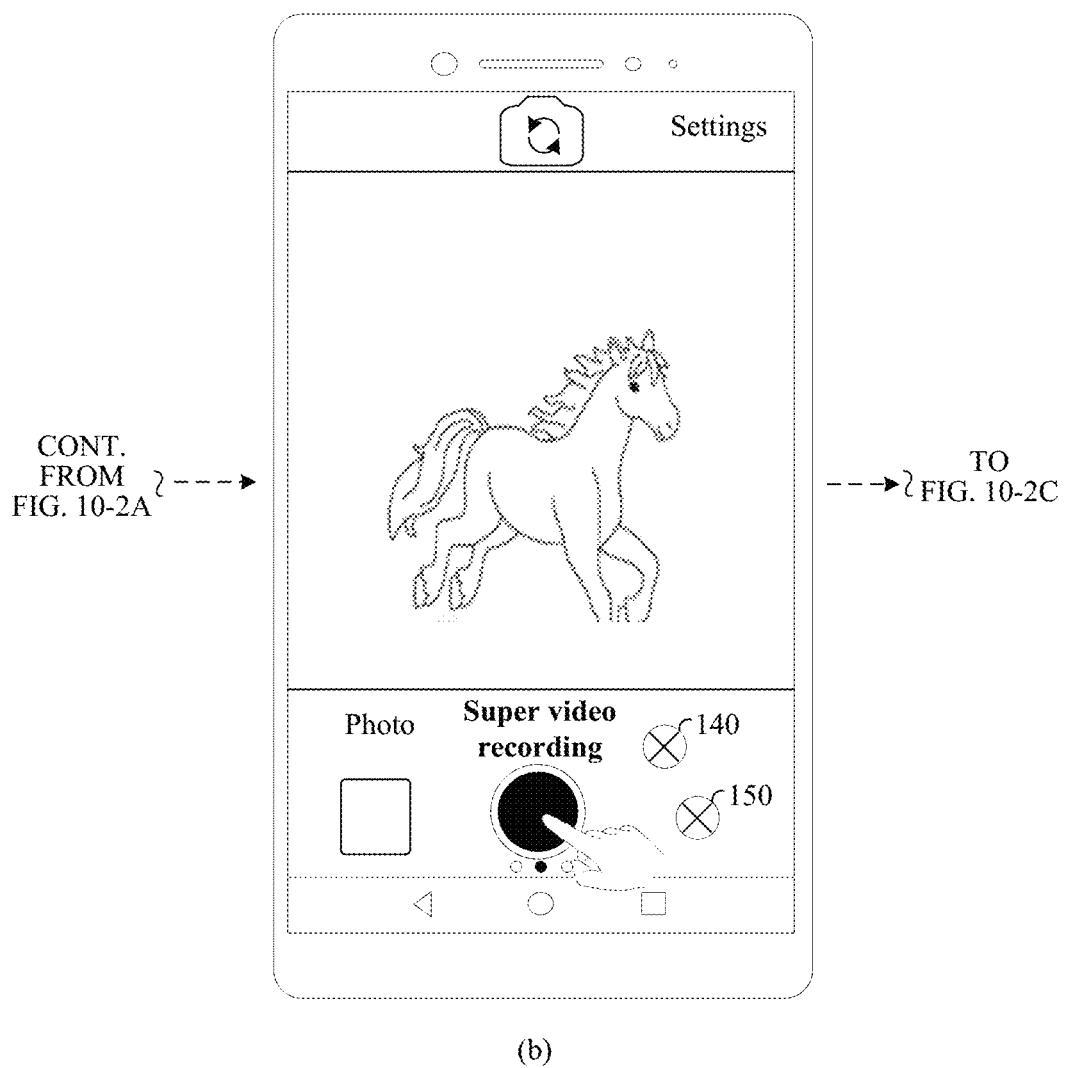
Figures 2C, 10:
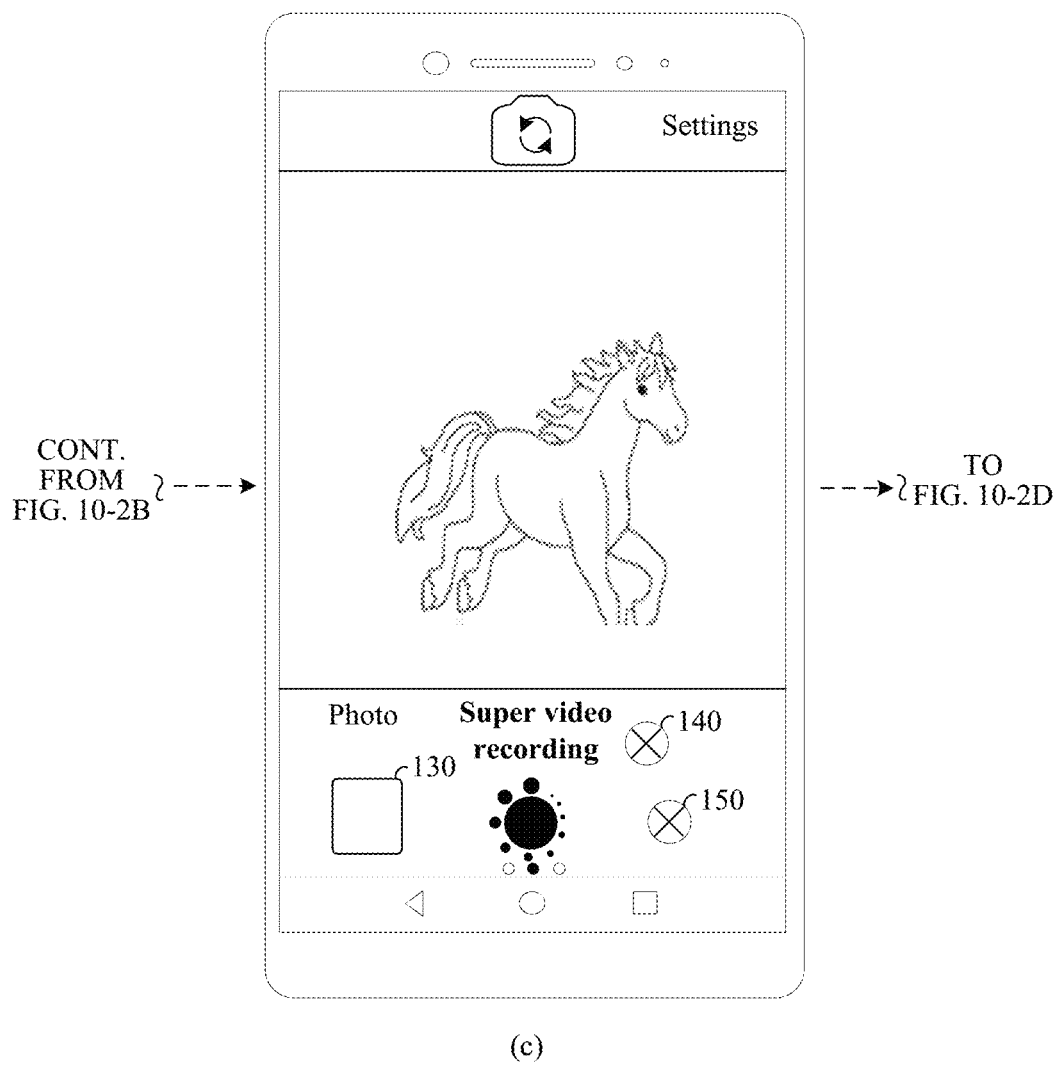
Figures 2D, 10:
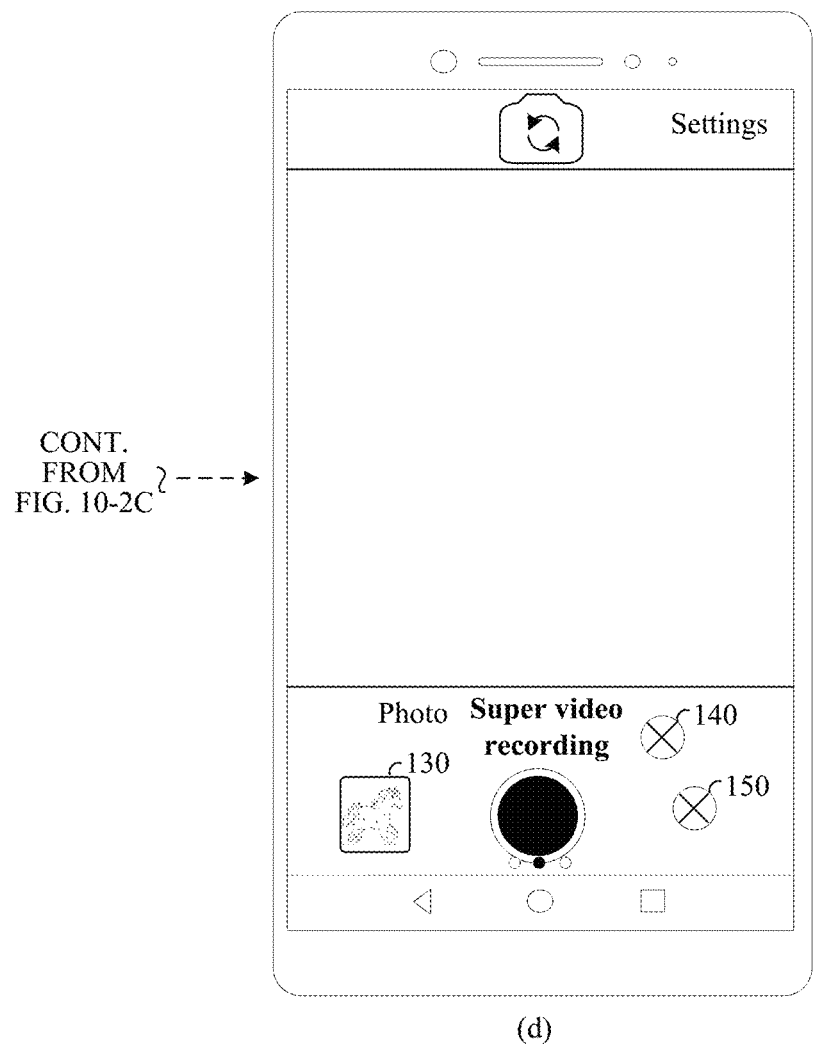

In a possible design, duration of the video recorded by the electronic device may be preset duration, and the preset length may be preset during delivery of the electronic device, or may be preset by the user. When the video is of the preset length, the user only needs to trigger a video recording indication, and recording of the video may be automatically completed without a need to trigger a stop indication. Therefore, manual operations of the user can be reduced, and better intelligent recording experience can be provided for the user. In this design, for example, referring to FIG. 9, the electronic device may include only a recording button and does not include a pause button or a stop button.

The preset length may be relatively short, for example, may be less than or equal to one minute, to meet a requirement of the user for automatically recording a short video. In addition, because some sharing platforms limit video duration (for example, WeChat requires that video duration should not exceed 10 s), when the video is of the preset length, the preset length may be less than or equal to duration limited by the sharing platform. This helps the user upload and share the video.

In a possible implementation, in step 303, the electronic device may generate the video based on buffered original video frames. Before step 303, the electronic device may further collect, in a preview state, the original video frames based on the original frame rate, and buffer the original video frames collected within a latest T time.

There is a time difference from a time when the user finds that the user wants to record a moving process to a time when the user triggers a video recording indication. When the user triggers a slow motion type indication, a to-be-recorded moving process may have started for a time period, and especially when the moving process is a high-speed moving process, the to-be-recorded moving process may already end. Therefore, the electronic device may buffer the original video frames a T time period in advance, and generate the video based on the buffered original video frames, so that the high-speed moving process that the user wants to play in a slow motion mode can be more effectively recorded. A manner in which the electronic device buffers video frames a time period in advance can improve use experience of the user during recording of an instant high-speed moving object. When a length of the video of the electronic device is the preset length, T may be the preset length.

For example, for a schematic diagram of a recoding process corresponding to this implementation, refer to FIG. 10-1A, FIG. 10-1B, FIG. 10-1C, and FIG. 10-1D, and FIG. 10-2A, FIG. 10-2B, FIG. 10-2C, and FIG. 10-2D. It should be noted that because after the user taps a recording button in (b) of FIG. 10-1B, and FIG. 10-2B to instruct to record a video, it takes a time for the electronic device to generate the video based on the buffered original video frames and the preset format, referring to (c) of FIG. 10-1C and FIG. 10-2C, after the electronic device taps the recording button, the electronic device may not immediately generate the video and display the generated video on a location 130, and referring to (d) of FIG. 10-1D and FIG. 10-2D, the electronic device displays the generated video on the area 130 only after a moment, to prompt the user that video recording is completed. In addition, referring to (a) of FIG. 10-1A and FIG. 10-2A, because the original video frames need to be buffered in advance, the electronic device needs to aim at, in a preview state, a photographed object, to perform real-time image collection.

In addition, in FIG. 10-2A, FIG. 10-2B, FIG. 10-2C, and FIG. 10-2D, when the user taps a close symbol 140 on the right of the super video mode, the electronic device may quit the super video mode, and return to a normal video mode or a photo mode. In FIG. 10-2A, FIG. 10-2B, FIG. 10-2C, and FIG. 10-2D, when the user taps a close symbol 150 on the right of the video recording button, the electronic device may cancel current video recording.

In addition, in this embodiment of this application, the video recorded by the electronic device may have a plurality of different formats, content of the format may include a video type and a location of a video corresponding to the video type in the video, and the video type includes at least one of a slow motion video, a regular motion video, or a fast motion video. For example, the formats may be specifically shown in the following table 1.

In a possible implementation, a format of the video recorded by the electronic device may be the preset format. When the video recorded by the electronic device always has a same fixed format, recognition and identification of such an electronic device or an electronic device of such a model can be improved.

TABLE 1

| Format name | Time length | Format content |
|---|---|---|
| Format 1 | t1 + t2 + t3 | t1-second regular motion video + t2-second low-speed video + t3-second regular motion video |
| Format 2 | t1 + t2 | t1-second high-speed video + t2-second low-speed video |
| Format 3 | t1 + t2 + t3 + t4 | t1-second regular motion video + t2-second low-speed video + t3-second high-speed video + t4-second regular motion video |
| Format 4 | — | Sequentially record a video of one video type within each time slice based on a cyclic sequence of regular motion video-low-speed video |
| ... | ... | ... |

In the foregoing Table 1, t1, t2, t3, t4, and a size of a time slice in different formats may be set according to an actual need.

When the length of the video of the electronic device is the preset length, and the format of the video is the preset format, after the user triggers the video recording indication, the electronic device may automatically generate a video having high identification and facilitating sharing.

In addition, when the length of the video of the electronic device is the preset length, and the format of the video is the preset format, before recording the video in step 303, the electronic device may collect, in the preview state, the original video frames based on the original frame rate, and buffer the original video frames collected within a time of the preset length T. In step 303, the electronic device may generate, based on the buffered original video frames and the preset format, the video having the preset length and the preset format. For example, for a schematic diagram of the recording process, refer to FIG. 10-1A, FIG. 10-1B, FIG. 10-1C, and FIG. 10-1D, and FIG. 10-2A, FIG. 10-2B, FIG. 10-2C, and FIG. 10-2D.

Figure 1:
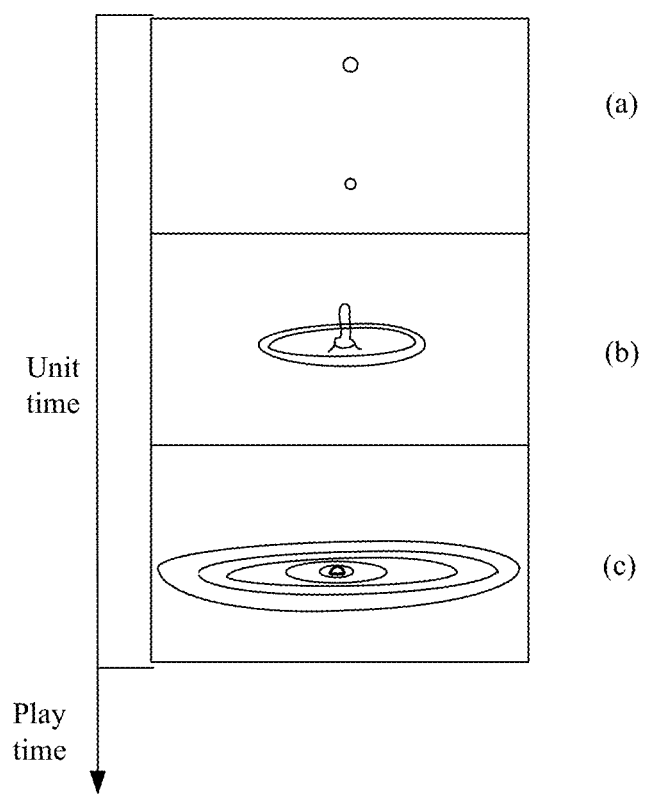
FIG. 1 is a schematic diagram of a play effect of a slow motion video in the prior art.
Figures 1, 11:
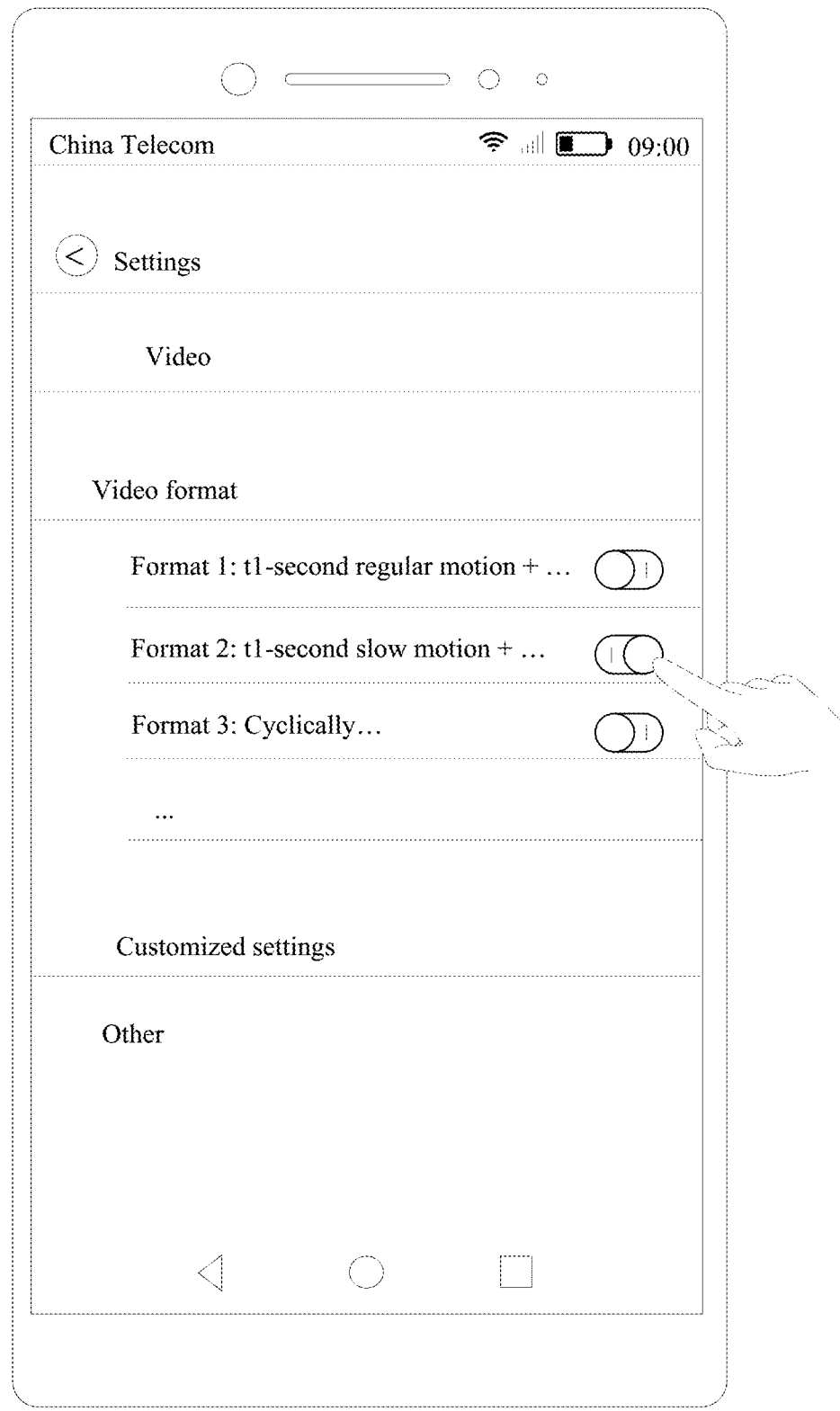
Figures 2A, 11:
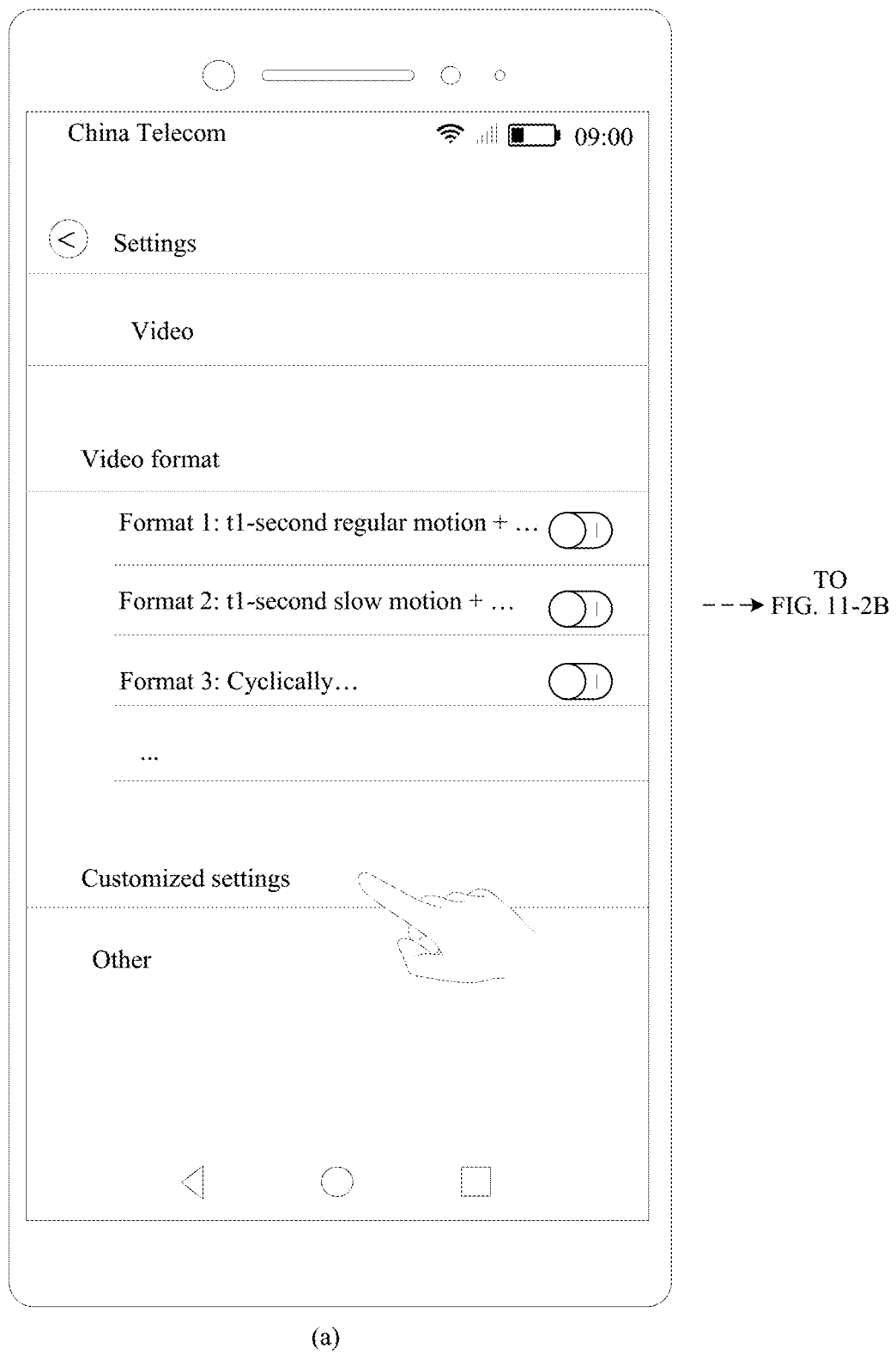
Figures 2B, 11:
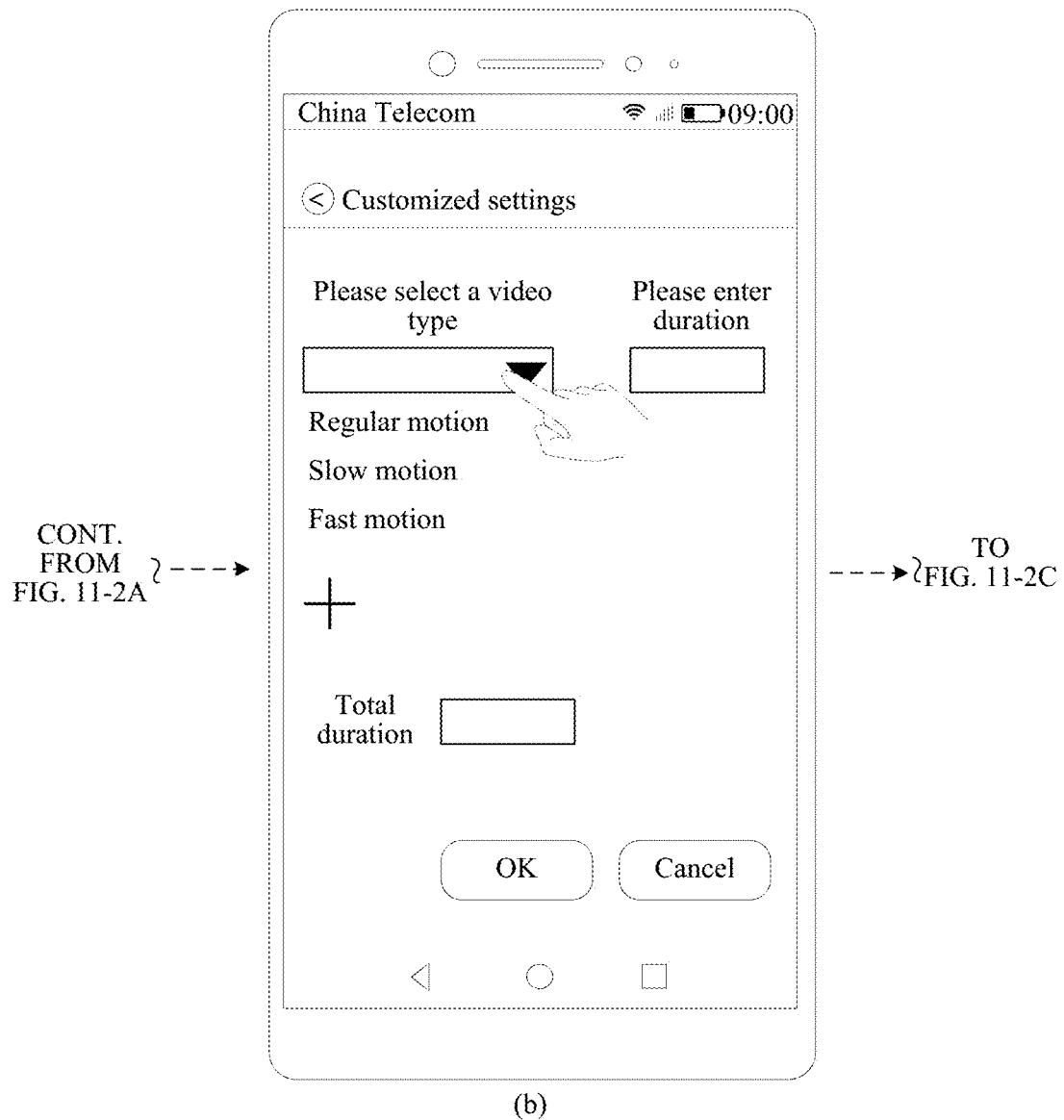
Figures 2C, 11:
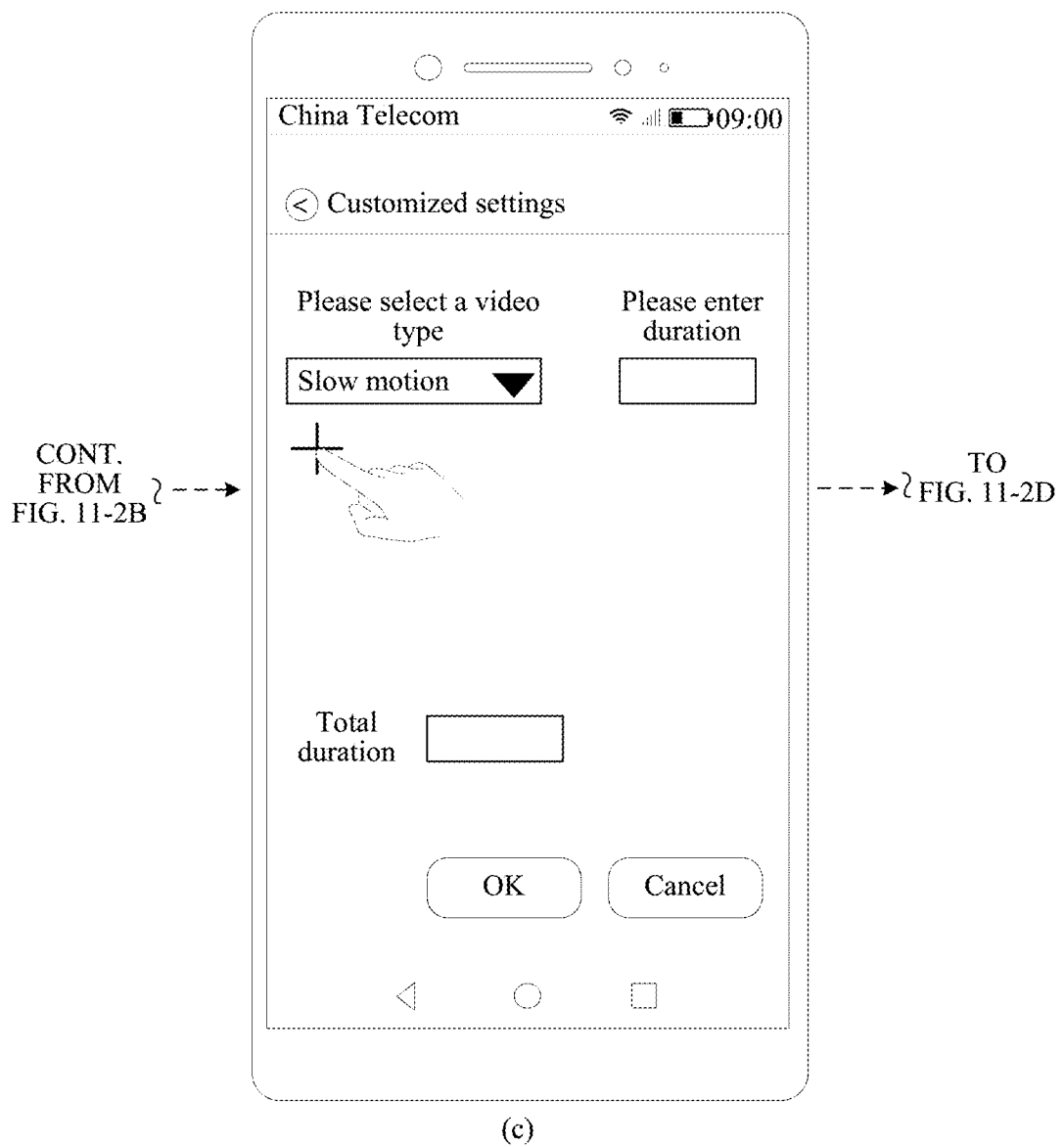
Figures 2D, 11:
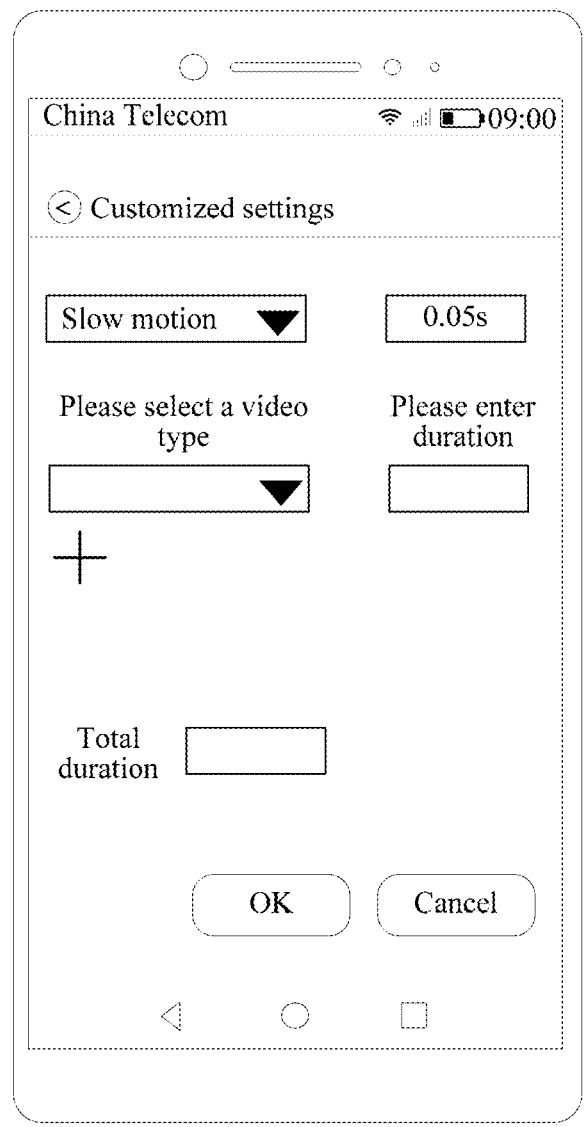
Figure 12A:
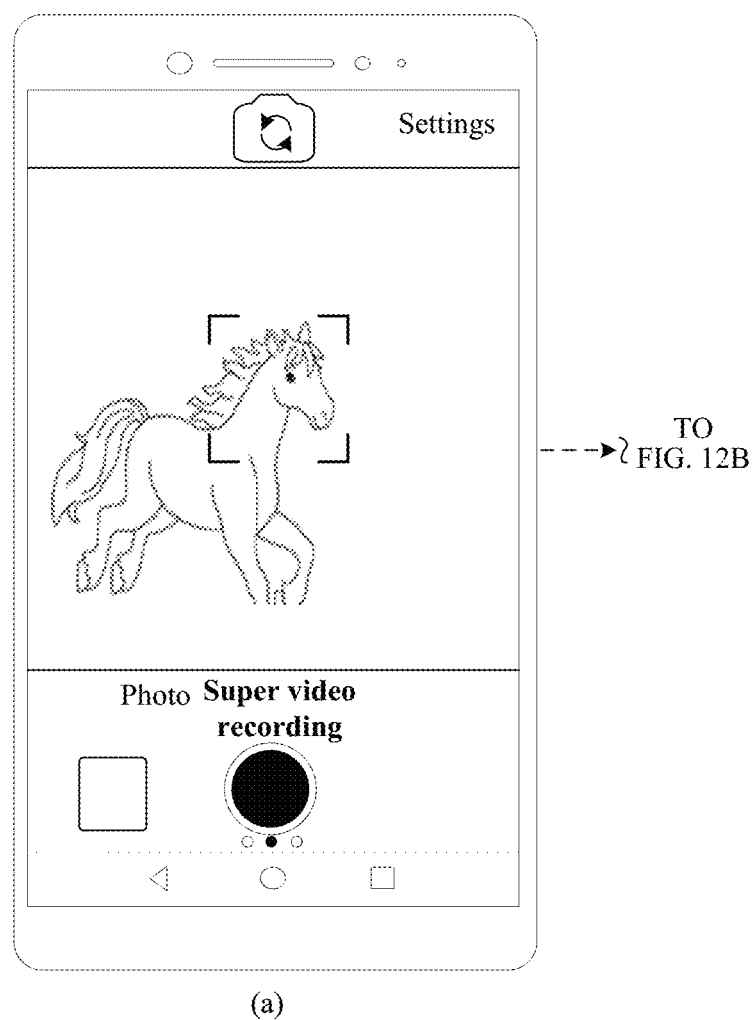
FIG. 12A, FIG. 12B, FIG. 12C, FIG. 12D, and FIG. 12E are a schematic diagram of another video recording process according to an embodiment of this application.
Figure 12B:
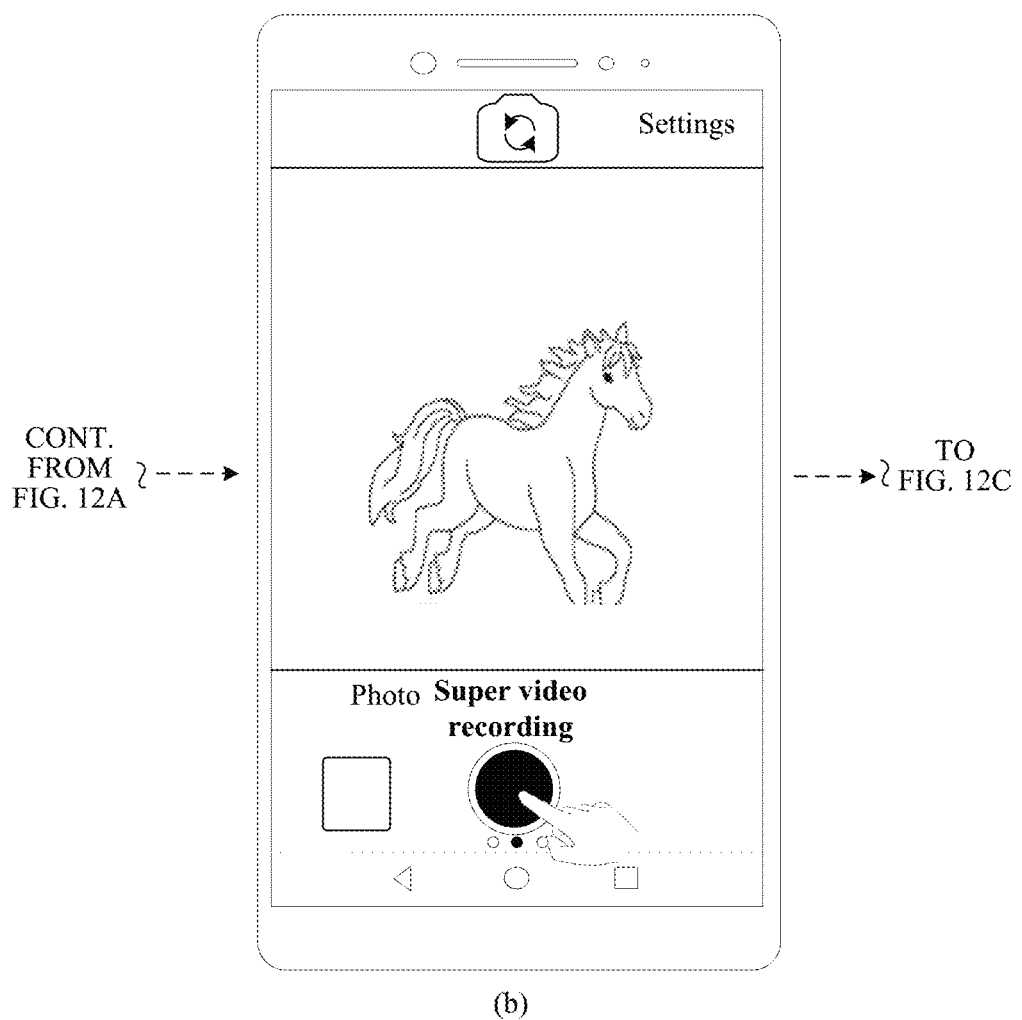
Figure 12C:
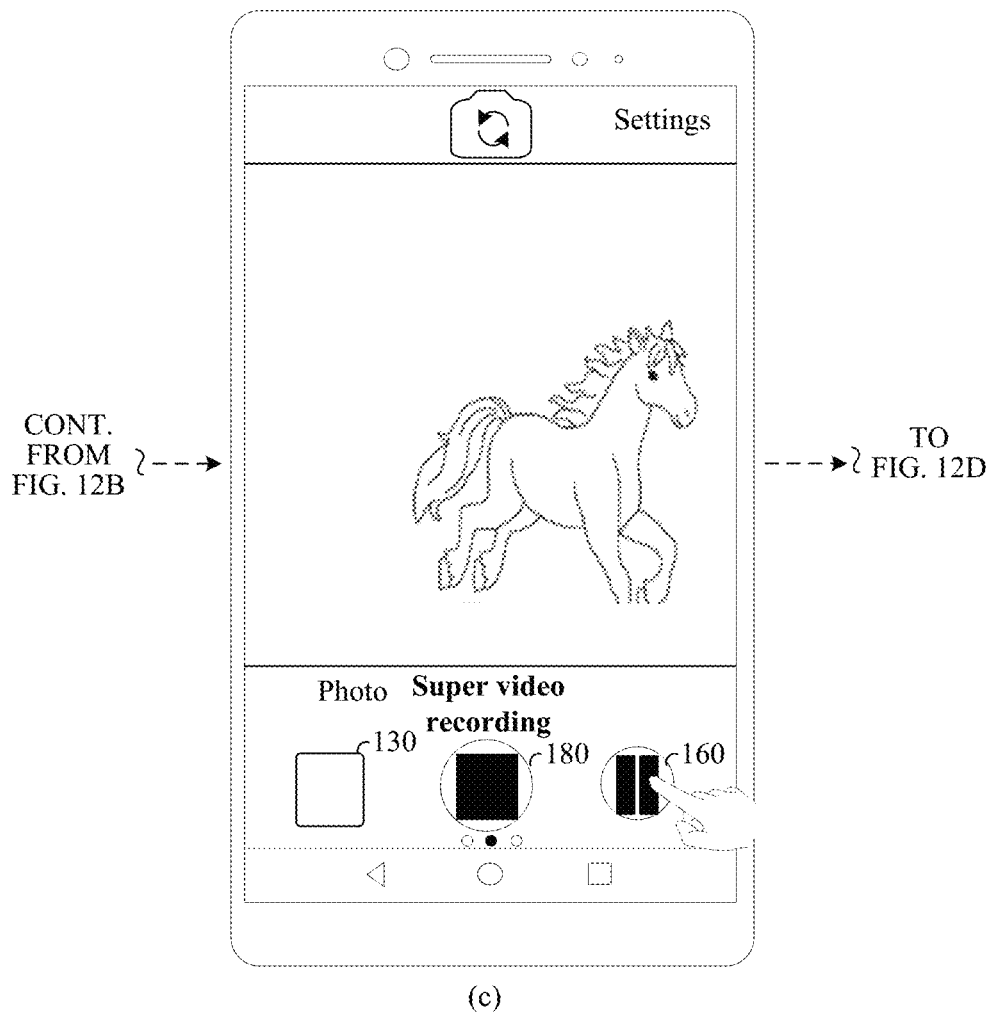
Figure 12D:
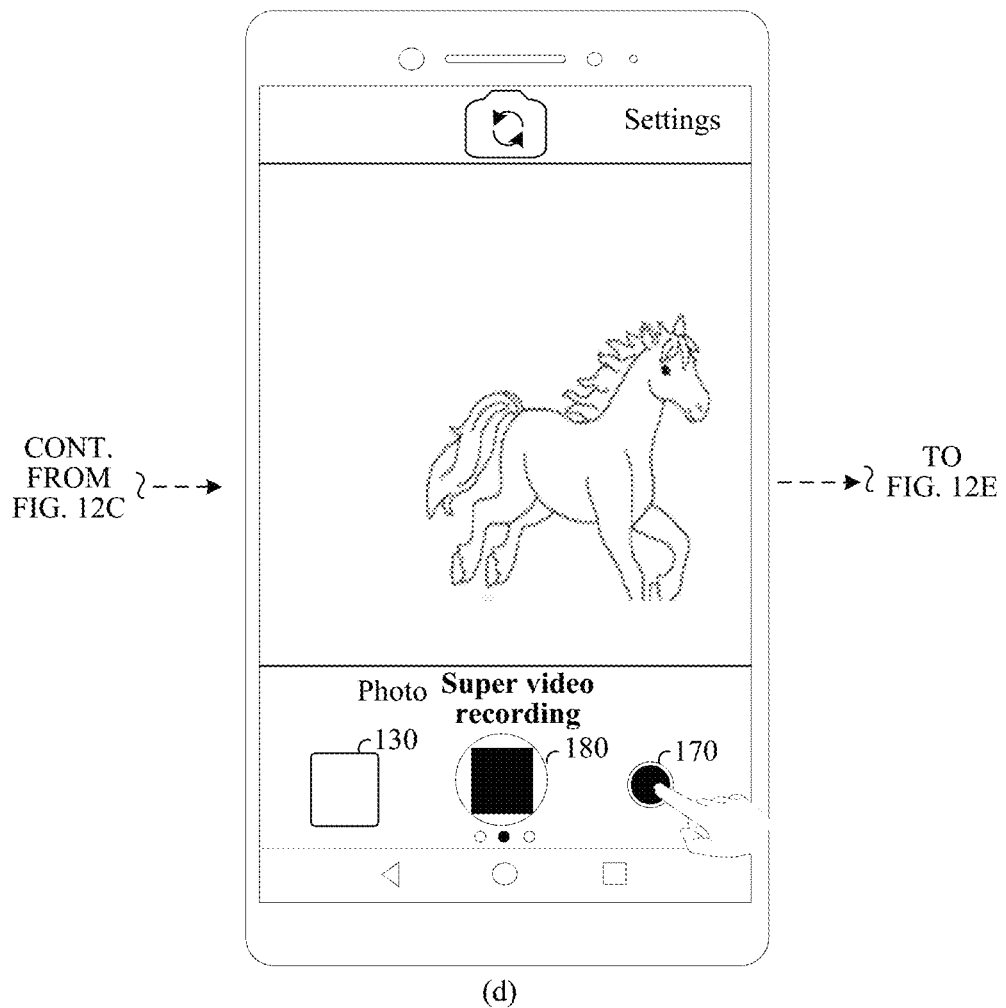
Figure 12E:
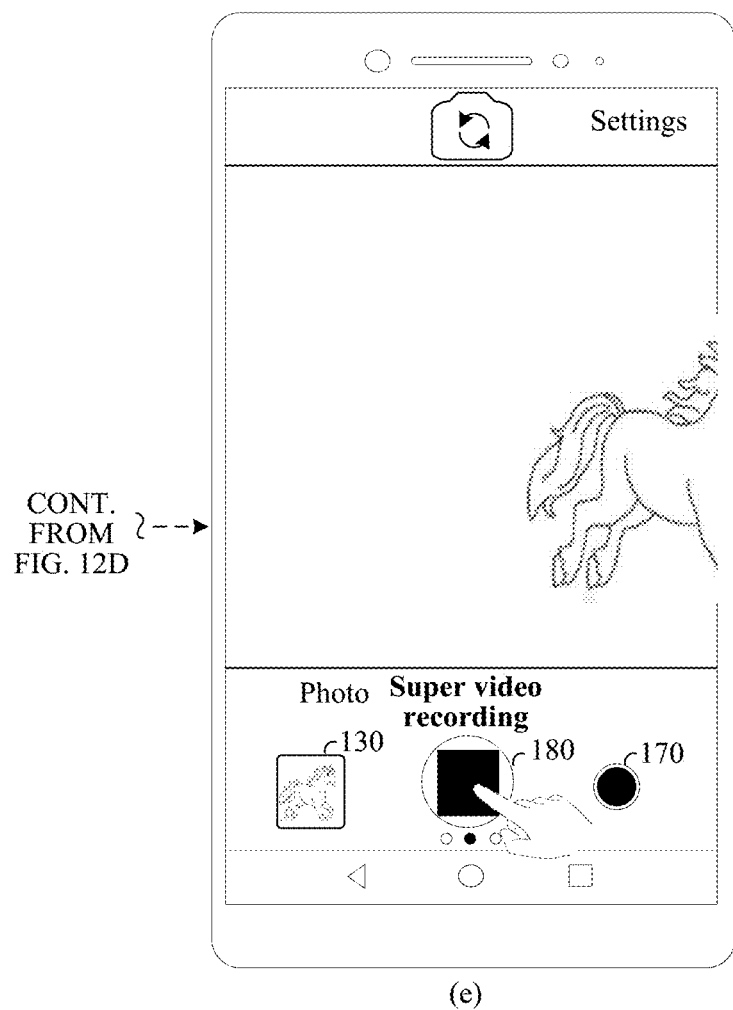

In another implementation, referring to FIG. 11-1, before a video is recorded, the user may start a setting interface, and select, from a plurality of to-be-selected video formats, one format for recording. During video recording, the electronic device may record the video based on the format selected by the user for recording. Alternatively, referring to FIG. 11-2A, FIG. 11-2B, FIG. 11-2C, and FIG. 11-2D, the user may set a format of a to-be-recorded video, and the electronic device may generate a personalized video based on the format set by the user.

In another possible design of this embodiment of this application, the length of the video is controlled by the user in real time in a video recording process based on an actual need. The user may select, by using a pause indication, a resumption indication, and a stop indication, a moving process that the user wants to record, and skip a moving process that the user does not want to record. Specifically, referring to FIG. 12A, FIG. 12B, FIG. 12C, FIG. 12D, and FIG. 12E, during recording of the video, if a pause indication of the user is detected, the electronic device pauses video recording; if a video recording resumption indication of the user is detected, the electronic device resumes video recording; or if a stop indication of the user is detected, the electronic device stops video recording. In FIG. 12A, FIG. 12B, FIG. 12C, FIG. 12D, and FIG. 12E, 160 represents a pause button, 170 represents a recording resumption button, and 180 represents a stop button.

When the length of the video is controlled by the user in real time, before recording the video in step 303, when displaying the video recording preview interface, the electronic device may collect, in the preview state, the original video frames based on the original frame rate, and buffer the original video frames collected within the latest T time. In step 303, the electronic device generates the video frame based on the buffered original video frames and the original video frames collected after the video recording indication of the user is detected.

Alternatively, when the length of the video is controlled by the user in real time, the electronic device may not buffer the original video frames in advance, and the electronic device performs real-time processing based on the collected original video frames after detecting the video recording indication of the user, to generate the video. Therefore, after the user triggers the stop indication, the electronic device basically completes video recording. As shown in FIG. 12A, FIG. 12B, FIG. 12C, FIG. 12D, and FIG. 12E, after the user taps the stop button 180, the electronic device may almost immediately display the generated video on the region 130.

In addition, when the format of the to-be-recorded video is not the preset format or the format selected by the user, that the electronic device records the video in step 303 may specifically include the following steps: The electronic device records a video of a first video type, and after detecting a second video type indication, the electronic device switches to recording of a video of a second video type. The first video type is different from the second video type, and the first video type or the second video type is a slow motion video type. Specifically, an initial video type that the electronic device just starts to record when detecting the video recording indication of the user may be the preset video type. Alternatively, after detecting a video recording indication and an initial video type indication of the user, the electronic device may start to record a video corresponding to the initial video type.

Figure 13A:
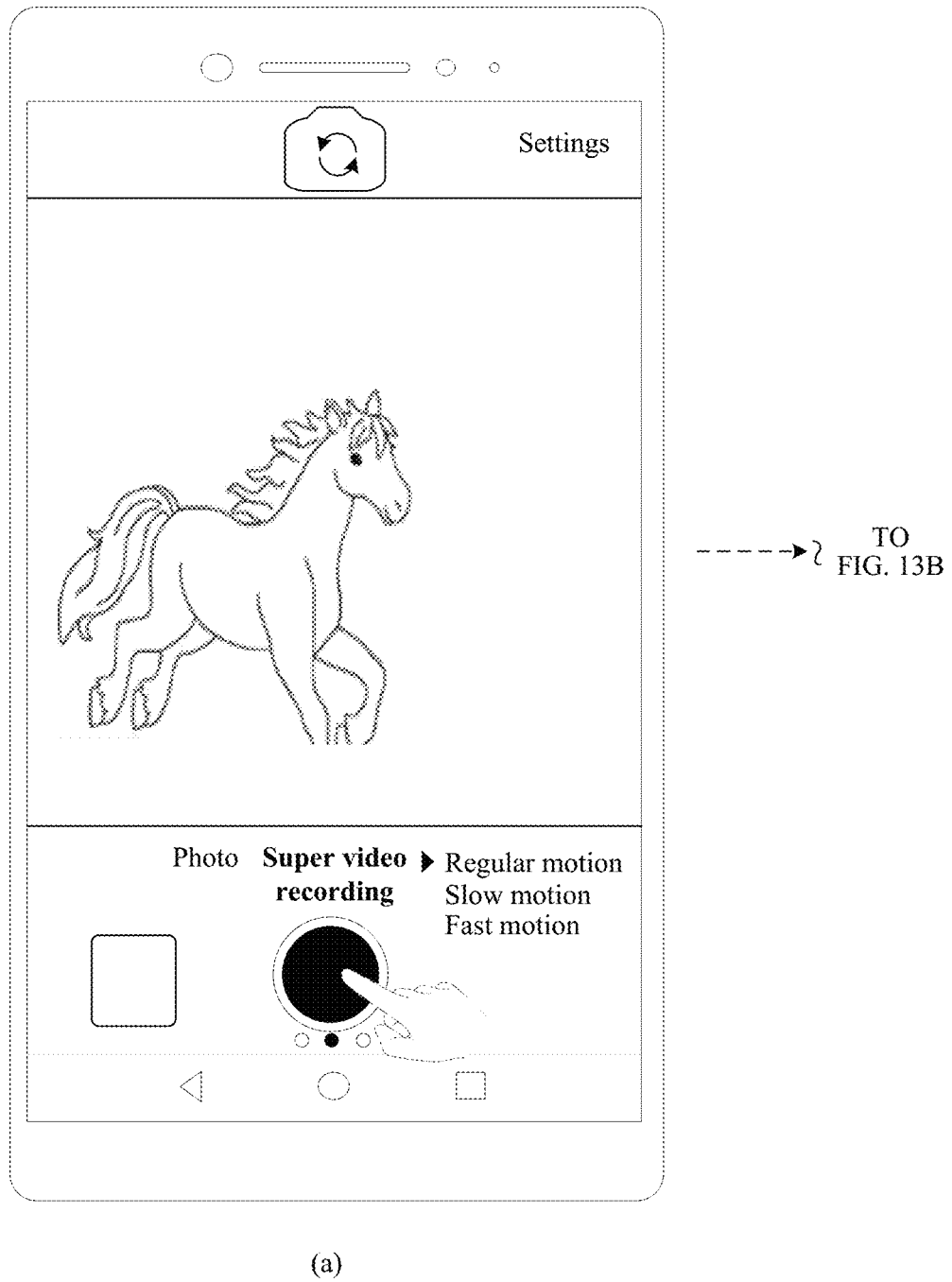
FIG. 13A and FIG. 13B are a schematic diagram of another video recording process according to an embodiment of this application.
Figure 13B:
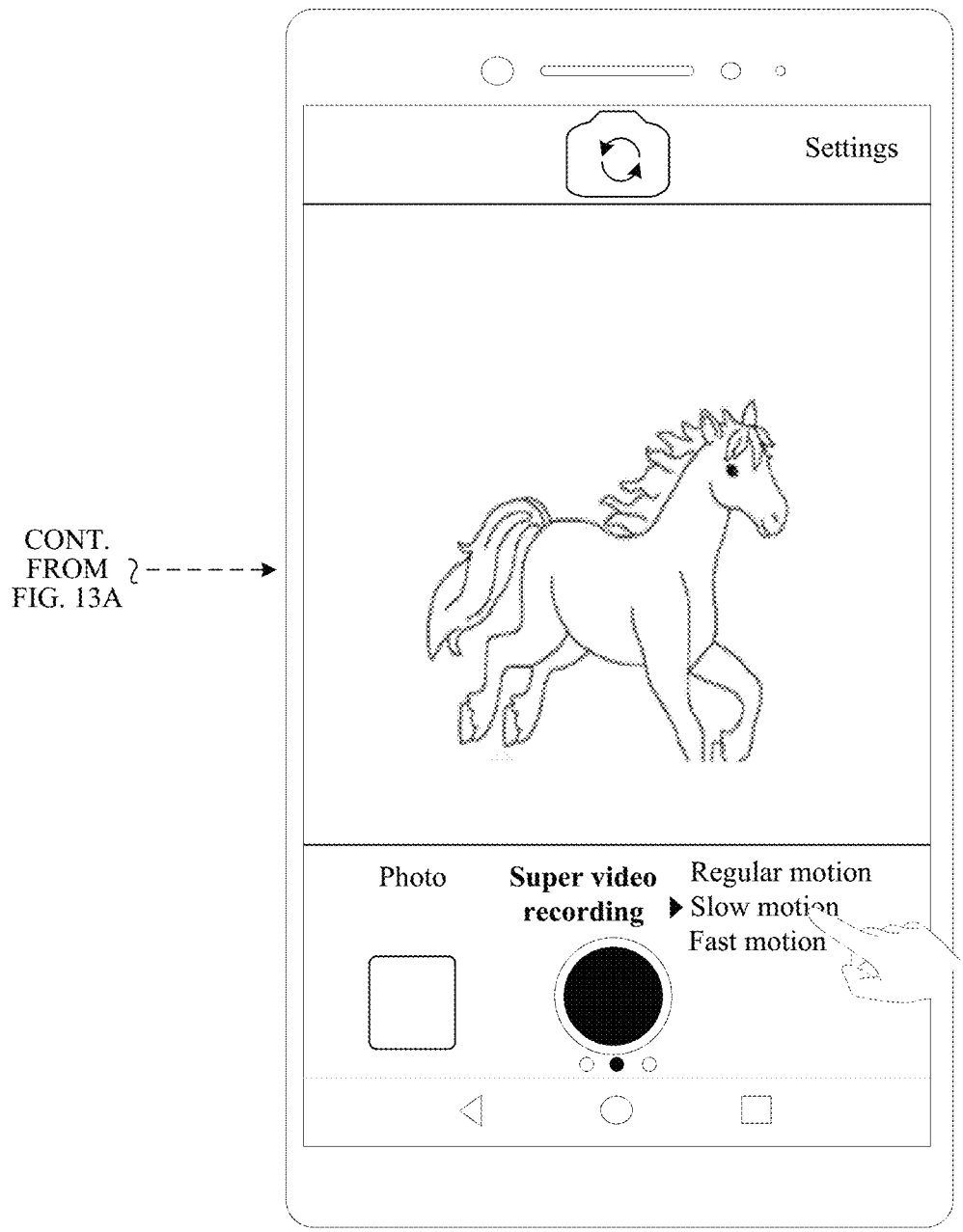

For example, referring to (a) in FIG. 13A, the initial video type is the regular motion video type. After the user taps a recording button, the electronic device records a video of the regular motion video type. Referring to (b) FIG. 13A and FIG. 13B, when detecting a slow motion type indication of the user, the electronic device switches to recording of a video of the slow motion type. If a fast motion type indication of the user is detected, the electronic device switches to recording of a video of the fast motion type. If a regular motion type indication of the user is detected, the electronic device switches to recording of a video of the regular motion type.

In a specific implementation, when detecting the slow motion type indication of the user and switching to recording of the slow motion video, the electronic device may specifically perform frame interpolation on video frames recorded within a T time period before a moment at which the slow motion type indication of the user is detected, and video frames recorded after the moment at which the slow motion type indication of the user is detected, to generate a slow motion video. In a recording process, there is a time difference from a time when the user finds that the user wants to record a moving process to a time when the user triggers the slow motion type indication, when the user triggers the slow motion type indication, a to-be-recorded moving process may have started for a time period, and especially when the moving process is a high-speed moving process, the to-be-recorded moving process may have ended. Therefore, the electronic device may record a slow motion video a time period in advance based on the original video frames recorded within the T time period before the moment at which the slow motion type indication is triggered, so that the user can effectively record the moving process that the user wants to play in a slow motion mode.

Figures 1A, 8:
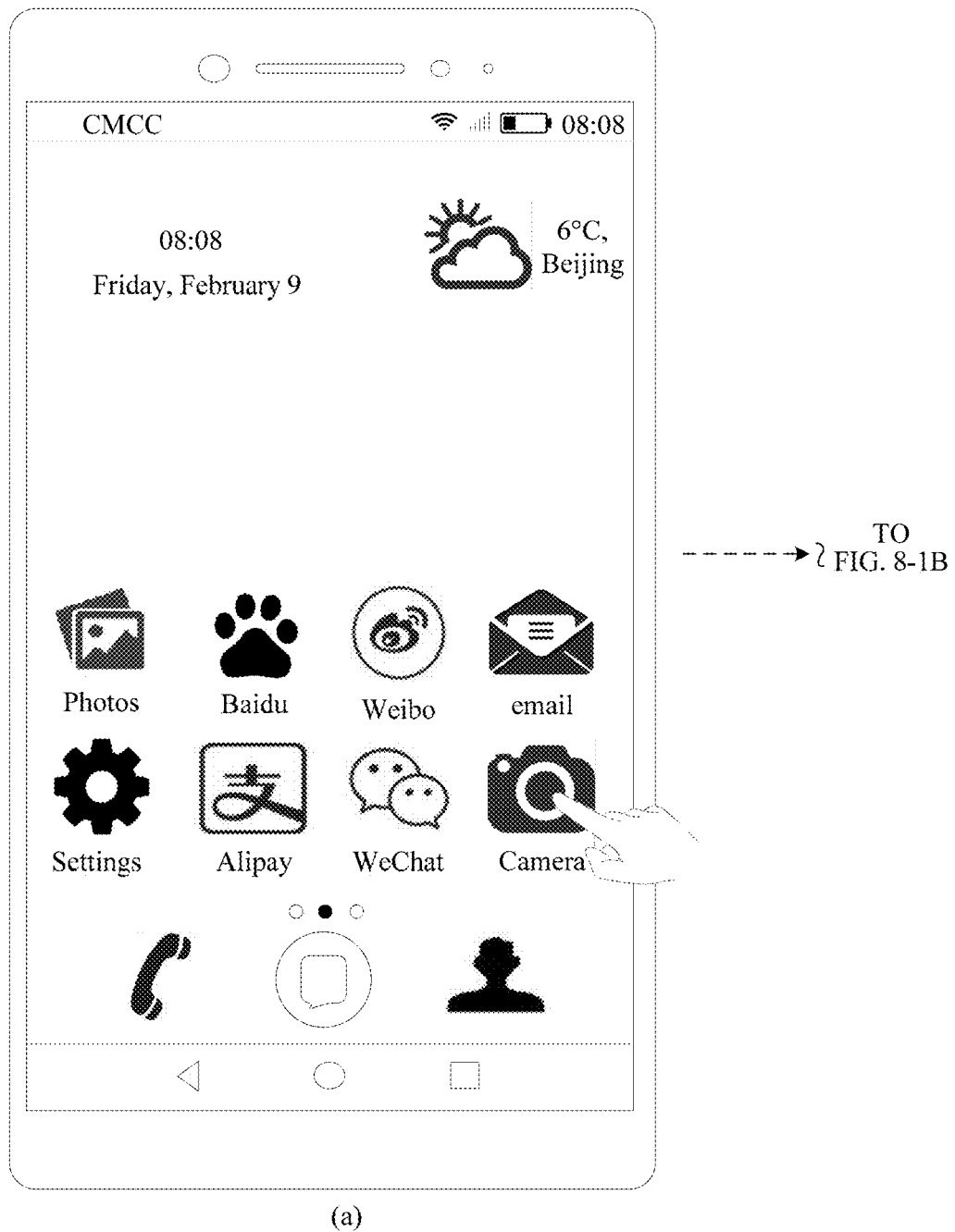
FIG. 8-1A, FIG. 8-1B, and FIG. 8-1C are a schematic diagram of another video recording process according to an embodiment of this application.
Figures 1B, 8:
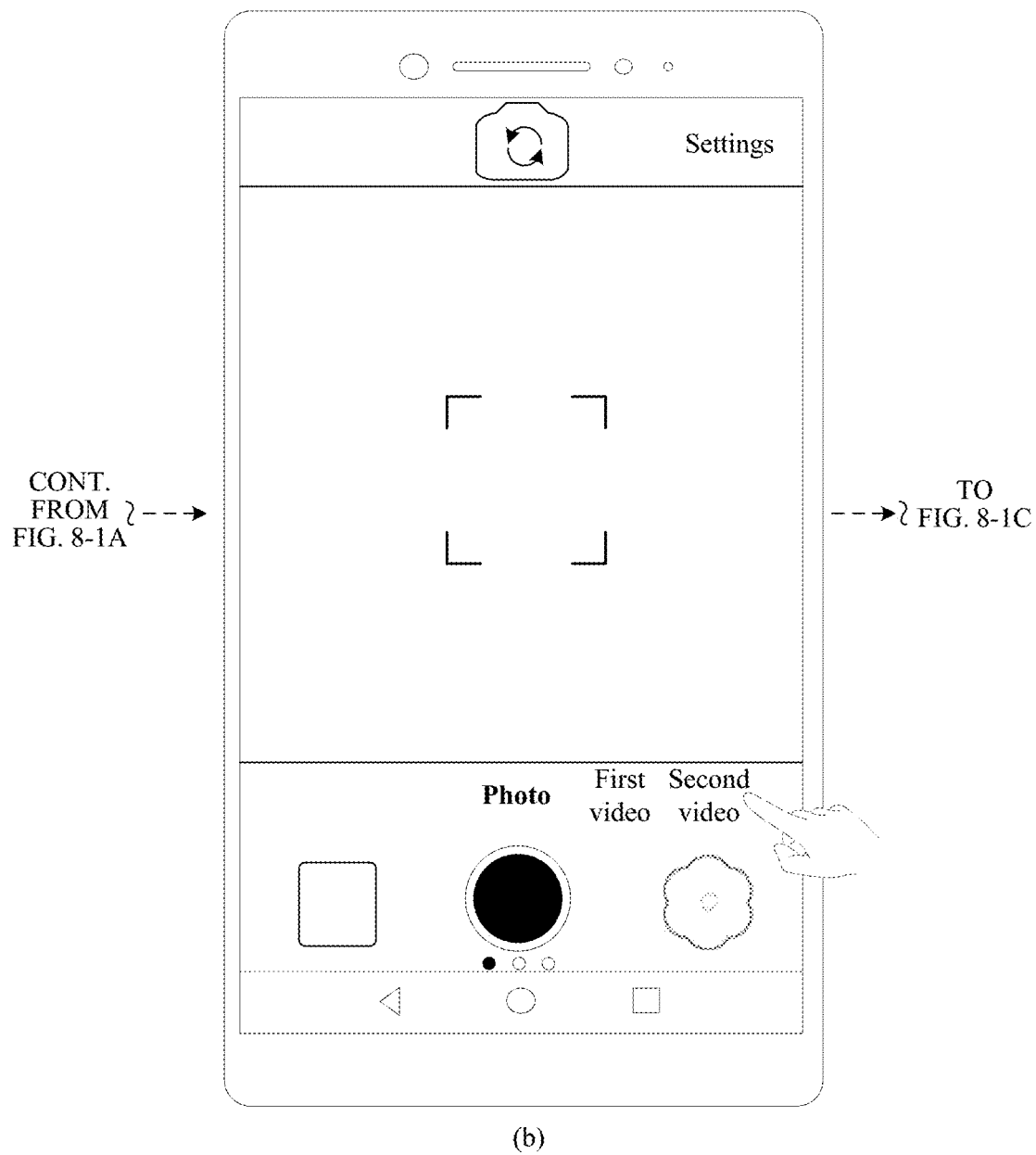
Figures 1C, 8:
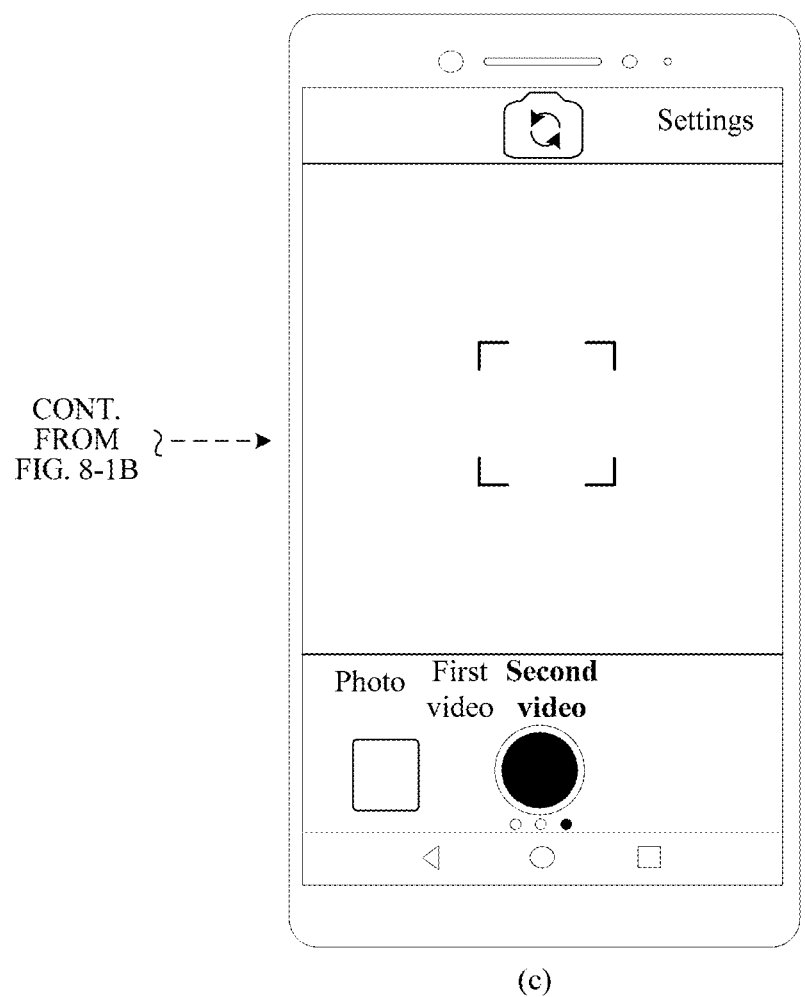
Figures 2A, 8:
Figures 2B, 8:
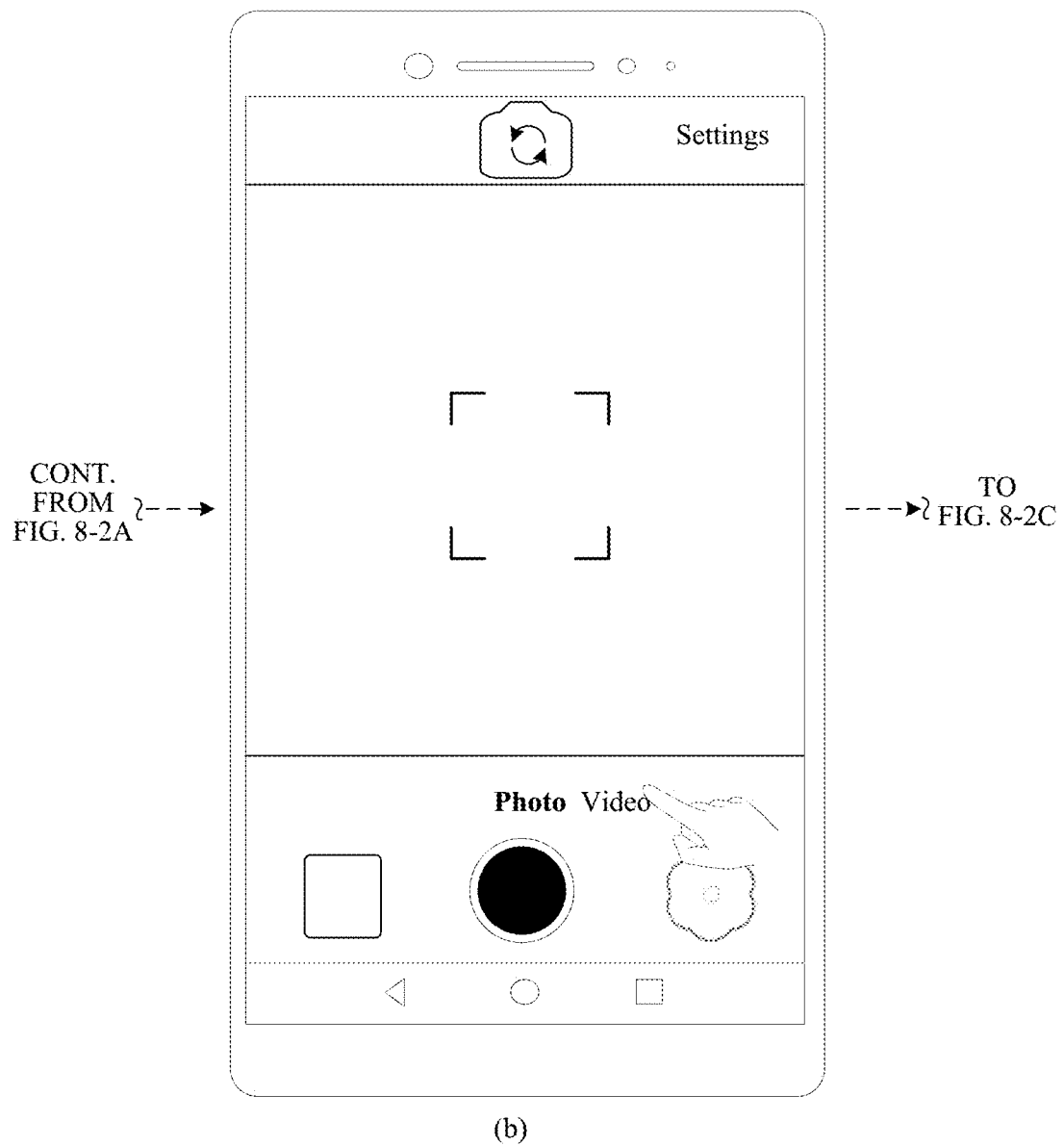
Figures 2C, 8:
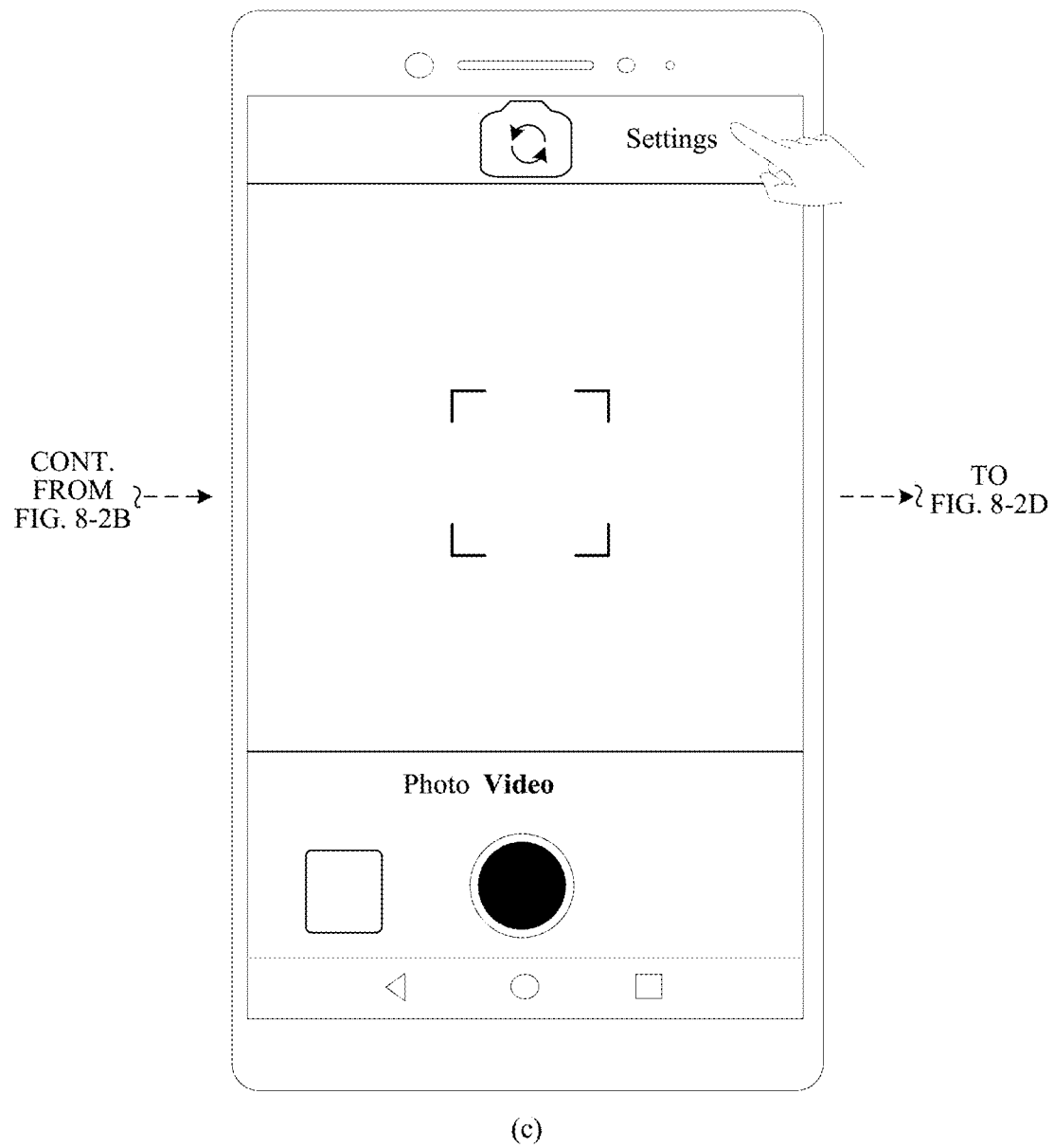
Figures 2D, 8:
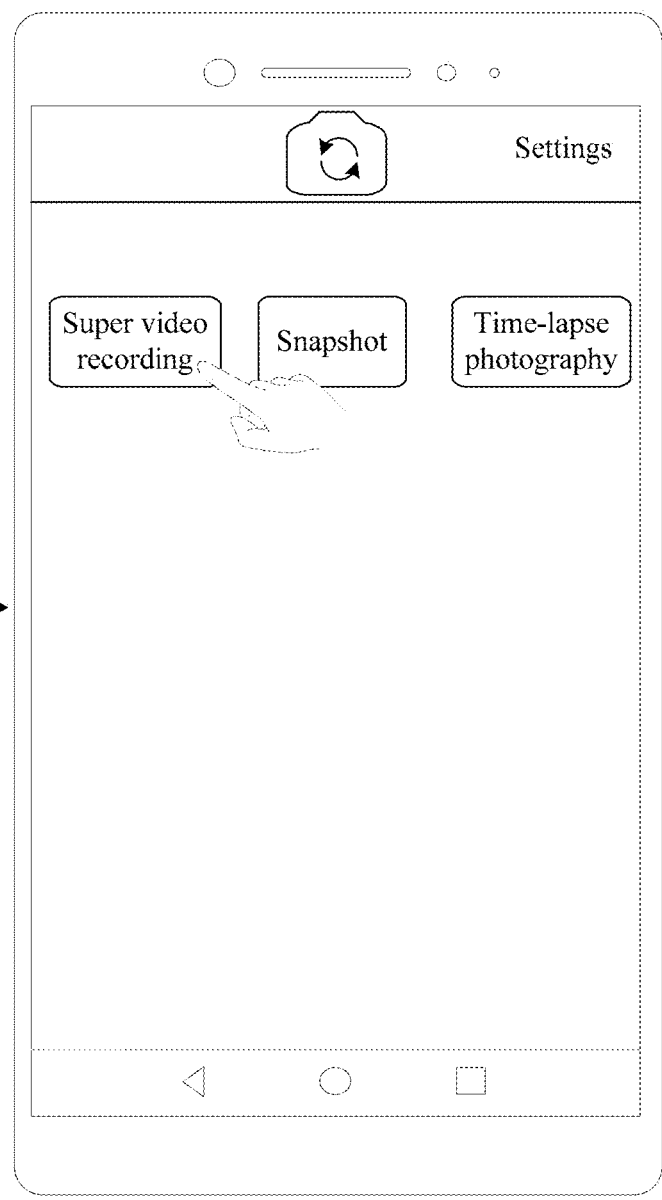
Figures 2E, 8:
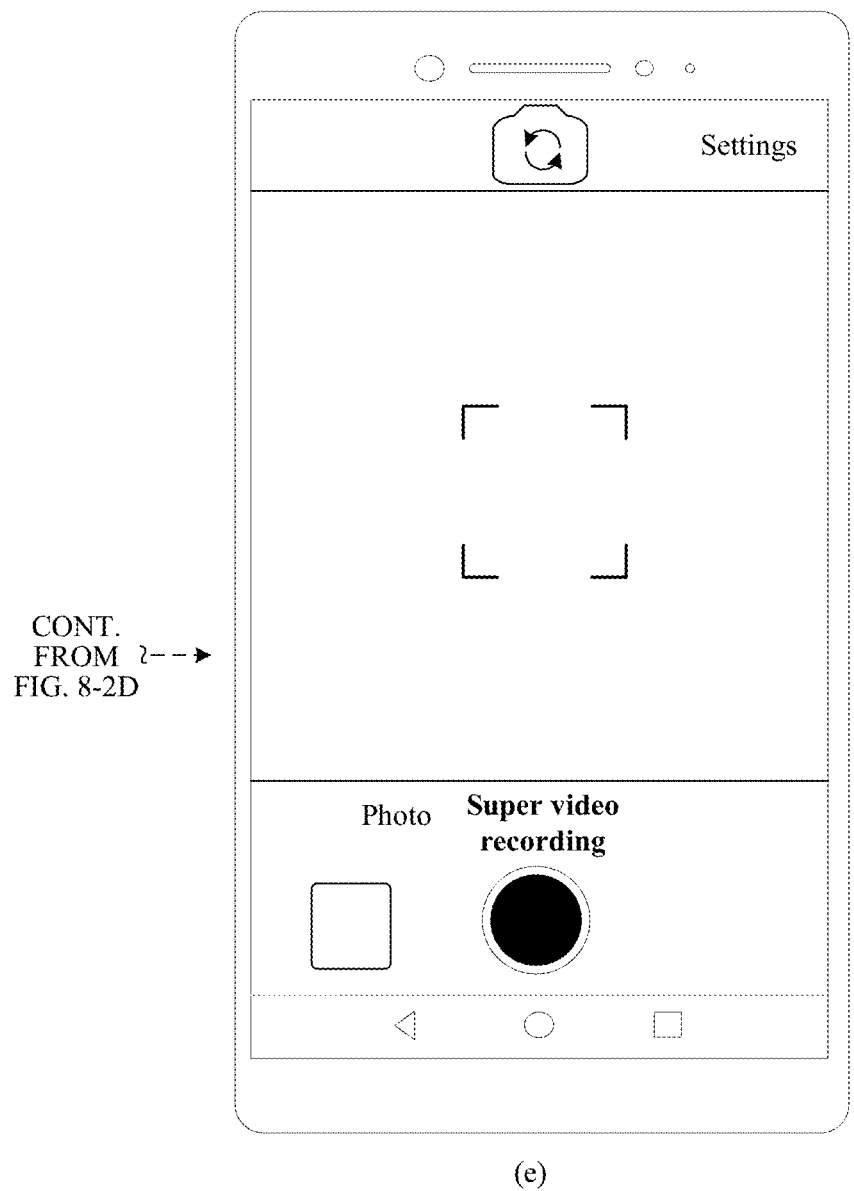
Figures 3A, 8:
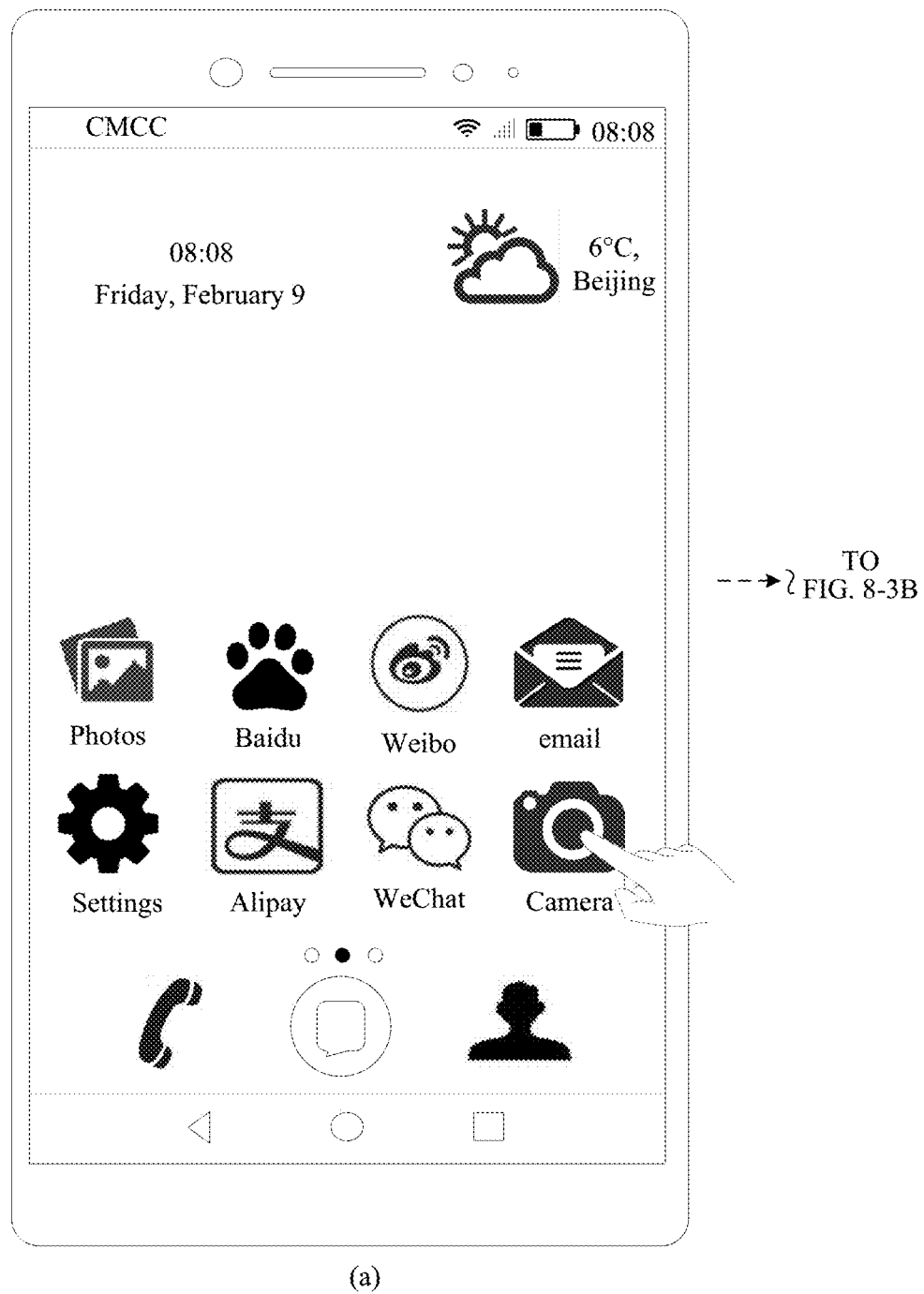
Figures 3B, 8:
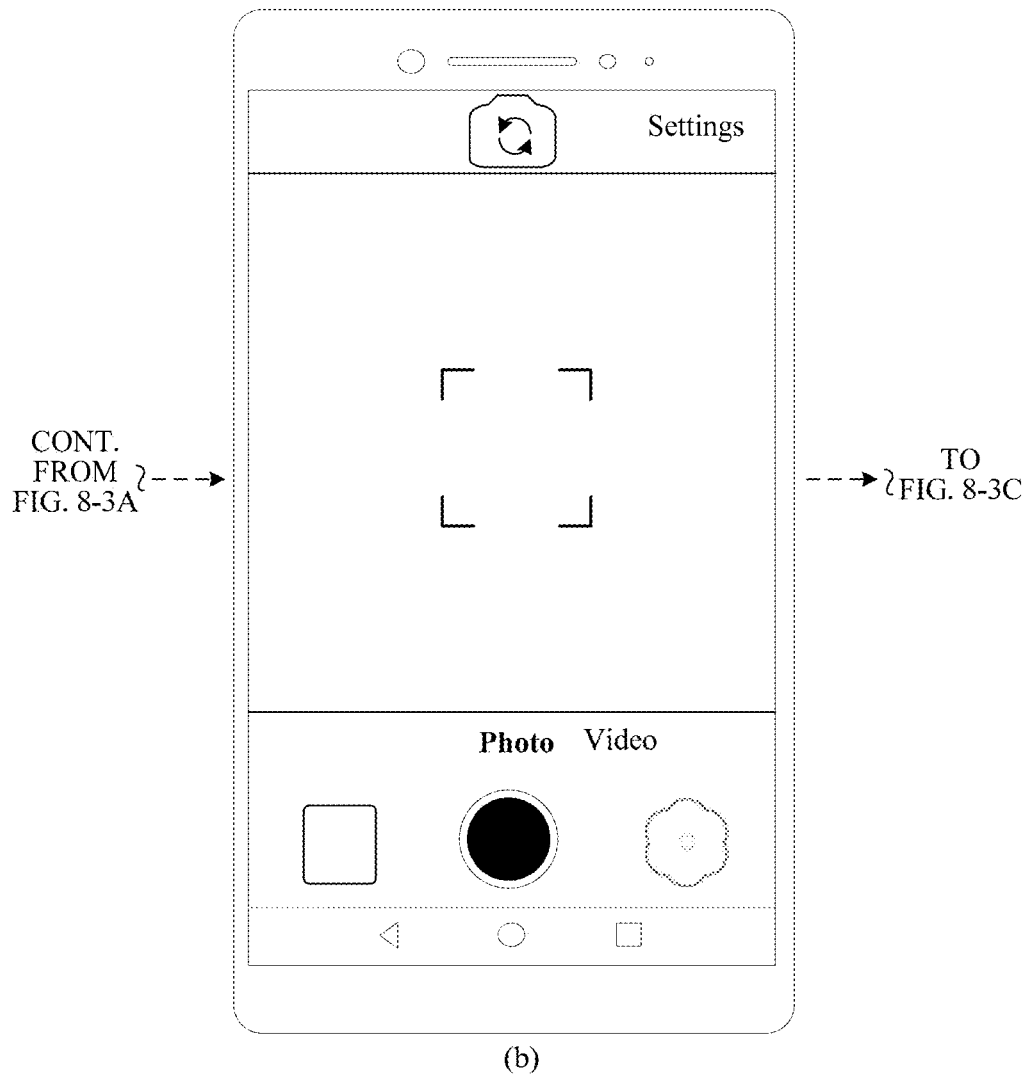
Figures 3C, 8:
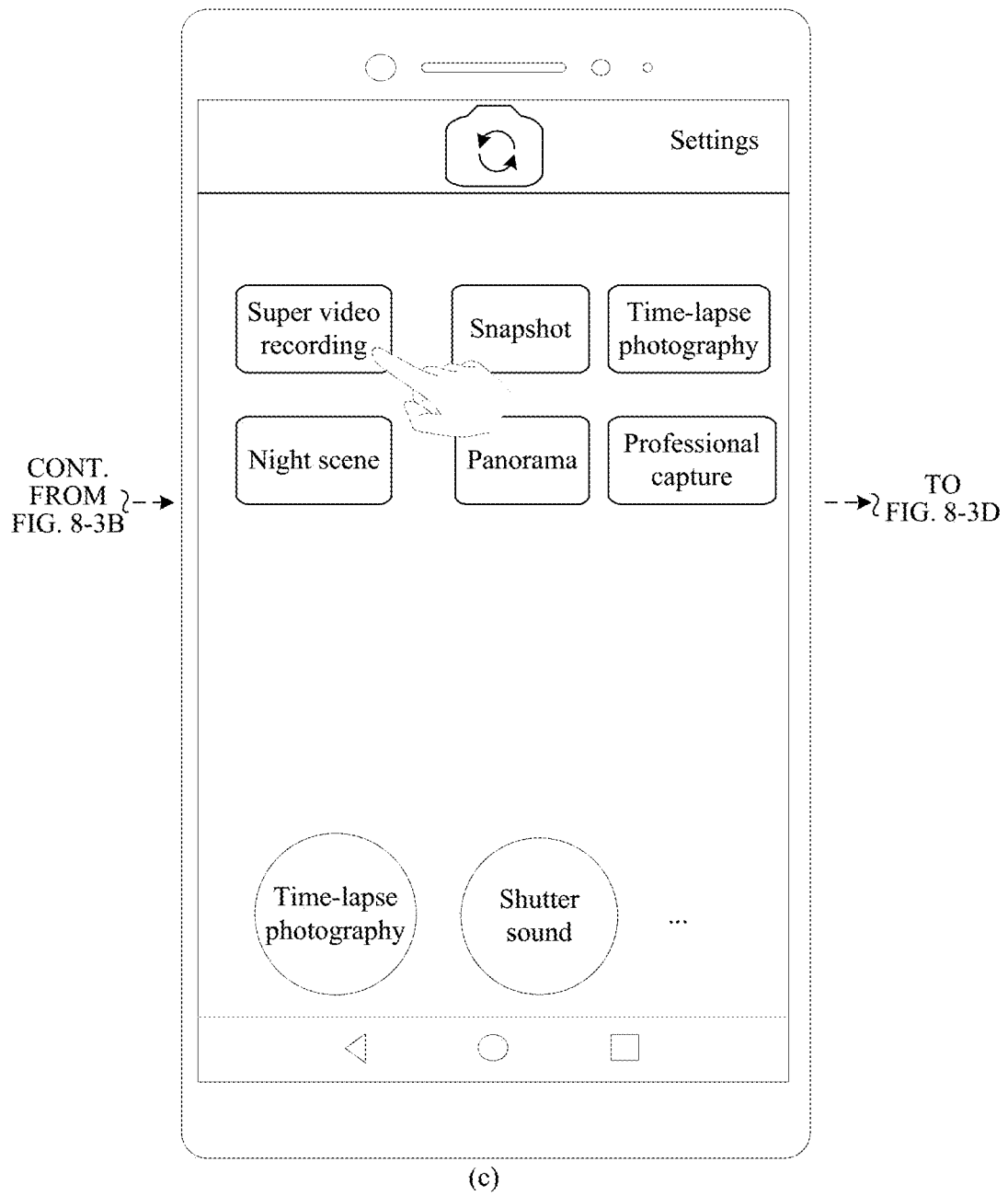
Figures 3D, 8:
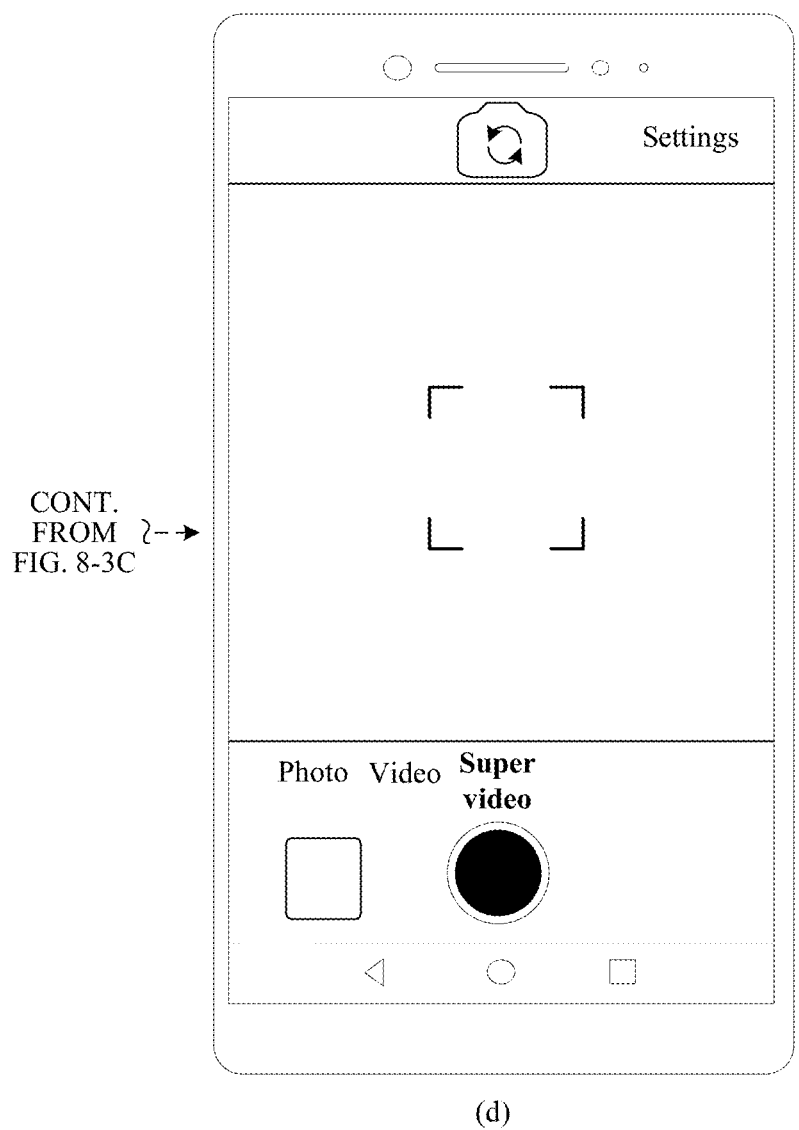
Figures 1A, 14:
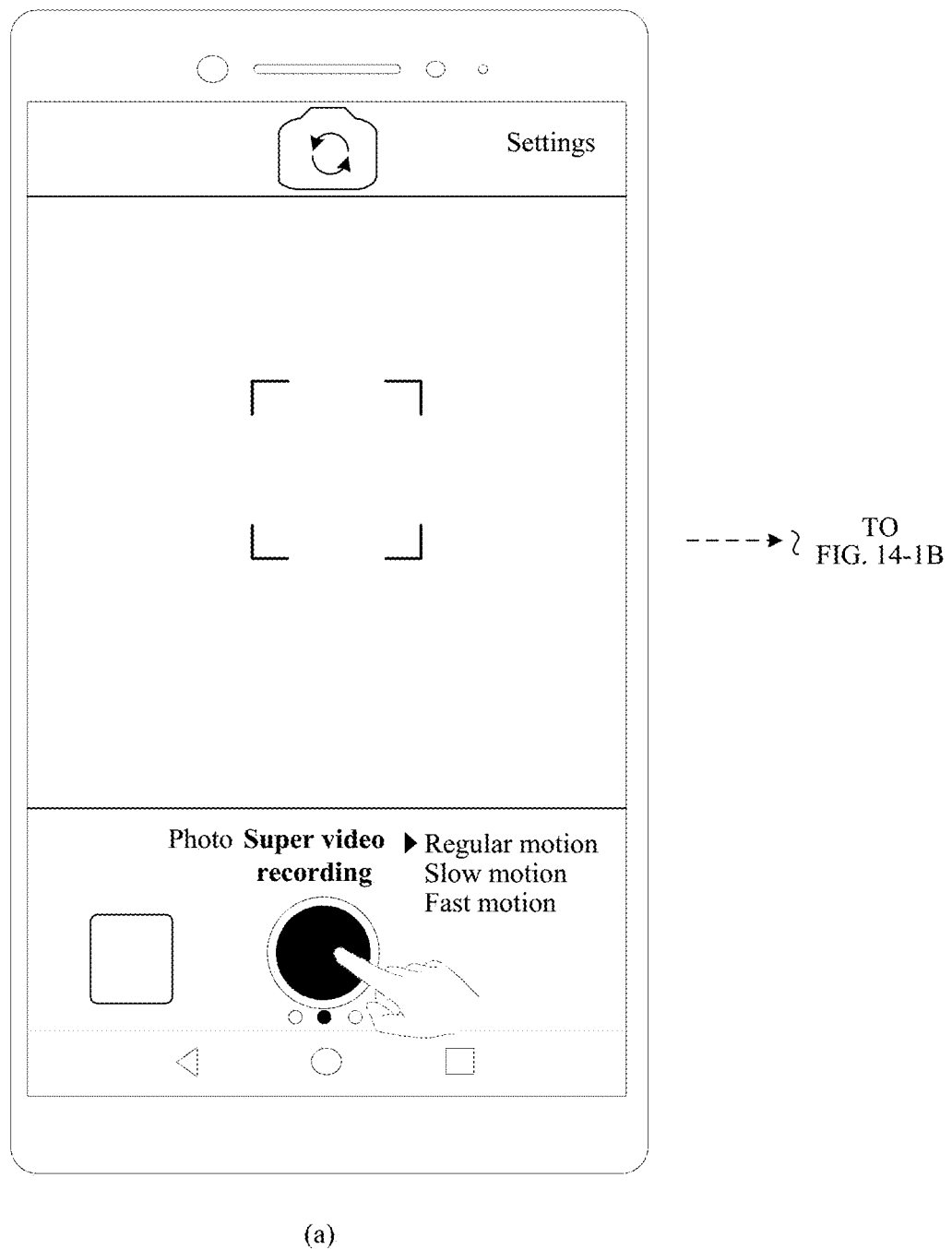
Figures 1B, 14:
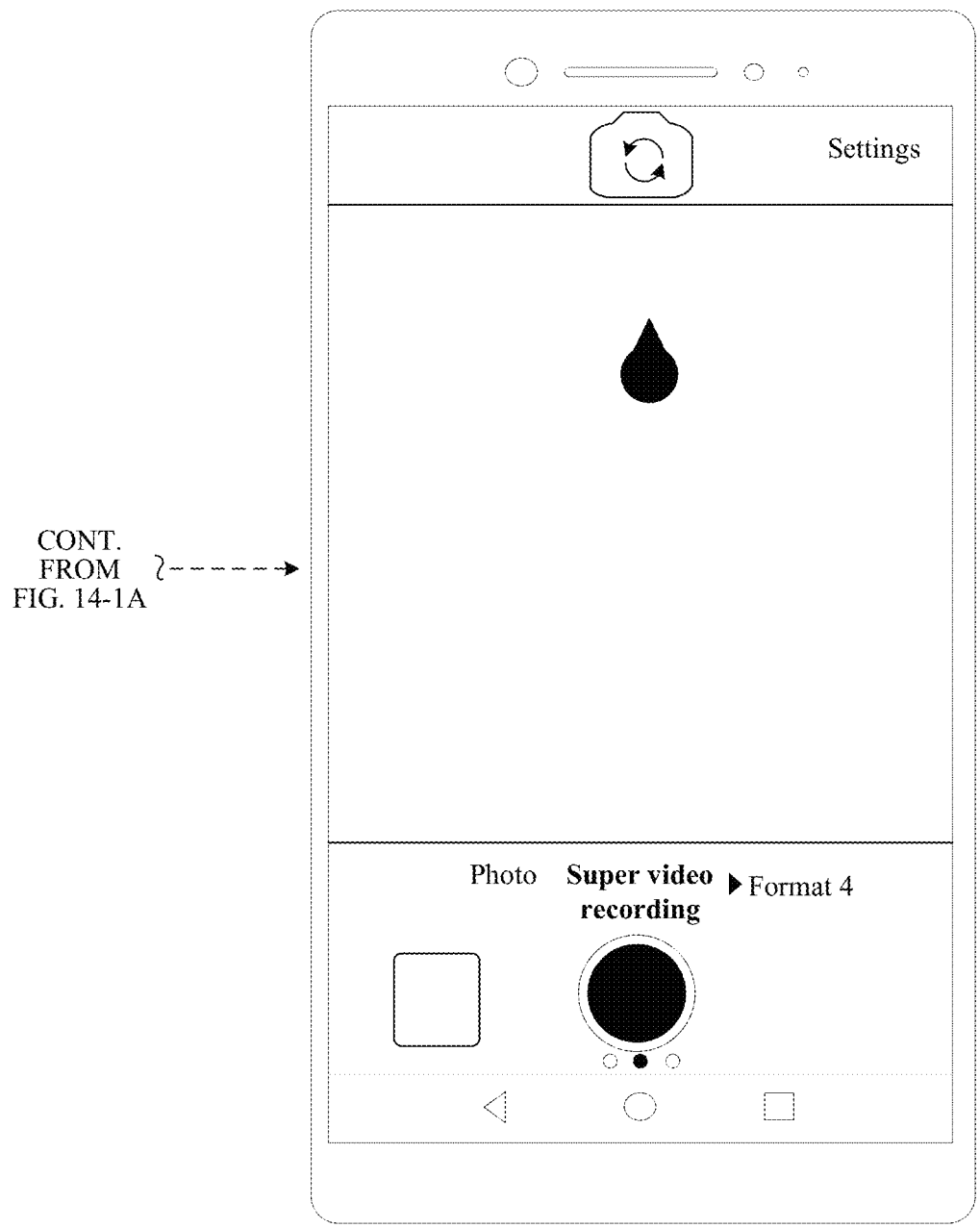
Figures 2A, 14:
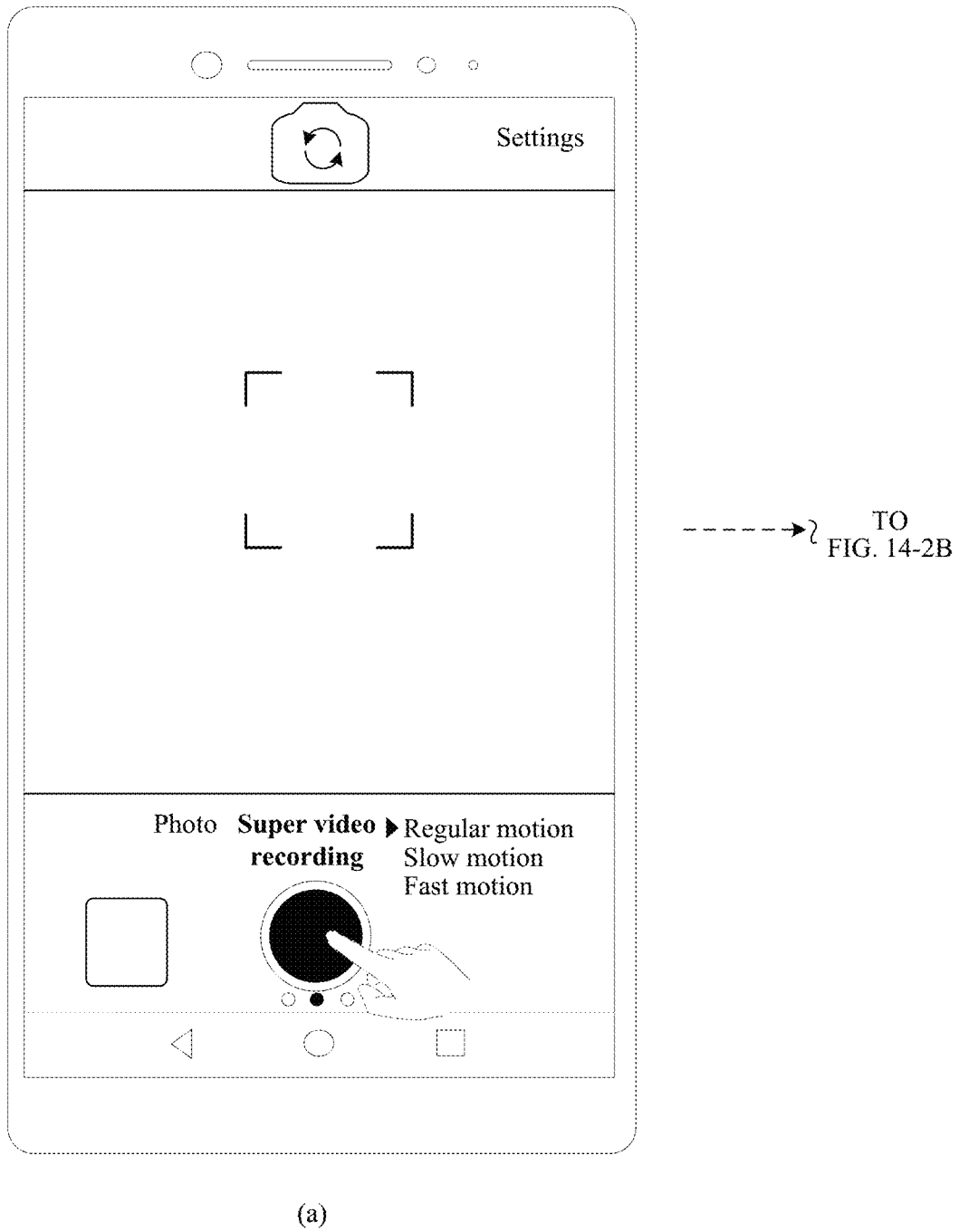
Figures 2B, 14:
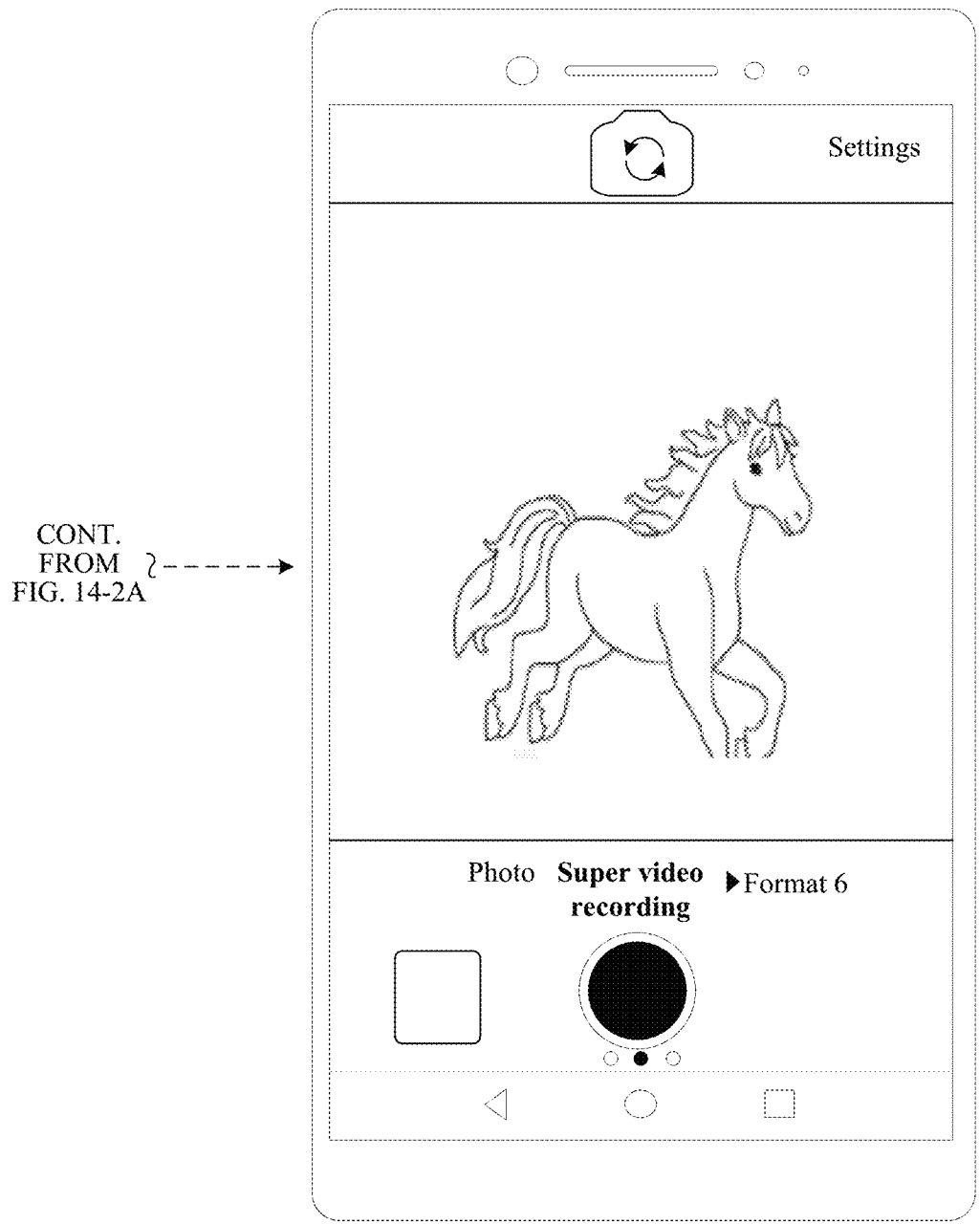

In addition, when the format of the to-be-recorded video is not the preset format or the format selected by the user, the electronic device may further automatically switch a video recording type in a recording process. For example, when a moving speed of a to-be-photographed object is greater than or equal to a preset value, the electronic device may switch to recording of a video of the slow motion type. When a moving speed of a to-be-photographed moving speed is less than a preset value, the electronic device may switch to recording of a video of the regular motion type or the fast motion type. For another example, when the electronic device identifies the to-be-photographed object, the electronic device switches to a format corresponding to the to-be-photographed object for video recording. For example, the electronic device initially may record a video of a default type (for example, the regular motion type). Referring to FIG. 14-1A and FIG. 14-1B, when the to-be-photographed object identified by the electronic device is a water drop or a falling water drop, the electronic device switches to a format 4 corresponding to the water drop or the falling water drop for video recording. Alternatively, when the to-be-photographed object identified by the electronic device is an eagle or a flying eagle, the electronic device switches to a format 5 corresponding to the eagle or the flying eagle for video recording. Alternatively, referring to FIG. 14-2A and FIG. 14-2B, when the to-be-photographed object identified by the electronic device is a horse or a galloping horse, the electronic device switches to a format 6 corresponding to the horse or the galloping horse for video recording. For example, the format 4 may be: fixed duration of 0.3 s, namely, fast motion video (0.05 s)+slow motion video (0.25 s). In addition, when automatically switching a video recording type, the electronic device may display, in real time in a recording process, a type of a video recorded at a current moment.

Figure 15A:
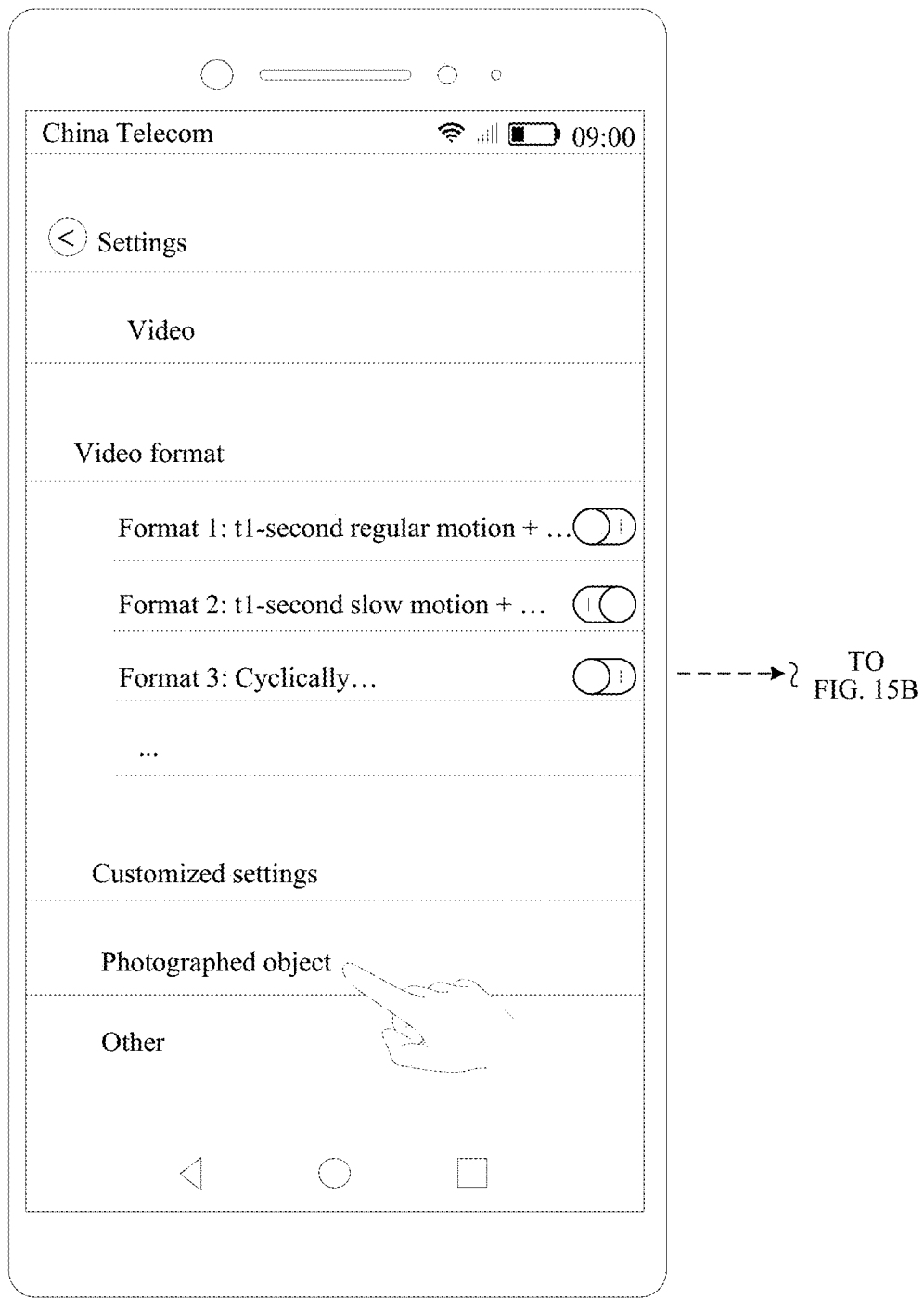
FIG. 15A and FIG. 15B are a schematic diagram of another setting interface according to an embodiment of this application.
Figure 15B:
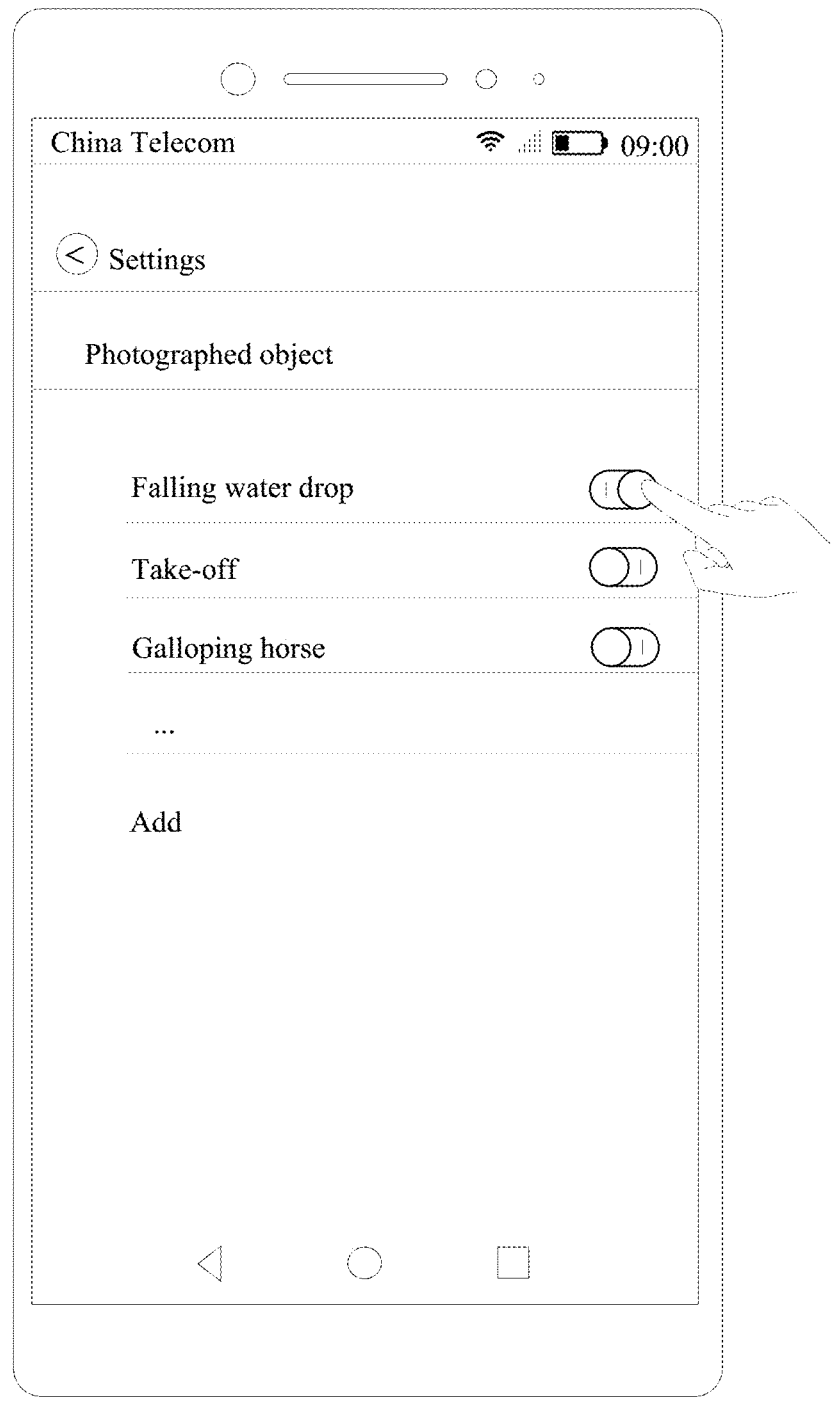

In another possible implementation, referring to FIG. 15A and FIG. 15B, the electronic device may prestore a correspondence between a to-be-photographed object and a format. When detecting a to-be-photographed object indicated by the user, the electronic device may record a video based on a format corresponding to the to-be-photographed object.

In addition, in some other embodiments, the video recorded by the electronic device may include only at least one of the fast motion type or the slow motion type, and the video format in Table 1 may include only at least one of the fast motion type or the slow motion type. For example, the video format in Table 1 may further include a format 7: t1-second regular motion video+t2-second high-speed video+t3-second regular motion video.

Figures 1, 16:
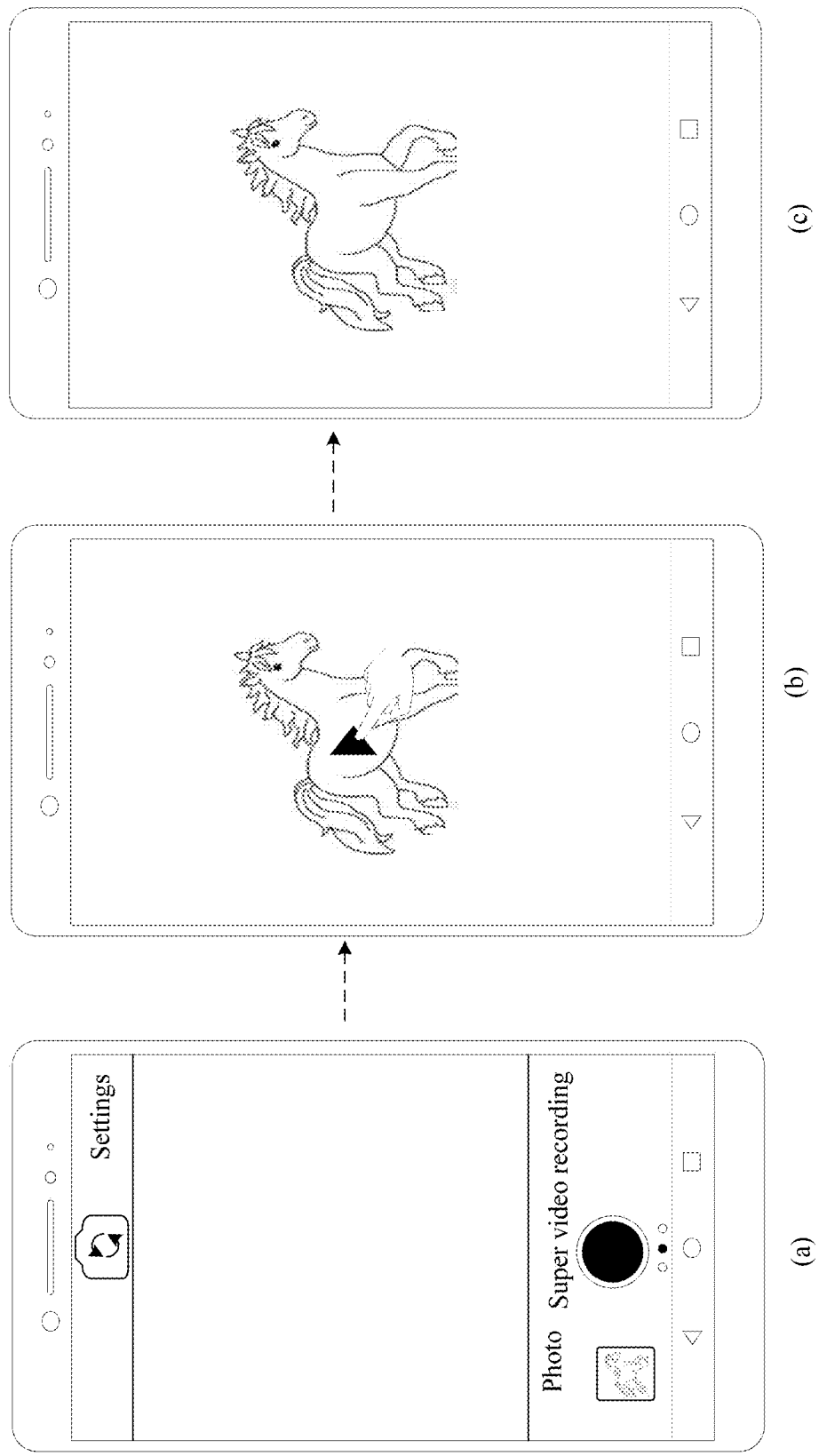
Figures 2, 16:
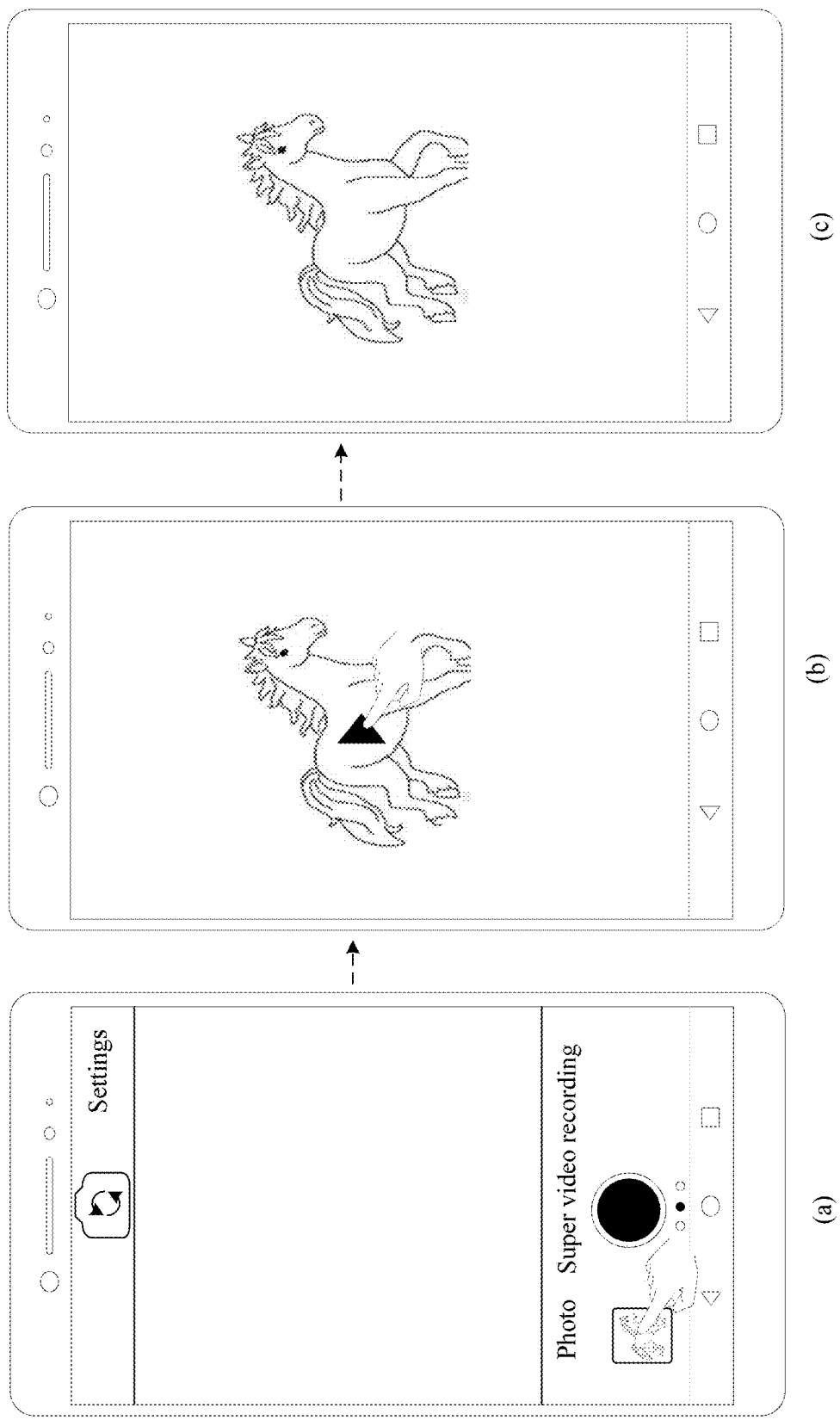
Figures 1A, 17:
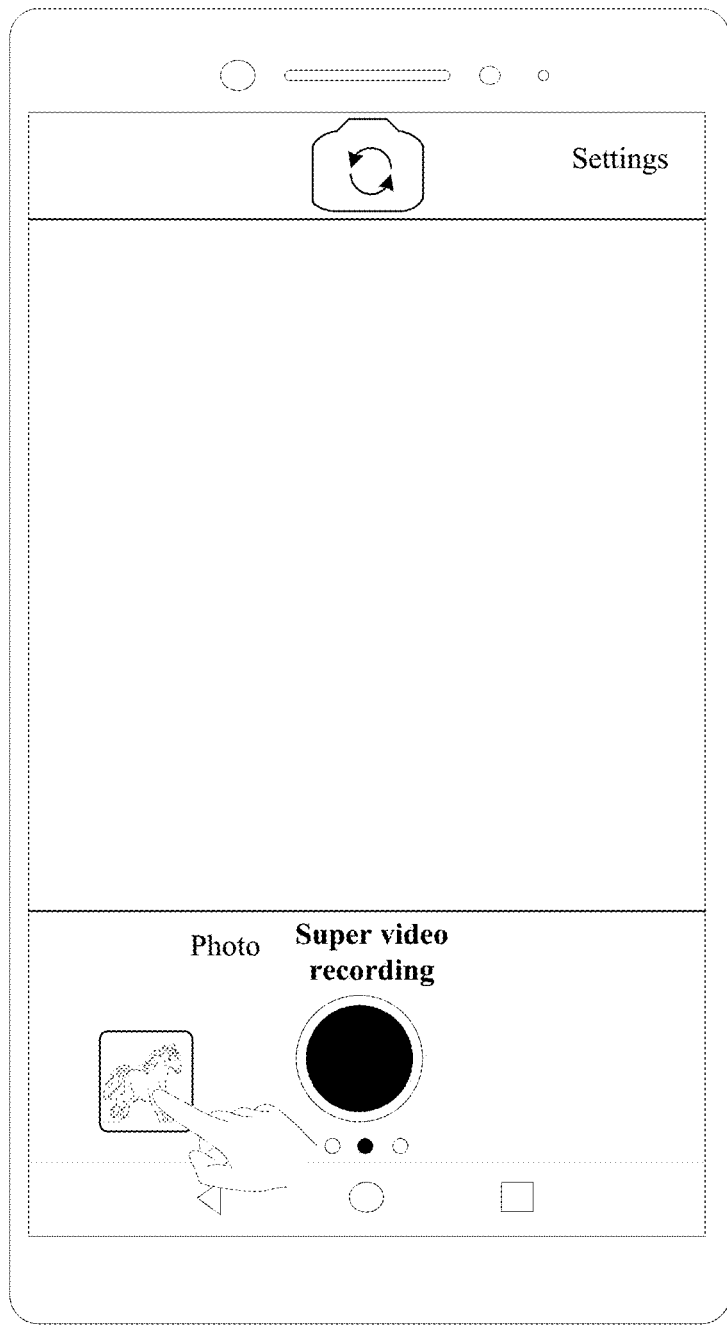
Figures 1B, 17:
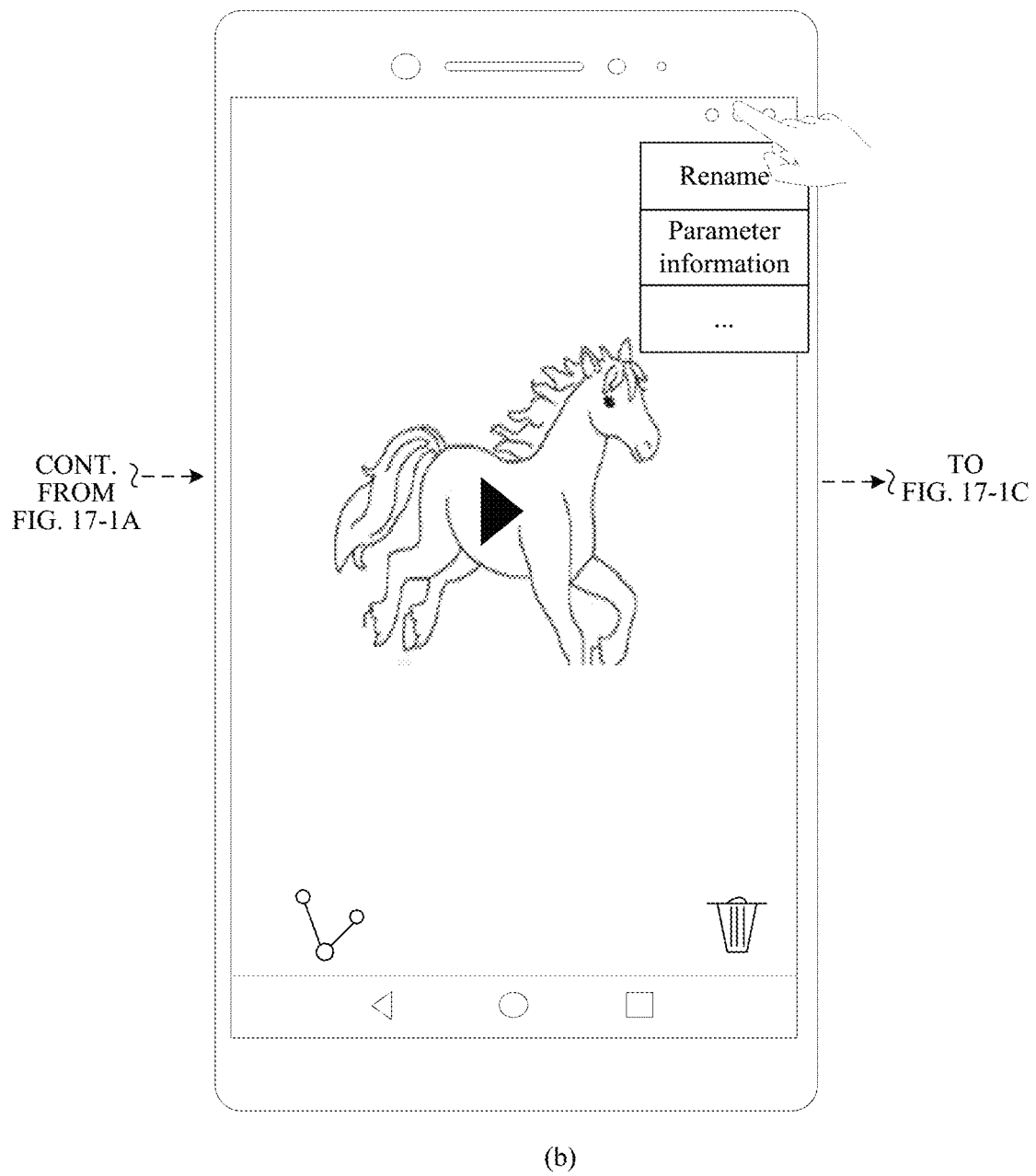
Figures 1C, 17:
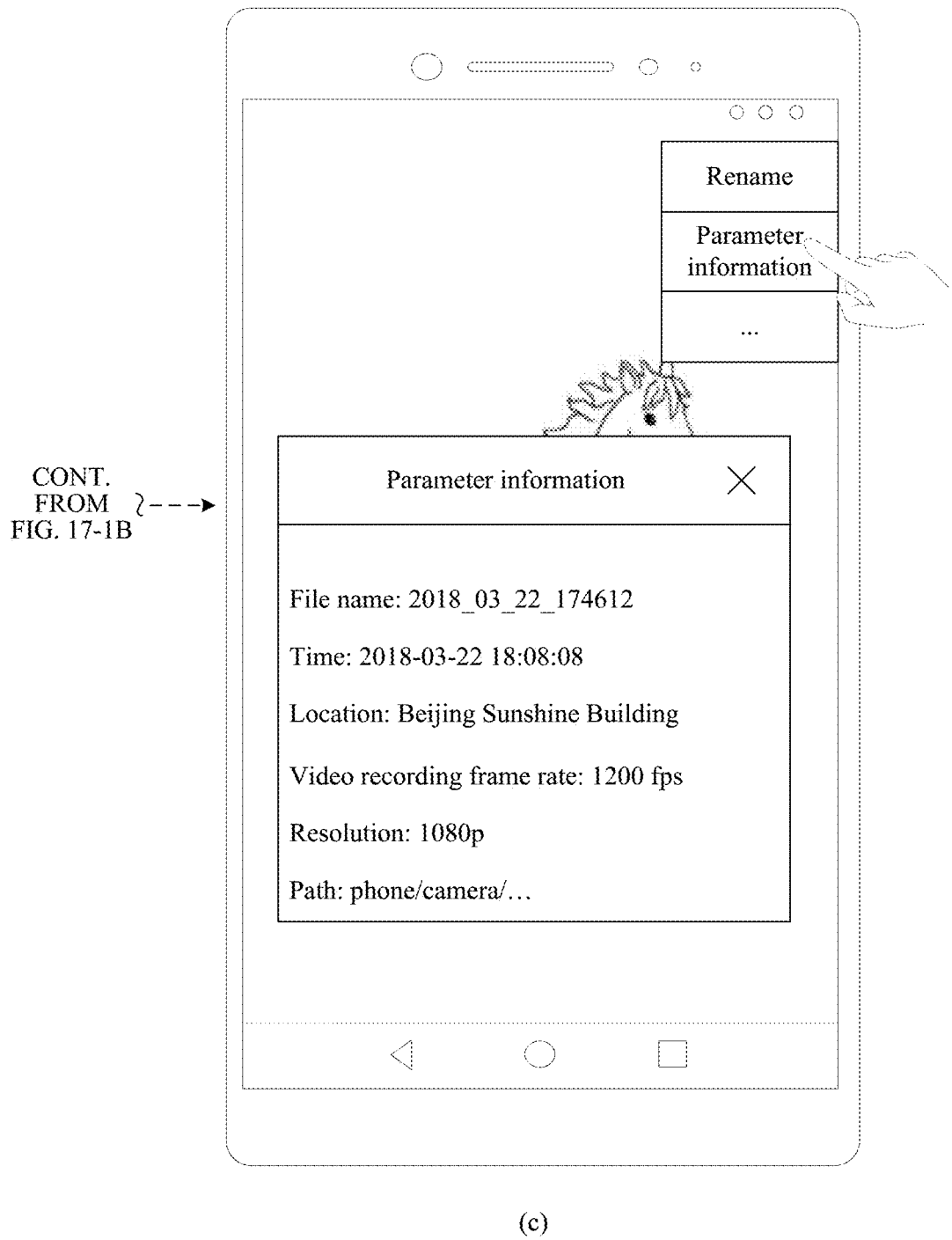
Figures 2A, 17:
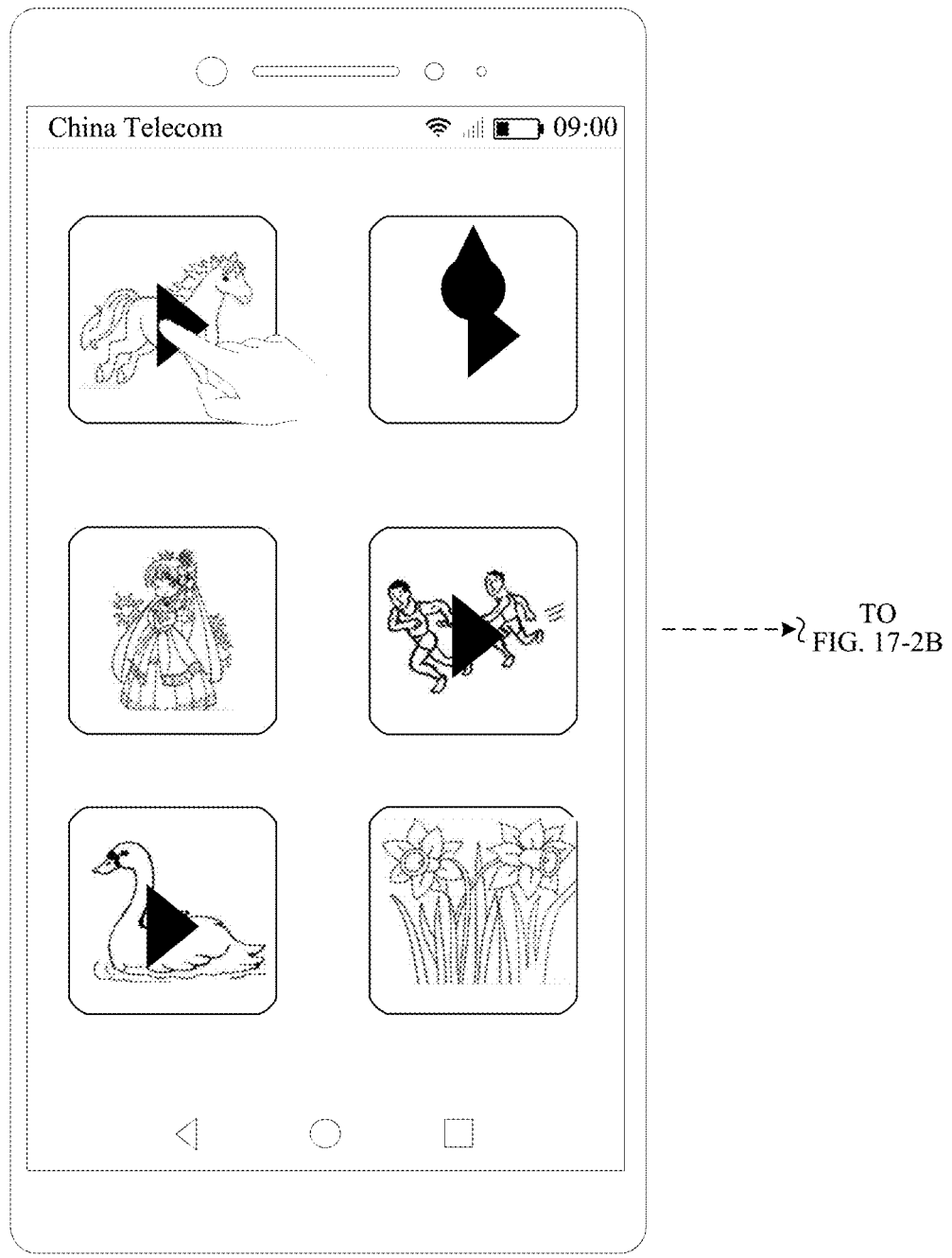
Figures 2B, 17:
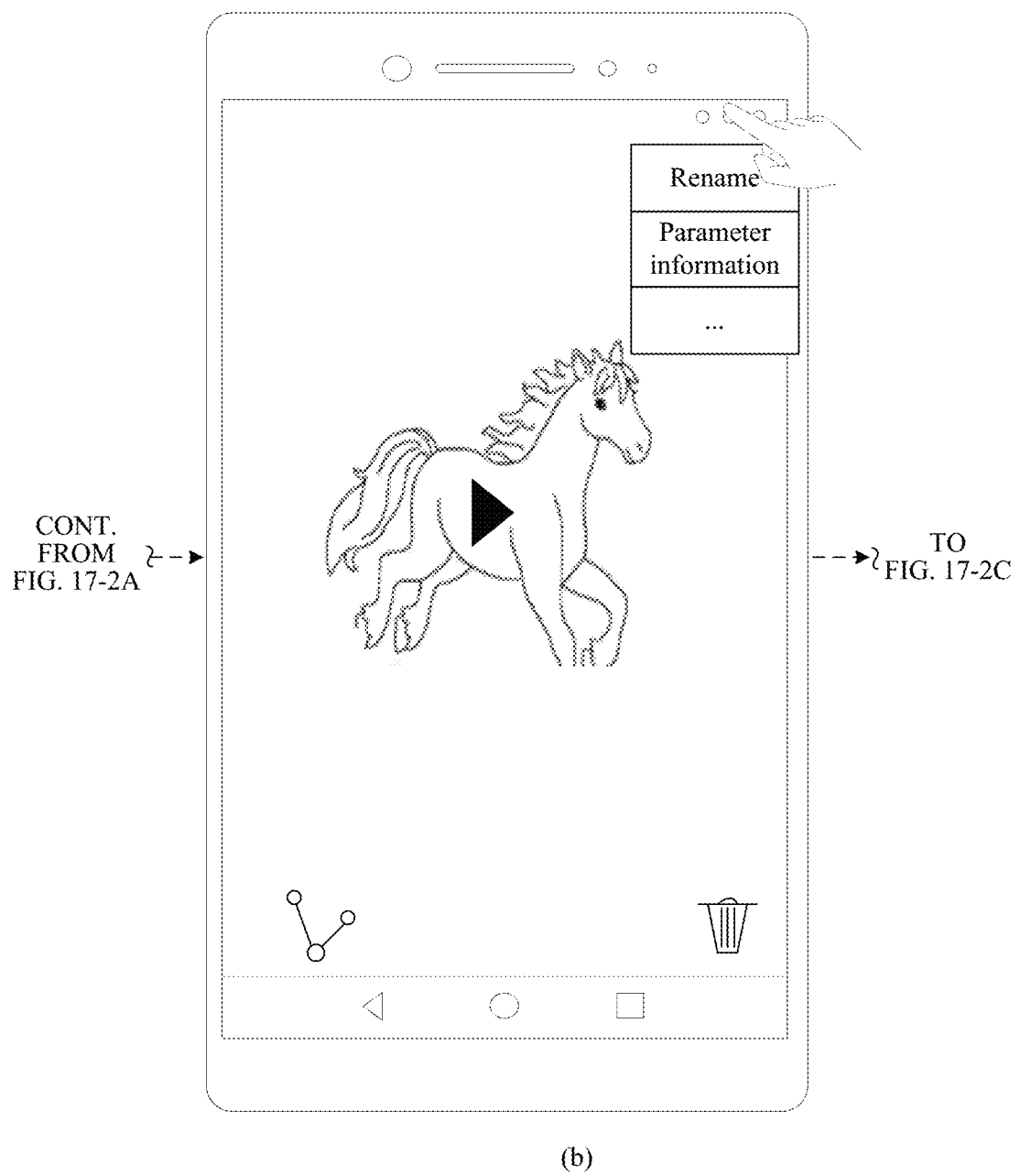
Figures 2C, 17:
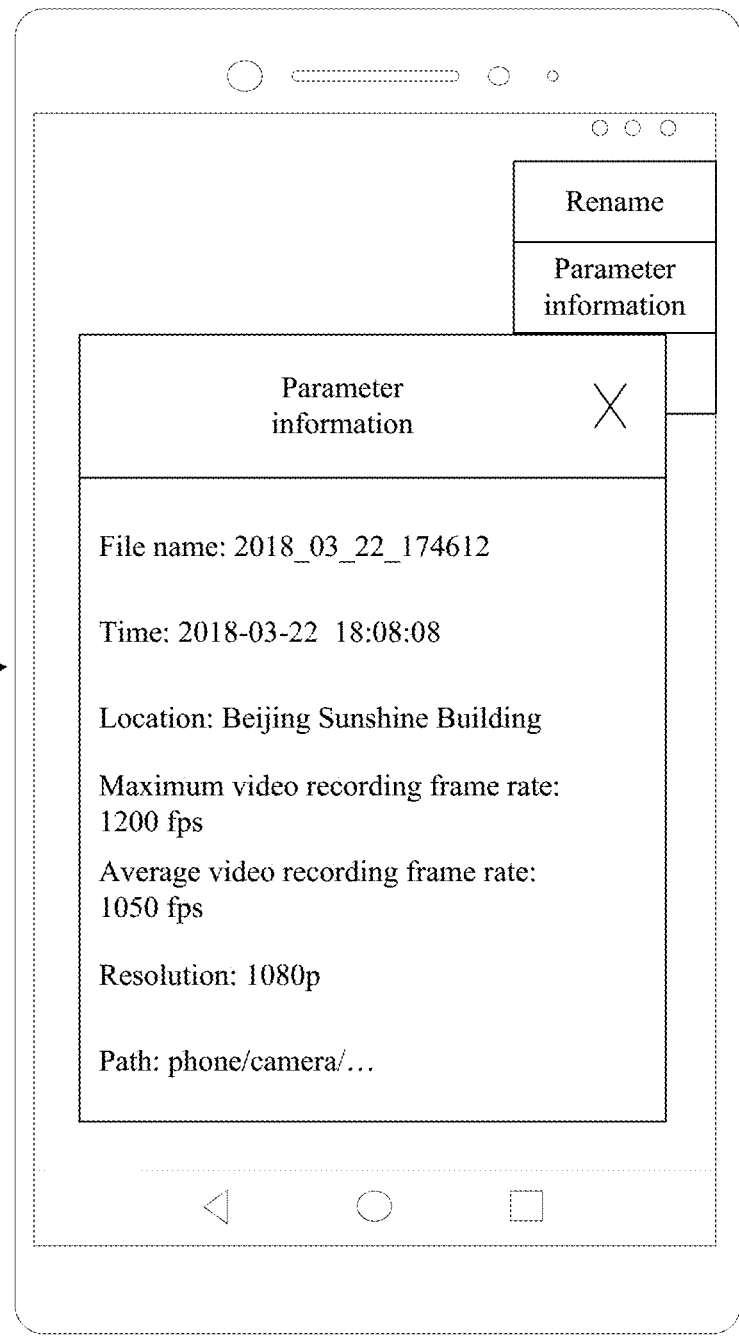

In addition, after video recording is completed, the electronic device may automatically play the recorded video, so that the user views a recording effect of the slow motion video in time. Alternatively, after video recording is completed, the electronic device may display a to-be-played interface shown in FIG. 16-1, and play the video after the user instructs to play the video. Alternatively, referring to FIG. 16-2, after video recording is completed, the electronic device plays the video only after detecting a play indication of the user.

Further, after video recording is completed, the electronic device may store the recorded video, and display parameter information of the video after detecting a parameter information indication that is of the user and that is used to view the stored video. The parameter information includes a video recording frame rate of the video, so that the user learns the recorded video, especially a value of a video recording frame rate of a slow motion video. In addition, the parameter information may alternatively be other information, so that the user learns more comprehensive details of the video. For example, the other information may include one or more of a file name, a time, a photographing location, a file format, a width, a height, duration, a file size, resolution, a model, a manufacturer, a path, or the like.

In addition, when the recorded video includes a video of another type other than the video of the slow motion type, the video recording frame rate of the video in the parameter information may be the maximum value or the average value, or video recording frame rates respectively corresponding to videos of different types may be displayed in the parameter information.

For example, referring to FIG. 17-1A, FIG. 17-1B, and FIG. 17-1C or FIG. 17-2A, FIG. 17-2B, and FIG. 17-2C, when the user taps a "parameter information" option of the stored video, the electronic device displays detailed parameter information.

Specifically, in step 303 in this embodiment of this application, regardless of whether a format of a to-be-recorded video is the preset format, if a video to be recorded at a current moment or a video is of a slow motion type, that the electronic device records the video of the slow motion type may specifically include the following steps.

3031. The electronic device collects original video frames based on the original video frames.

3032. The electronic device interpolates n new video frames between two adjacent original video frames, where n is a positive integer.

The original video frames into which the n new video frames are interpolated may be original video frames buffered in advance in the preview state, or may be video frames collected by the electronic device after the electronic device detects the video recording indication of the user. The electronic device may increase, through frame interpolation processing, the video recording frame rate to the original frame rate multiplied by n.

3033. The electronic device generates a video of a slow motion type based on the original video frames and the new video frames.

In addition, if a to-be-recorded video is of the regular motion type or the fast motion type, the electronic device does not need to perform frame interpolation processing.

Figure 18:
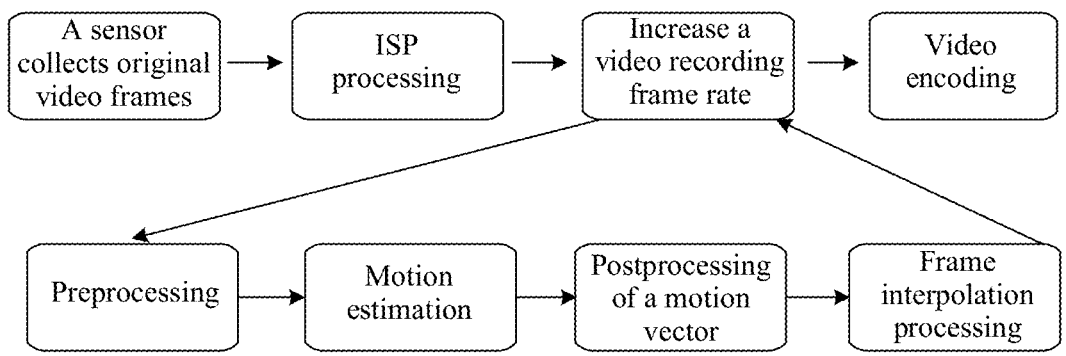
FIG. 18 is a flowchart of another video recording method according to an embodiment of this application.

When the to-be-recorded video is of the slow motion type, FIG. 18 is another flowchart of recording the video of the slow motion type by the electronic device. The flowchart may mainly include the following steps: The image sensor in the electronic device collects original video frames, an image signal processor (ISP) processes the original video frames, then the electronic device increases the video recording frame rate, and then the electronic device performs video encoding, to generate the video. A process in which the electronic device increases the video recording frame rate may include: preprocessing, motion estimation, motion vector postprocessing, frame interpolation processing, and the like. The following gives description by using adjacent original video frames 1 and 2 as an example.

Figure 19:
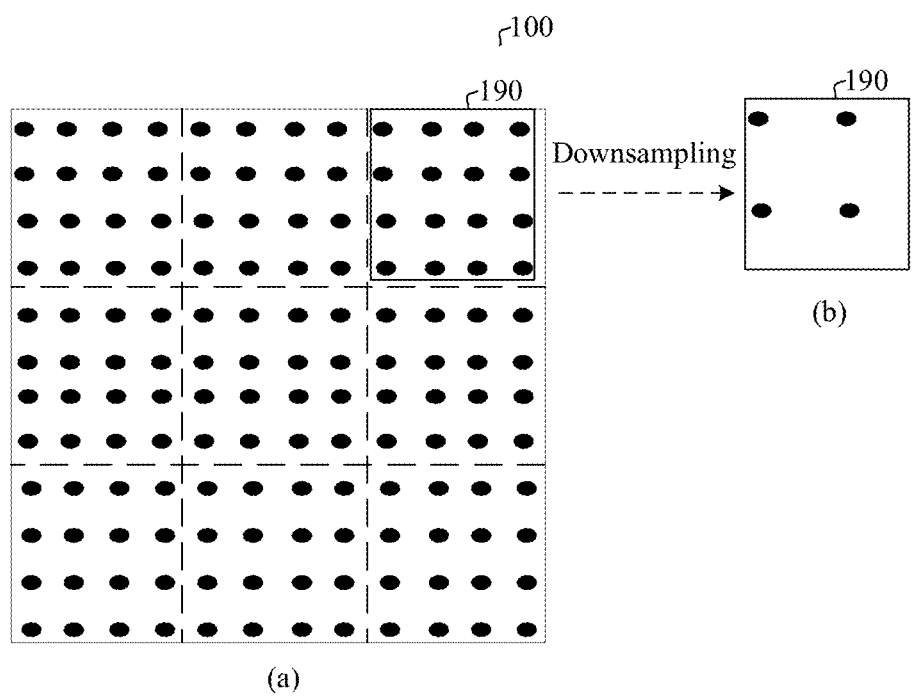
FIG. 19 is a schematic diagram of a downsampling process according to an embodiment of this application.

In a preprocessing process, the electronic device divides each of the original video frame 1 and the original video frame 2 into q (for example, in an example shown in FIG. 20, each of the original video frame 1 and the original video frame 2 is divided into q=M×N) small image blocks, and subsequent processing is all performed based on the image blocks. In addition, the electronic device performs downsampling on each of the original video frame 1 and the original video frame 2, and converts each of the original video frame 1 and the original video frame 2 into an image having lower resolution, so that subsequent complex calculation is performed based on a low-resolution image, thereby reducing an operation amount. Referring to FIG. 19, 100 represents an original video frame, 190 represents an image block, and small dots in FIG. (a) and FIG. (b) represent pixels.

Figure 20:
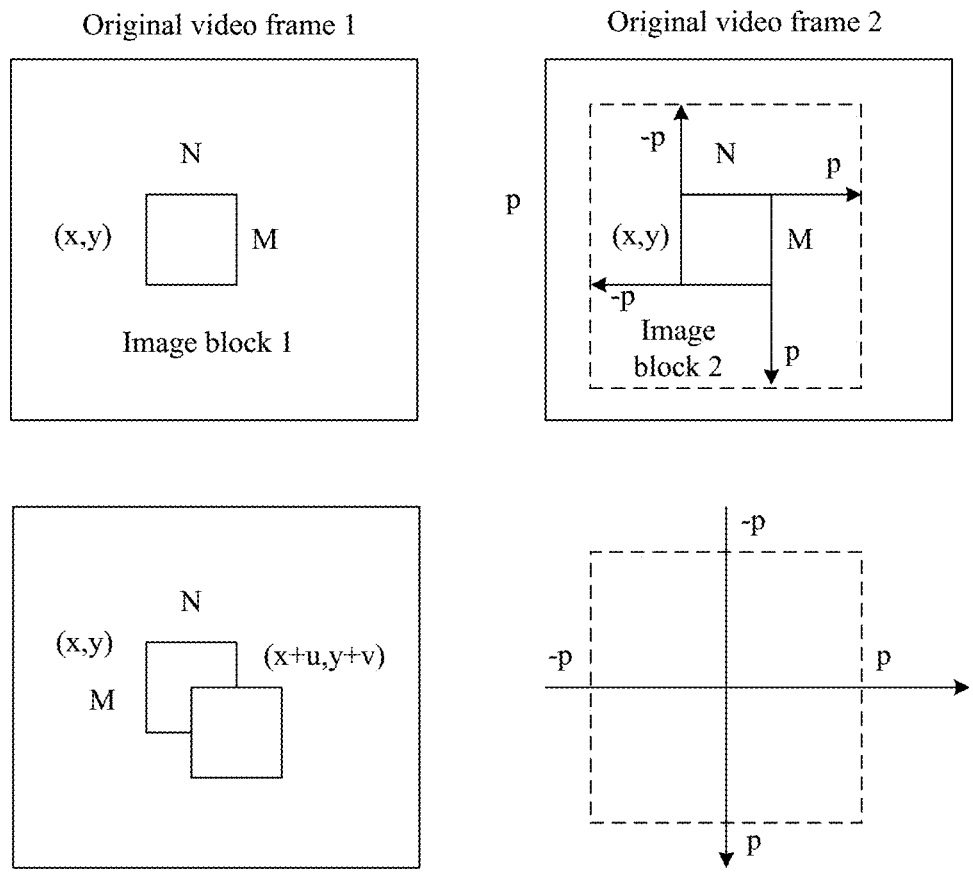
FIG. 20 is a schematic diagram of a motion vector calculation process according to an embodiment of this application.

During motion estimation, referring to FIG. 20, for each image block in the original video frame 1, a particular range (for example, within a range [−p, p] shown by a dashed box in FIG. 20) surrounding a corresponding location in the original video frame 2 is searched. When a residual between a found image block 2 and a current image block 1 in the original video frame 1 is the smallest, it may be considered that the image block 2 in the original video frame 2 is an image block matching the current image block 1 in the original video frame 1. Then, the electronic device calculates a motion vector (x+u, y+v) of the current image block 1 based on coordinates of the current image block 1 in the original video frame 1 and coordinates of the image block 2 in the original video frame 2, where (x, y) represents the coordinates of the current image block 1 in the original video frame 1, and (u, v) represents a location offset of the image block 2 relative to the current image block 1.

Figure 21:
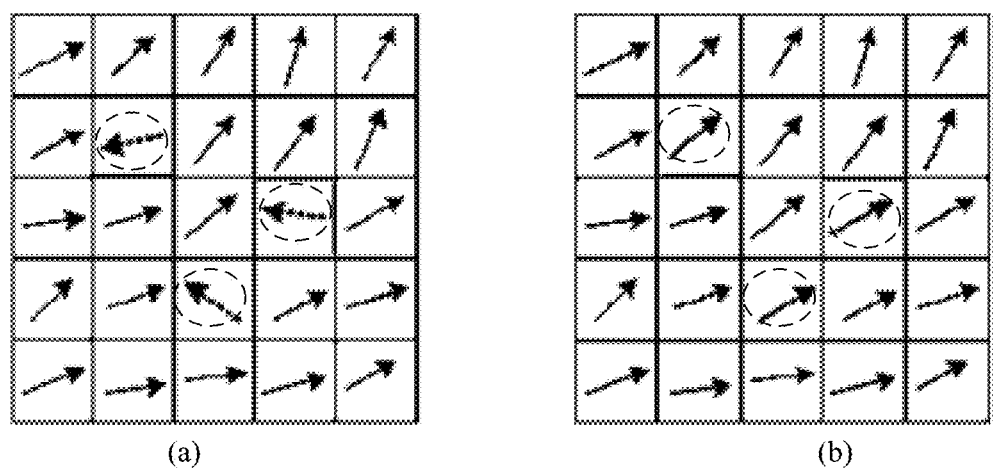
FIG. 21 is a schematic diagram of two motion vector fields according to an embodiment of this application.

In a postprocessing process of a motion vector, the electronic device may improve accuracy and smoothness of the motion vector by using a smooth filtering method such as neighborhood median filtering or weighted average filtering. For example, referring to FIG. 21, (a) is a calculated motion vector field corresponding to the image blocks, where an error occurs in motion vectors of some image blocks, and (b) is a motion vector field obtained after postprocessing correction, where trends of motion vectors of the image blocks keep consistent.

Figure 22:
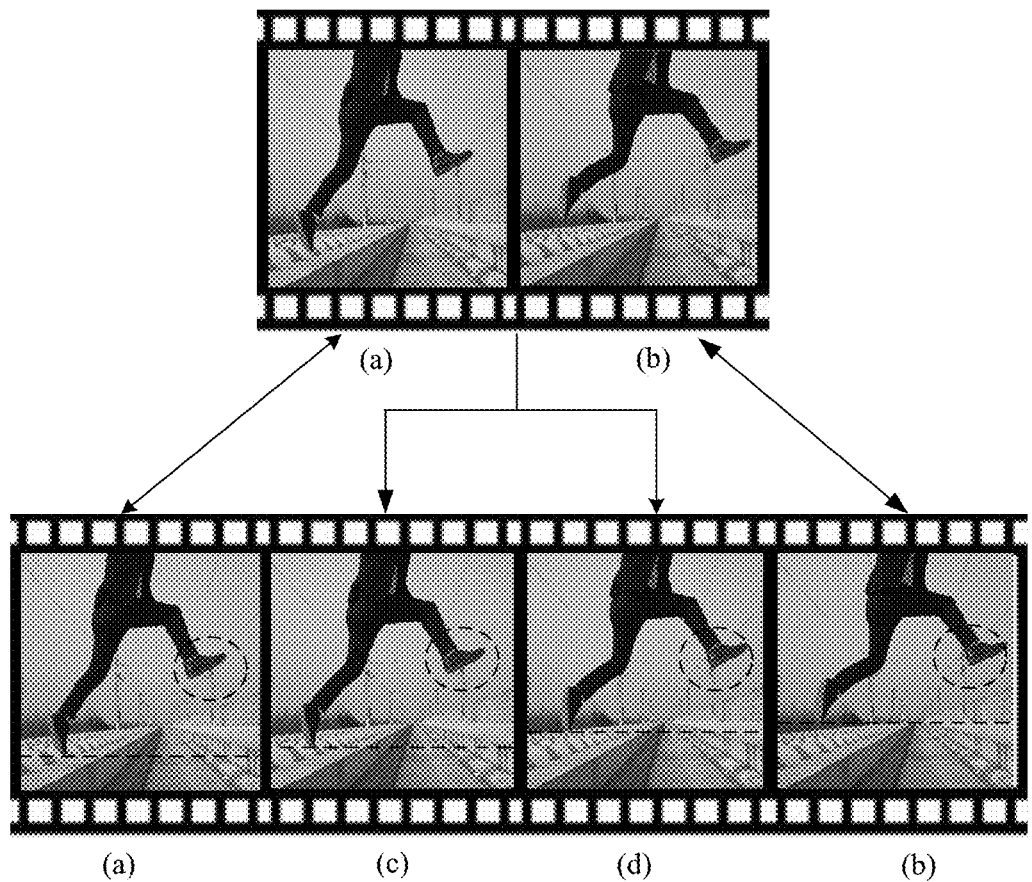
FIG. 22 is a schematic diagram of a frame interpolation effect according to an embodiment of this application.

Then, the electronic device calculates, based on the processed motion vector, locations of n image blocks that correspond to the image block 1 and the image block 2 and that are in the to-be-interpolated n new video frames. After separately determining locations of q image blocks in the n to-be-interpolated new video frames, the electronic device generates n to-be-interpolated image blocks, and interpolates the n to-be-interpolated image blocks between the original video block 1 and the original video block 2. For example, for a schematic diagram of an effect after frame interpolation, refer to FIG. 22. Specifically, in FIG. 22, (a) and (b) represent original video frames, and (c) and (d) represent new video frames interpolated between the original video frames (a) and (b).

It should be noted that in this embodiment of this application, frame interpolation is performed by using a software method, so that costs are lower, and it is easy to perform update and maintenance. In addition, in the video recording method provided in this embodiment of this application, frame interpolation is performed in a recording process. Compared with a case in which frame interpolation is performed in a play process, when frame interpolation is performed in a recording process, the video can still be played in a slow motion manner after the video is transmitted to another device or stored into another medium.

It may be understood that to implement the foregoing functions, the electronic device includes a corresponding hardware structure and/or software module for performing each of the functions. A person of ordinary skill in the art should easily be aware that, in combination with the example algorithms steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules of the electronic device and the server may be divided based on the foregoing method example. For example, the function modules may be divided to correspond to the functions, or two or more functions may be integrated into one processing module. The integrated module may be implemented in a form of hardware, or may be implemented in a form of a software function module. It should be noted that module division in the embodiments of this application is an example and is merely logical function division. During actual implementation, there may be another division manner.

Figure 23:
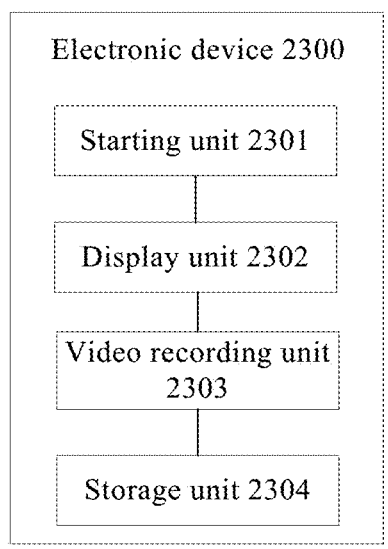
FIG. 23 is a schematic structural diagram of an electronic device according to an embodiment of this application.

When function modules are divided by using corresponding functions, FIG. 23 is a schematic diagram of a possible composition of the electronic device in the foregoing embodiment. As shown in FIG. 23, the electronic device 2300 may include a starting unit 2301, a display unit 2302, and a recording unit 2303.

The determining unit 2301 may be configured to allow the electronic device 2300 to perform step 301 in the video recording method shown in FIG. 3. The display unit 2302 may be configured to allow the electronic device 2300 to perform step 302 in the video recording method shown in FIG. 3. The recording unit 2303 may be configured to allow the electronic device 2300 to perform step 303 in the video recording method shown in FIG. 3.

The recording unit 2303 may be further configured to allow the electronic device 2300 to collect, in a preview state, original video frames based on an original frame rate; buffer the original video frames collected within a latest T time, where T is a preset length; and generate a video based on the buffered original video frames and a preset format.

In addition, the recording unit 2303 may be further configured to allow the electronic device 2300 to record a video of a first video type; and after detecting a second video type indication, switch to recording of a video of a second video type, where the first video type or the second video type is a slow motion video type.

The recording unit 2303 may be further configured to allow the electronic device 2300 to pause video recording after a pause indication of a user is detected; resume video recording after a video recording resumption indication of the user is detected; and stop video recording after a stop indication of the user is detected.

The recording unit 2303 may be further configured to allow the electronic device 2300 to collect original video frames based on the original frame rate; interpolate at least one new video frame between different original video frames; and generate the video based on the original video frames and the new video frame.

Further, the electronic device 2300 may further include a storage unit 2304. The storage unit 2304 may be configured to allow the electronic device 2300 to store the video after the recording unit records the video. The display unit 232 is further configured to allow the electronic device 2300 to display parameter information of the video after a parameter information indication of the user is detected, where the parameter information includes a video recording frame rate of the video.

It should be noted that all related content of each step in the foregoing method embodiments may be cited in function descriptions of a corresponding function module. Details are not described herein again.

The electronic device provided in this embodiment of this application is configured to perform the video recording method, and therefore can achieve an effect the same as that of the video recording method and a GUI displaying method.

When an integrated unit is used, the starting unit 2301 and the recording unit 2303 may be integrated into a processing module, the display unit 2302 is integrated into a display module, and the storage unit is integrated into a storage module.

The processing module is configured to control and manage actions of the electronic device. For example, the processing module is configured to allow the electronic device to perform step 301 and step 303 in FIG. 3, and/or other processes of the technologies described in this specification. The display module may be configured to allow the electronic device to perform step 302 in FIG. 3, and may further display a graphics user interface, an image, parameter information, or the like to the user. The storage module is configured to store program code of the electronic device, the recorded video, and parameter information of the video.

The processing module may be a processor or a controller, for example, may be a central processing unit (CPU), a graphics processing unit (GPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The display module may be a display, and may be used in a device displaying information entered by the user, information provided for the user, and various menus of the terminal. Specifically, the display may be configured as a liquid crystal display, an organic light emitting diode display, or the like. In addition, a touch panel may be further integrated into the display, and is configured to: collect a touch event on or near the touch panel, and send collected touch information to another component (for example, the processor).

The storage module may be a memory. The memory may include a high-speed RAM, and may further include a non-volatile memory, such as a magnetic disk storage component, a flash memory, or another volatile solid-state storage component.

In addition, the electronic device may further include a communications module. The communications module may be configured to allow the electronic device to communicate with another network entity, for example, communicate with a server. The communications module may be specifically a device interacting with another electronic device, for example, a radio frequency circuit, a Bluetooth chip, or a Wi-Fi chip.

In a specific implementation, when the processing module is a processor, the display module is a display, and the storage module is a memory, the electronic device in this embodiment of this application may be specifically the mobile phone shown in FIG. 2.

An embodiment of this application further provides a computer storage medium. The computer storage medium stores a computer instruction. When the computer instruction is run on an electronic device, the electronic device performs the related method steps to implement the video recording method in the foregoing embodiment.

An embodiment of this application further provides a computer program product. When the computer program product is run on a computer, the computer performs the related method steps to implement the video recording method in the foregoing embodiment.

In addition, an embodiment of this application further provides an apparatus. The apparatus may be specifically a chip, a component, or a module. The apparatus may include a processor and a memory that are connected. The memory is configured to store a computer executable instruction, and when the apparatus runs, the processor may execute the computer executable instruction stored in the memory, so that the chip performs the video recording method in the method embodiment.

The electronic device, the computer storage medium, the computer program product, or the chip provided in the embodiments of this application may be configured to perform the corresponding method provided in the foregoing specification. Therefore, for a beneficial effect that can be achieved, refer to the beneficial effect of the corresponding method provided in the foregoing specification. Details are not described herein again.

The foregoing descriptions of implementations allow a person skilled in the art to understand that, for the purpose of convenient and brief description, division of the foregoing function modules is merely used as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and there may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for recording a video which is a combination of video segments of different types, comprising:
   starting a camera of an electronic device;
   displaying a video recording preview interface, wherein the video recording preview interface comprises a start button;
   collecting, in a preview state, original video frames based on an original frame rate;
   buffering the original video frames collected within a preset length of time;
   receiving a video recording indication indicating that a user taps the start button, wherein the preset length of time is prior to the user tapping the start button;
   performing, by the electronic device, a recording process, in response to the video recording indication according to a preset format selected by the user among a plurality of preset formats, wherein performing the recording process includes:
      recording, by the electronic device, a first video segment without interpolation according to a first video recording type, wherein the first video recording type is a non-slow motion type, and wherein recording the first video segment comprises:
         capturing, during a first time period, via an imaging sensor of the electronic device, a first set of video frames at a maximum framerate supported by the imaging sensor, and
         performing evenly-spaced frame extraction processing on the captured first set of video frames to obtain the recorded first video segment, such that the recorded first video segment has less video frames than the captured first set of video frames;
      switching, by the electronic device, from the first video recording type to a second video recording type, wherein the second video recording type is a slow motion type; and
      based on having switched to the second video recording type, recording, by the electronic device, a second video segment with interpolation according to the second video recording type, wherein recording the second video segment with interpolation includes:

capturing, during a second time period after the first time period, via the imaging sensor of the electronic device, a second set of video frames at the maximum framerate supported by the imaging sensor; and inserting, by the electronic device, interpolated video frames between adjacent frames of the second set of video frames to generate the second video segment with interpolation, wherein the second video segment with interpolation has a framerate higher than the maximum framerate supported by the imaging sensor; and automatically generating, by the electronic device and in response to a stop indication from the user for the recording of the video, a combined video, as a recorded video in response to the video recording indication, including the original video frames, the first video segment without interpolation corresponding to a non-slow motion video and the second video segment with interpolation corresponding to a slow motion video;

wherein performing the recording process further includes: prior to switching from the first video recording type to the second video recording type, identifying an object, and detecting that a moving speed of the object is greater than or equal to a preset value;

wherein switching from the first video recording type to the second video recording type is in response to identifying the object and detecting that the moving speed of the object is greater than or equal to the preset value; and wherein the second video recording type corresponds to a respective format corresponding to the identified object out of a plurality of formats corresponding to a plurality of objects, wherein the plurality of formats includes:

a first format comprising a first combination of at least two out of the following: a first fast motion video duration, a first slow motion video duration, and a first regular motion video duration; and a second format comprising a second combination of at least two out of the following: a second fast motion video duration, a second slow motion video duration, and a second regular motion video duration.

2. The method according to claim 1, wherein the framerate of the second video segment with interpolation is greater than or equal to 960 frames per second.

3. The method according to claim 1, wherein the combined video is associated with a playback framerate of 30 frames per second.

4. The method according to claim 1, wherein the first video segment is further based on the buffered video frames.

5. The method according to claim 1, wherein the first video segment is associated with a first playback time duration equal to the first time period.

6. The method according to claim 1, wherein the interpolated video frames are based on at least a part of the second set of video frames.

7. The method according to claim 1, wherein performing the recording process further includes:

prior to switching from the first video recording type to the second video recording type, detecting a second video type indication from the user.

8. The method according to claim 1, wherein the identified object is a water drop, an eagle, or a horse.

9. The method according to claim 1, further comprising:
playing, by the electronic device, the combined video, wherein the first video segment is played at normal speed and the second video segment is played in slow motion.

10. An electronic device, comprising:
a camera having an imaging sensor;
a processor; and
a memory having processor-executable instructions stored thereon;
wherein the processor-executable instructions, when executed by the processor, cause the following to be performed by the electronic device:
starting the camera of the electronic device;
displaying a video recording preview interface, wherein the video recording preview interface comprises a start button;
collecting, in a preview state, original video frames based on an original frame rate;
buffering the original video frames collected within a preset length of time;
receiving a video recording indication indicating that a user taps the start button, wherein the preset length of time is prior to the user tapping the start button;
performing, by the electronic device, a recording process, in response to the video recording indication according to a preset format selected by the user among a plurality of preset formats, wherein performing the recording process includes:
recording a first video segment without interpolation according to a first video recording type, wherein the first video recording type is a non-slow motion type, and wherein recording the first video segment comprises:
capturing, during a first time period, via the imaging sensor, a first set of video frames at a maximum framerate supported by the imaging sensor, and
performing evenly-spaced frame extraction processing on the captured first set of video frames to obtain the recorded first video segment, such that the recorded first video segment has less video frames than the captured first set of video frames;
switching from the first video recording type to a second video recording type, wherein the second video recording type is a slow motion type; and
based on having switched to the second video recording type, recording a second video segment with interpolation according to the second video recording type, wherein recording the second video segment with interpolation includes:
capturing, during a second time period after the first time period, via the imaging sensor, a second set of video frames at the maximum framerate supported by the imaging sensor; and
inserting, by the electronic device, interpolated video frames between adjacent frames of the second set of video frames to generate the second video segment with interpolation, wherein the second video segment with interpolation has a framerate higher than the maximum framerate supported by the imaging sensor; and
automatically generating, by the electronic device and in response to a stop indication from the user for the recording of the video, a combined video, as a recorded video in response to the video recording indication, including the original video frames, the first video segment without interpolation corresponding to a non-slow motion video and the second video segment with interpolation corresponding to a slow motion video;

wherein performing the recording process further includes: prior to switching from the first video recording type to the second video recording type, identifying an object, and detecting that a moving speed of the object is greater than or equal to a preset value;

wherein switching from the first video recording type to the second video recording type is in response to identifying the object and detecting that the moving speed of the object is greater than or equal to the preset value; and wherein the second video recording type corresponds to a respective format corresponding to the identified object out of a plurality of formats corresponding to a plurality of objects, wherein the plurality of formats includes:
a first format comprising a first combination of at least two out of the following: a first fast motion video duration, a first slow motion video duration, and a first regular motion video duration; and
a second format comprising a second combination of at least two out of the following: a second fast motion video duration, a second slow motion video duration, and a second regular motion video duration.

11. The electronic device according to claim 10, wherein the framerate of the second video segment with interpolation is greater than or equal to 960 frames per second.

12. The electronic device according to claim 10, wherein the first video segment is further based on the buffered video frames.

13. The electronic device according to claim 10, wherein the first video segment is associated with a first playback time duration equal to the first time period.

14. The electronic device according to claim 10, wherein the interpolated video frames are based on at least a part of the second set of video frames.

15. A non-transitory computer-readable medium having processor-executable instructions stored thereon for recording a video which is a combination of video segments of different types, wherein the processor-executable instructions, when executed, facilitate:
starting a camera of an electronic device;
displaying a video recording preview interface, wherein the video recording preview interface comprises a start button;
collecting, in a preview state, original video frames based on an original frame rate;
buffering the original video frames collected within a preset length of time;
receiving a video recording indication indicating that a user taps the start button, wherein the preset length of time is prior to the user tapping the start button;
performing, by the electronic device, a recording process, in response to the video recording indication according to a preset format selected by the user among a plurality of preset formats, wherein performing the recording process includes:
recording, by the electronic device, a first video segment without interpolation according to a first video recording type, wherein the first video recording type is a non-slow motion type, and wherein recording the first video segment comprises:
capturing, during a first time period, via an imaging sensor of the electronic device, a first set of video frames at a maximum framerate supported by the imaging sensor, and
performing evenly-spaced frame extraction processing on the captured first set of video frames to obtain the recorded first video segment, such that the recorded first video segment has less video frames than the captured first set of video frames;
switching, by the electronic device, from the first video recording type to a second video recording type, wherein the second video recording type is a slow motion type; and
based on having switched to the second video recording type, recording, by the electronic device, a second video segment with interpolation according to the second video recording type, wherein recording the second video segment with interpolation includes:
capturing, during a second time period after the first time period, via the imaging sensor of the electronic device, a second set of video frames at the maximum framerate supported by the imaging sensor; and
inserting, by the electronic device, interpolated video frames between adjacent frames of the second set of video frames to generate the second video segment with interpolation, wherein the second video segment with interpolation has a framerate higher than the maximum framerate supported by the imaging sensor; and
automatically generating, by the electronic device and in response to a stop indication from the user for the recording of the video, a combined video, as a recorded video in response to the video recording indication, including the original video frames, the first video segment without interpolation corresponding to a non-slow motion video and the second video segment with interpolation corresponding to a slow motion video;

wherein performing the recording process further includes: prior to switching from the first video recording type to the second video recording type, identifying an object, and detecting that a moving speed of the object is greater than or equal to a preset value;

wherein switching from the first video recording type to the second video recording type is in response to identifying the object and detecting that the moving speed of the object is greater than or equal to the preset value; and wherein the second video recording type corresponds to a respective format corresponding to the identified object out of a plurality of formats corresponding to a plurality of objects, wherein the plurality of formats includes:
a first format comprising a first combination of at least two out of the following: a first fast motion video duration, a first slow motion video duration, and a first regular motion video duration; and
a second format comprising a second combination of at least two out of the following: a second fast motion video duration, a second slow motion video duration, and a second regular motion video duration.

* * * * *